United States Patent [19]
DeLorme et al.

[11] Patent Number: 5,948,040
[45] Date of Patent: Sep. 7, 1999

[54] TRAVEL RESERVATION INFORMATION AND PLANNING SYSTEM

[75] Inventors: David M. DeLorme, Yarmouth; Keith A. Gray, Dresden; T. Angus Ferguson, Portland, all of Me.

[73] Assignee: DeLorme Publishing Co., Yarmouth, Me.

[21] Appl. No.: 08/797,471

[22] Filed: Feb. 6, 1997

Related U.S. Application Data

[63] Continuation-in-part of application No. 08/661,600, Jun. 11, 1996, Pat. No. 5,802,492, which is a continuation-in-part of application No. 08/381,214, Jan. 31, 1995, Pat. No. 5,559,707, which is a continuation-in-part of application No. 08/265,327, Jun. 24, 1994, and a continuation-in-part of application No. 08/521,828, Aug. 31, 1995.

[51] Int. Cl.[6] .............................. G06F 19/00; G01C 21/00
[52] U.S. Cl. ......................... 701/201; 701/208; 701/211; 340/990; 705/5
[58] Field of Search .................................... 701/201, 202, 701/207, 208, 209, 211, 212, 213; 705/5, 6; 340/988, 989, 990, 995

[56] References Cited

U.S. PATENT DOCUMENTS

| | | | |
|---|---|---|---|
| 4,359,631 | 11/1982 | Lockwood et al. | 360/12 |
| 4,862,357 | 8/1989 | Ahlstrom et al. | 705/6 |
| 4,926,336 | 5/1990 | Yamada | 364/444 |
| 5,021,953 | 6/1991 | Webber et al. | 705/6 |
| 5,172,321 | 12/1992 | Ghaem et al. | 701/202 |
| 5,191,523 | 3/1993 | Whitesage | 705/6 |
| 5,208,756 | 5/1993 | Song | 364/449 |

(List continued on next page.)

OTHER PUBLICATIONS

Makulowich, John, "Traveling by Virtual Reservation," Washington Technology, Jan. 23, 1997, p. 42.

Knecht, Bruce, G., "Microsoft Puts Newspapers in Highanxiety.com," The Wall Street Journal, Jul. 15, 1996, pp. B1, B10.

"InforTravel Expands Service," Business Geographics, vol. 4, No. 6, Jun., 1996, p. 13.

DelRosso, Laura, "Firm Customizes Internet Res Link," Travel Weekly, vol. 55, No. 26, Apr. 1, 1996, pp. 43–44, 47.

"Casto Travel's Resource Library," www.casto.com.

"Sunnyside Computing, Inc.," www.itn.net.

Primary Examiner—Tan Nguyen
Attorney, Agent, or Firm—Pierce Atwood; Chris A. Caseiro

[57] ABSTRACT

Computerized travel reservation information and planning system that generates "map ticket" output in various media, for guidance and transactions en route. Such print or electronic documents can include bar or alphanumeric codes for automated recognition and/or access. WHERE?, WHO/WHAT?, WHEN? and HOW? menus enable flexible user inquiries accessing selectable geographic, topical, temporal and transactional data records and relational processing. Sub-menus provide further capabilities: e.g. routing, topical searching; searches of events calendars, almanacs, appointment books, related itinerary scheduling; trip budgeting issues, plus travel arrangement availabilities or other goods/services offers. Online communications links access updated or supplemental information on places, times, topics and other provider goods/service offers. Online computer-aided routing system enables input of selectable travel origin, destination, and waypoints to compute travel routes, available transportation services, costs, options, and schedules. A point-of-interest database lets users pick types of attractions or accommodations within a user-selected region around routes of travel. Users engage in an iterative planning process, revising or editing travel plans, previewing travelogs of alternate routes, selecting point of interest parameters, comparing times and costs of transportation options, in order to achieve a satisfactory travel plan. The system provides printed or electronic output that may include any one or more of text itinerary, ordered set of travel maps, customized collection of information on points of interest information and a selected array of valid reservation confirmations, tickets and/or discount coupons coded with elements for automated recognition and processing. Mobile users, including GPS-linked users, can access the system via wireless communication units.

80 Claims, 14 Drawing Sheets

U.S. PATENT DOCUMENTS

| | | | |
|---|---|---|---|
| 5,231,584 | 7/1993 | Nimura et al. | 364/444 |
| 5,237,499 | 8/1993 | Garback | 705/5 |
| 5,243,528 | 9/1993 | Lefebvre | 701/211 |
| 5,253,166 | 10/1993 | Dettebach et al. | 705/5 |
| 5,272,638 | 12/1993 | Martin et al. | 701/202 |
| 5,331,546 | 7/1994 | Webber et al. | 705/6 |
| 5,353,034 | 10/1994 | Sato et al. | 340/988 |
| 5,359,527 | 10/1994 | Takanabe et al. | 364/449 |
| 5,369,588 | 11/1994 | Hayami et al. | 701/209 |
| 5,422,809 | 6/1995 | Griffin et al. | 705/5 |
| 5,444,618 | 8/1995 | Seki et al. | 364/420 |
| 5,519,619 | 5/1996 | Seda | 701/201 |
| 5,537,324 | 7/1996 | Nimura et al. | 364/449 |
| 5,587,911 | 12/1996 | Asano et al. | 364/444.2 |
| 5,724,520 | 3/1998 | Goheen | 705/5 |

FIG 1B-1
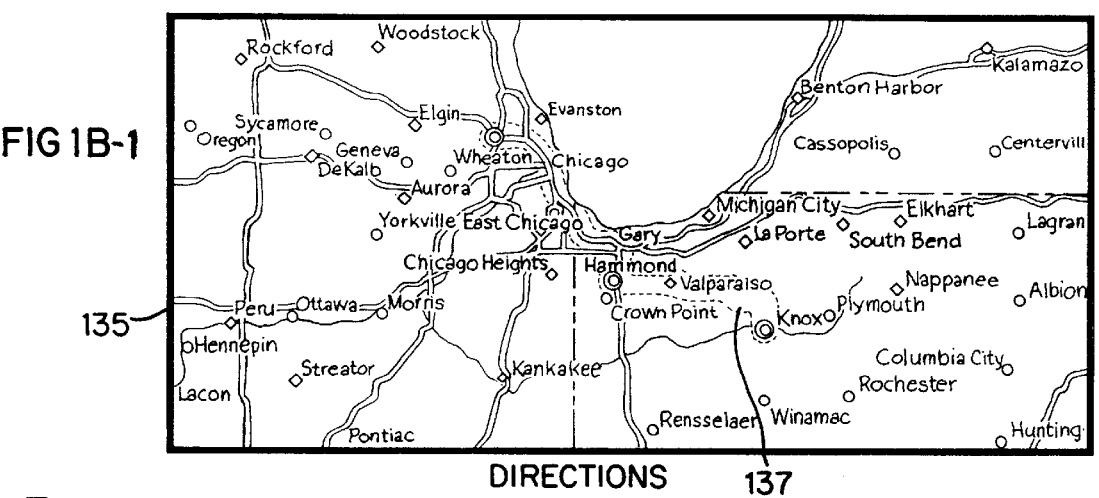
DIRECTIONS
FIG 1B-2
| | | Road | Dir | Near | Exit # | Time | Dist | Mi |
|---|---|---|---|---|---|---|---|---|
| | | START - Knox, IN | | | | | | |
| | 1 | US 35 (SR 8, CR 400 E, Heat | N | Knox, IN | | 0:00 | 0.0 | 0.2 |
| | 2 | US 35 (SR 8, CR 400 E) | N | Knox, IN | | 0:00 | 0.1 | 6 |
| | 3 | US 30 | W | | | 0:08 | 6.4 | 38 |
| | | STOP - Jolly Ginger's, IN | | | | | | |
| | 4 | US 30 (Lincoln Hwy) | E | Merrillville, IN | | 0:59 | 44.5 | 0.4 |
| | 5 | I-65 | N | Merrillville, IN | 253 | 1:00 | 44.9 | 9 |
| | 6 | I-90 (East-West Toll Rd) | NW | | 17\|261 | 1:09 | 54.1 | 45 |
| | 7 | I-190 | W | | 78 | 2:00 | 99.6 | 3 |
| | | FINISH - Chicago O'Hare Intl (ORD), IL | | | | | | |
TOTAL DISTANCE: 103 MI, TOTAL TIME: 2:03
FIG 1B-3
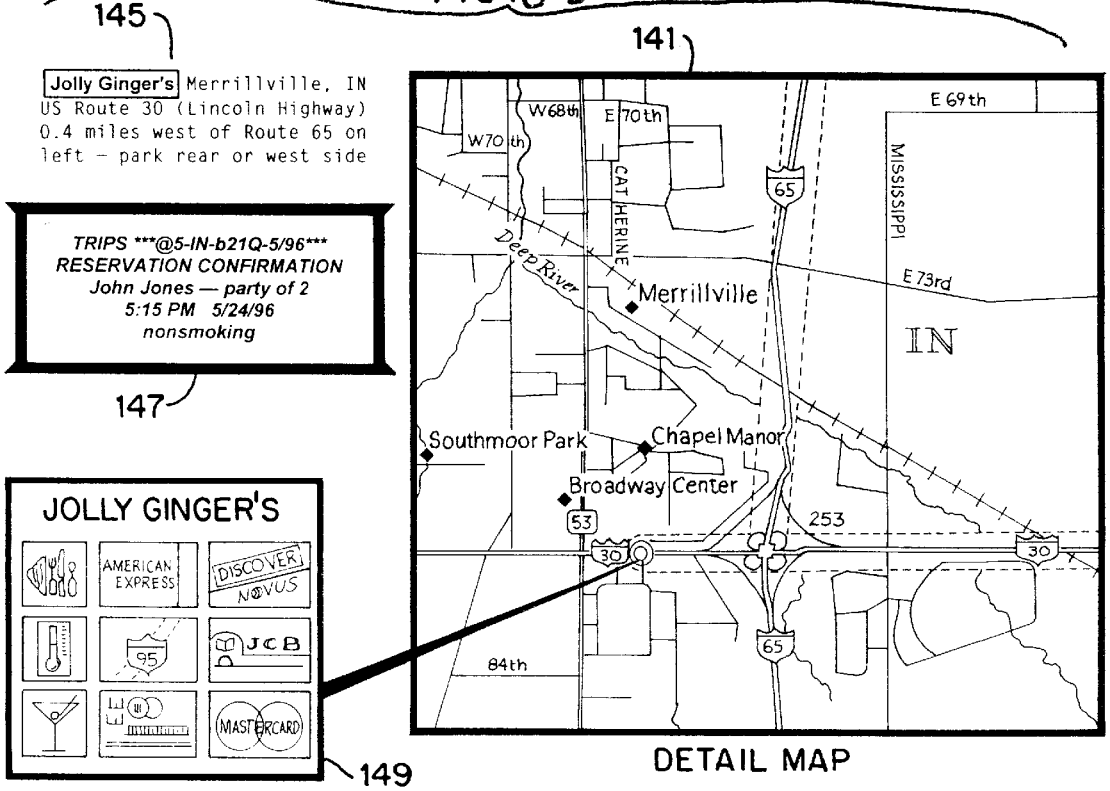
DETAIL MAP

TOPICAL RELATION 701

| I.D. | TYPE | SUB-TYPE | NAME | SUPPLEMENTAL INFORMATION |
|---|---|---|---|---|
| 013 | HOTEL | BIG CHAIN | S. PLACE HILTON | ROOM PRICES, STREET ADDRESS, E-MAIL |
| 492 | CAMP | STATE PARK | WETLAND PARK | PHONE NUMBER, STILL PHOTOS |
| 005 | EAT | PIZZA | MAIN ST. DOMINO'S | MENU, USER COMMENTS |
| 079 | POLICE | LOCAL 911 | N. PLACE POLICE | 911 BUTTON, PHONE NUMBER |
| 286 | FUN | SCUBA | BOB'S DIVE BOAT | VIDEO + VOICE OVER, PHONE NUMBER |
| 891 | THING/ NATURAL FEATURE | CORAL REEF | BLUE WATER CAY | PHOTOS, VOICE, TEXT |

GEOGRAPHIC RELATION 703

| I.D. | LAT.#1 | LONG#1 | PLACENAME | MAP SYMBOL | DATA SOURCE |
|---|---|---|---|---|---|
| 005 | 48°24.6' | 65°30.3' | NORTH PLACE | PIE WEDGE | GEOCODED |
| 492 | 48°24.8' | 65°32.4' | NORTH PLACE | BLUE TRIANGLE | DATABASE |
| 286 | 48°22.2' | 65°30.3' | SOUTH PLACE | BOAT + FLIPPER | GPS |
| 013 | 48°22.4' | 65°31.4' | SOUTH PLACE | RED TRIANGLE | GEOCODED |
| 079 | 48°22.7' | 65°33.6' | NORTH PLACE | BLACK BADGE | DATABASE |
| 891 | 48°21.2' | 65°33.5' | SOUTH PLACE | GREEN CIRCLE | GPS |

FIG 7A

TEMPORAL RELATION 705

| I.D. | DATE #1 | TIME#1 | SPEC#1 | DATE#2 | TIME#2 | SPEC#2 | EVENT | ITINERARY DATA |
|---|---|---|---|---|---|---|---|---|
| 005 | MON-SUN | 10AM | OPEN | MON-SUN | 10 PM | CLOSE | HOURS/OP. | ETA 5PM 6/1/97 |
| 005 | MON | 10AM | — | THU | 10 PM | 10% OFF | COUPON | — |
| 492 | MAY 1 | — | START | — | OCT. 1 | END | SEASON | — |
| 286 | WED-SAT | 11 AM | DEPART | WED-SAT | 4 PM | RETURN | TRIPS | JUNE 1,1997 RES. X2 |
| 079 | ALL | ALL | OPEN | ALL | ALL | OPEN | HOURS/OP. | — |
| 013 | MAY 7 | — | START | JUNE 8 | — | END | VACANCY | — |
| 013 | MAY 12 | 8 AM | START | MAY 15 | 3 PM | END | MEETING | CAR CLUB MEETING |

ACCOUNTING/TRANSACTIONAL RELATION 707

| I.D. | GOODS/SERVICES | PROVIDER | RES | TERMS/CONDITIONS | COUPONS |
|---|---|---|---|---|---|
| 005 | EAT [PIZZA] | MAIN ST. DOMINO'S | — | Takeout/Available seats | 10% OFF MON-THU |
| 286 | FUN [WATER] | BOB'S BOAT INC. | + | $50 per diver per trip | |
| 492 | LODGING [CAMP] | STATE PARK SERV. | + | $15 R.V./$10 Tents/day | |
| 013 | LODGING [HOTEL] | HILTON RES. SERV. | + | $75-$100 per day | 15% OFF CAR CLUB |
| 891 | NATURAL FEATURE | n.a. | — | n.a. | |
| 079 | PUB. SAF. [POLICE] | N. PLACE POLICE | — | PUBLIC SERVICE | |

FIG 7B

TRAVEL RESERVATION INFORMATION AND PLANNING SYSTEM

CROSS-REFERENCE TO RELATED APPLICATIONS

This patent application is a continuation-in-part (CIP) of the David M. DeLorme et al. U.S. patent application Ser. No. 08/661,600 filed Jun. 11, 1996, for COMPUTER AIDED ROUTING AND POSITIONING SYSTEM, now U.S. Pat. No. 5,802,492 which is a CIP of the David M. DeLorme et al. U.S. patent application Ser. No. 08/381,214 filed Jan. 31, 1995 for COMPUTER AIDED ROUTING SYSTEM, now U.S. Pat. No. 5,559,707, issued Sep. 24, 1996, which is a CIP of the David M. DeLorme et al. U.S. patent application Ser. No. 08/265,327 filed Jun. 24, 1994 for COMPUTER AIDED MAP LOCATION SYSTEM now abandoned. This patent application is also a CIP of the Keith A. Gray U.S. patent application Ser. No. 08/521,828 filed on Aug. 31, 1995, for COMPUTERIZED ADDRESS LOCATION AND COMMUNICATION SYSTEM now abandoned. All of the cross-referenced applications have a common assignee who is the assignee of the present application. The contents of these related patent applications are incorporated herein by reference.

BACKGROUND OF THE INVENTION

1. Field of the Invention

The present invention relates to systems that permit individuals to make travel arrangements and to plan travel activities, including such systems that are accessible via interconnected computer networks. More particularly, the present invention relates to Travel Reservation and Information Planning Systems (TRIPS) that provide travel information and special offers for goods and services such as accommodations and reservations associated with such areas of interest. Still more particularly, the present invention relates to a completely integrated system enabling an individual to plan, review, locate, schedule and select or execute customized or personalized travel arrangements and activities in association with map displays or other output of travel routes, chronological events, diverse travel topics and geographic points of interest along such routes. In the present invention, all of these capabilities are integrated with a broad range of transactionable offers for goods/services such as transportation or performance tickets and diverse accommodations reservations.

2. Description of the Prior Art

Prior systems for the general purpose of planning and arranging travel from one location to another have been developed by, among others, the assignee of the present application. The assignee's systems are described in the cross-referenced patent and patent applications noted above. In particular, those systems have involved the use of computer-based databases combined with software to create map displays of selectable and variable levels of detail. They also include the capability to selectively plan a trip from one location to another, with intermediate "waypoints" anywhere along the way. As part of that planning, the user of the prior associated systems has the capability to define the route of interest, to observe the location of points of interest and events of interest along the way and within a defined range of the route selected. Those points and events of interest may be observed in a multimedia display arrangeable by the user. Alternatively, points of interest and events of interest, which may be observed on the display at varying levels of detail, may be used to arrange a travel route as a function of interest in visiting those points rather than as a specific function of the route alone. Other features of the assignee's prior related systems include, but are not limited to: 1) the capability to retrieve detailed address locations; 2) coordinate between digital maps—observable on displays at selectable levels of detail—and corresponding paper maps, each having associated grid arrangements for referencing between the two maps; and 3) the capability to communicate map information between remote devices, which remote devices may include Global Positioning System (GPS) sensors and/or transmitters. These and other features are described more completely in the referenced patent and patent applications. While the assignee's noted prior systems provide extensive advantages in the planning of travel, in the observation of points of interest and events of interest along the way, and in the communication of such related information between two or more remote devices, they do not include a completely integrated capability to execute travel arrangements.

There are many systems designed to aid, in a limited way, in the planning and execution of travel arrangements. For many years, travel arrangements have been made for individuals by travel agencies having stand-alone systems with electronic or simple telephonic links to travel providers such as airlines, passenger trains, buses, car rental agencies and the like, and links to travel-related service providers, such as hotels, restaurants, entertainment facilities, etc. People interested in making travel arrangements, and in discovering the availability of activities located relatively proximate to one or more travel destinations, have been required to contact such travel agencies. Under this travel-arrangement method, an individual interested in traveling presented a travel origin and a travel destination and was advised by the agency of the availability and scheduling of travel means for that particular route. Requests for information regarding travel-related services and activities at the destination were handled in a similar fashion. Reservations for the travel and related services and activities were made by the travel agency and the individual was provided with an itinerary and paper materials necessary to conduct the travel, to issue the services, and to conduct the activities. In effect then, the individual was required to rely upon the travel agency for travel-related information and services. Any modifications in travel plans made in this way involved a considerable expenditure of time and effort on the part of the individual as well as the travel agency. Further, it was and is often the case that a particular travel agency may have information for only a fraction of the travel service and activity providers in existence. Under this method it is not unusual for the individual to be unable to completely custom plan a trip, to miss areas and points of interest, or to miss an activity of interest. Moreover, once the traveler is at a particular destination, or at an intermediary point along the way, the travel agent is of limited usefulness, particularly when specific information about, for example, emergency services or particular goods or services, is required on an immediate basis.

Another problem associated with travel arrangements made by parties other than the individual taking the trip is the paperwork involved. It is not unusual for there to be errors in the materials provided, for the materials to be delivered in an untimely manner, or for the individual to be required to travel to a service provider location—such as an airport—in order to obtain the materials, such as the airline tickets. This can be a significant inconvenience. These paperwork problems tend to be restricted to airline tickets and hotel reservation confirmations. However, a less developed but perhaps more important type of paperwork may be vouchers and various types of coupons associated with entertainment and activity sites located proximate to a travel destination. Such materials are even more inaccessible to the traveler who has yet to reach the destination. Moreover, activities coupons, for example, are distributed through a wide array of sources, such as direct mail, magazines, newspapers, and the like, that are not particularly easy for the user to obtain. It is apparent then that as the number of materials providers increases in association with travel plans, the number of errors associated with such materials will also increase. In addition, it is often difficult to keep track of a disparate set of papers, each with its own level of importance. While barcoding has become more widely used in many areas in recent years in order to reduce paperwork, its usage has been less than widespread in the travel field. "Ticketless travel" eliminates paper ticket documents but provides the consumer with a number or an alphanumeric code for confirmation and access.

In recent years, individuals have gained greater direct access to information related to travel service providers via interconnected computer networks defined broadly as "the Internet." Such information includes airline schedules, flight availability, and limited ticketing, hotel locations and telephone numbers, and entertainment location information. However, in order to reserve a seat on a plane, or a room in a hotel, the individual must still make separate contact with the particular provider and make the reservation based upon that provider's distinct reservation system. For example, if an individual wishes to travel from New York to Los Angeles via plane, he or she can get "online" and discover flight schedules and seating availability through an airline-schedule service provider, much as a travel agency does. However, in order to reserve a seat on a flight of interest, the individual commonly must make either direct contact with the airline service or some agent of the airline service and arrange payment, typically resulting in receipt of a paper output—the flight ticket—that must either be picked up by the traveler, or that is delivered to the traveler. Any attempt to integrate different aspects of a travel plan—a flight, a rental car, a hotel, entertainment activities, for example—must either be completed through a diligent search of a plurality of online service providers, or a trip to the aforementioned travel agent. Given the continually expanding scope of online services, the former approach is becoming increasingly difficult. Moreover, it fails to resolve the problem of creating an array of transactions that are conducted through a plurality of service providers and that must be coordinated in an organized manner. The present online travel planning capability also fails to eliminate the need to obtain documents such as itineraries, hotel bookings, flight tickets, activity reservations, etc., from multiple sources.

Examples of online systems apparently designed to give users greater flexibility in discovering travel possibilities include a reservation access system named Internet Travel Network located at http://www.itn.net, which includes access to an online booking system provided by Casto Travel located at http://www.casto.com. Both providers give browsers the capability to link up with many travel service providers who may or may not choose to make their services available to the browser. The booking system also permits "ticketless" travel, but ticketing must still come through a third party provider with separate fees. Microsoft™ at http:\\www.expedia.msn.com offers a similar Internet Web Site "travel agency" to book flights, hotel rooms, and rental cars; to participate in travel forums; and to browse assorted news, weather, currency, multimedia guidebooks, and photographs. These types of online systems have some capability in permitting the user to gain access to a wide array of services, including travel and activities; however, as earlier noted, this capability is not easily enacted in that the user must go through a considerable search process in order to gather information regarding topics, events, available goods or services, and/or points of interest at the travel destination or along the travel route, or related to the user's selected travel time frame. Other Internet sites concentrate on local directory listing information but do not provide readily useable travel planning, itinerary, routing and/or booking capabilities—e.g., CitySearch™ and MetroBeat™ at http:\\www.citysearch.com and Bigbook's Internet Yellow Pages at http:\\www.bigbook.com.

In addition to the problems associated with an individual's attempt to carry out his or her own travel planning through existing separate online systems, there is the difficulty in appreciating the travel route and the activities, and points of interest along the way. That is, when an individual makes arrangements to travel to a destination, it is not unusual for that to be that individual's first visit to that location. As a result, there are any number of unknowns he or she must deal with, including, but not limited to, the hotel accommodations, the activities available, and—perhaps most importantly—how to get from the airport, train station, or bus terminal to an ultimate destination. For the first problem noted it is therefore desirable to have a visual display or other travel information output of the area to be visited, as well as previews of the accommodations and/or any points of interest in the area, scheduled events in the area, topical information, and the availability of accommodations, goods and/or services available in the area. There is no presently existing completely integrated system using such individualized multimedia presentations in a travel planning system. For the second problem, a "customizable" map or other travel plan output to which the user can attach selected travel information from such previews would be particularly useful. In that regard, it is to be noted that there are several digital map systems that may be accessed via storage means, including, but not limited to, compact disk-read only memory (CDROM) or PCMCIA cards.

As specifically noted in the cross-referenced COMPUTER-AIDED ROUTING SYSTEM application, a variety of computer hardware and software travel planning aids are currently available on the market primarily for vacation and recreational travel planning. A number of the travel guide software packages focus on National Parks of the United States or recreational tours and activities with prepared travelogs or prepared assemblages of multimedia travel information on the different recreational geographical locations or recreational activities. Such travel software programs are exemplified for example by the America NavigaTour™ MediAlive™ multimedia travel guide produced by CD Technology, Inc.; the Great Vacations™ Family Travel Guide by Positive Software Solutions; the Adventures™ CDROM Program for worldwide adventure travel by Deep River Publishing, Inc.; and National Parks of America, a CDROM product of Multicom Publishing, Inc. which contains a directory of all National Parks in the United States.

Rand McNally produces a software travel planning product under the trademark TRIPMAKER™ for planning a trip by car in the United States, Canada, and Mexico. The Rand McNally Tripmaker™ software also calculates quickest, shortest, and preferred scenic routes for the trip planner. While the Rand McNally product incorporates a database of many points of interest, the multimedia travelog information appears limited to preplanned scenic tours.

Similarly the American Automobile Association in cooperation with Compton's NewMedia also provides travel planning from starting point to destination point with stopping points in between. The CDROM product contains a database of travel information. However the multimedia information available from the database appears limited to "suggested routes of travel," again limiting user choice.

In each case it appears that travel information from multimedia sources is preassembled by editors so that the user or trip planner is limited to "canned" or prepared multimedia travelogs of prescribed, suggested, or preplanned tours. In addition, the user is limited to information fragments about this or that particular object of interest or this or that particular place. There is no opportunity or user capability of selectivity in constructing a user customized travelog of assembled multimedia information for previewing a particular user determined route of travel. The user is relegated to travelogs and multimedia assemblages prepared for routes and tours proposed by other editors. Moreover, there is no provision for the capability to permit an individual or group to execute the travel plans once developed. That is, a user may observe a travel sequence of interest on a computer display, but is then required to one or more travel service providers to enact the plan. Further, travel arrangement materials must be obtained from those providers, or even from an intermediary.

Some attempts have been made to give individuals and groups direct access to travel service providers. In particular, U.S. Pat. No. 5,237,499 issued to Garback describes an individual-accessible planning system that permits a user to develop travel arrangements through linkage to service providers and to ticket providers. However, there is no capability to observe the travel location on a digital display in conjunction with the development of the travel arrangements. Moreover, these travel arrangements tend to be fixed based upon pre-set travel destinations. That is, the user cannot create a customized travel plan and execute that plan through a mix of travel arrangements. Garback can only provide the materials necessary to travel from point A to point B—if those points are airports—and to get the basic car and hotel that most travelers require. There is no provision for planning travel to locations where there is not an airport. There is also no provision for detailed information—multimedia or otherwise—related to points of interest at point B, or at any intermediate point.

U.S. Pat. No. 5,021,953 issued to Webber et al. describes a system that provides the user with information regarding airline flight options. In particular, the system is directed to weighting various flight options by expense, convenience, and availability, and giving the user travel possibilities on that basis. In a sense, the Webber system is customizable; however, it is specifically restricted to making flight arrangements and so the customizing is limited to that part of a trip. For this reason, the Webber system suffers from the same limitations associated with the Garback device.

In general, these prior computer reservation services (CRS) are basically limited to commercial airline reservations. As a minimum input threshold, the prior CRS require that the user knows and enters their intended departure point, final destination, any intermediate stopovers, plus the travel time frame. Existing Internet travel information sites have taken these same limitations—poorly compensating in some cases by giving the user access by indiscriminate "hot links" to an overwhelming variety, number, and selection of other Internet sites containing undifferentiated and uneven amounts of travel information along with circular hot links to similar sites. These systems offer little or no computerized aid to answer, or even to ask, fundamental common-sense travel planning questions—such as when, where, what to do or who to visit, how to get there and back, and/or how much do comparable travel arrangements or itineraries cost.

It is to be noted that other travel arrangement systems have been described. They, along with the prior-art systems previously discussed, fail, however, in that they do not provide a complete access system that gives the user all of the information of interest and materials required when travel is involved. Moreover, they fail to provide a system that takes into account all of the variations in user background that influences travel choices. While this variability has not been completely addressed, there are several general attributes in a complete travel planning and execution system that would address that variability. In general, it is of importance to a user to be able to combine two or more of the following options within a single integrated travel/activity planning system: 1) consider topics, activities, or things to do apart from a specific destination; 2) set the travel destination or destinations; 3) set times/dates for the start and finish of a possible trip; 4) determine the mode or modes of travel required to reach those destinations; 5) discover information regarding points of interest and activities along the travel route and/or at the destinations; 6) discover information on events of interest, scheduled performances, meetings and the like as related to specific dates/times, topics and/or places; 7) get information on transportation, lodgings and other accommodations available at the destinations and/or at specified dates/times; 8) make the reservations associated with the travel, the accommodations, and the activities available, plus take advantage of diverse, special offers for goods/services from participating third-party providers; 9) get the documentation necessary to carry out the travel and related activities, such as tickets, ticket vouchers, price discount or extra service coupons, etc.; 10) observe the travel route at various levels of magnification, the destinations, events of interest, travel topics, and points of interest located on a map display; and 11) get travel plan output such as a paper printout of the map display or equivalent text, audio, electronic or other output that may include information regarding the points of interest as well as physical documentation or equivalent codes that may be the tickets, etc.

Therefore, what is needed is a system with such complete integration of all aspects of travel/activity required by a user. Such a system should be capable of permitting a user to control and conduct such travel and/or activities as a function of four basic questions in any order and in any combination. Those questions are: WHERE?, WHAT?, WHEN?, and HOW?

SUMMARY OF THE INVENTION

It is therefore an object of the present invention to provide a new Travel Reservation and Information System (TRIPS) that permits a user to custom-define and examine a travel route and/or plans based upon answers to the questions noted above. It is also an object of the invention to provide a TRIPS that is capable of determining, reserving, and/or ticketing locations along a travel route between a user-selected travel origin and travel destination, including user-selected waypoints of interest along the way. A feature of the invention is that the user can construct a highly selective travel route that incorporates waypoints selected by the user and establish a computer link with state-of-the-art computerized ticket and reservation systems, communications, and software. Another object of the invention is to provide TRIPS software capable of presenting map and ticket documents that embody the user-defined travel route so that the documents may be printed—e.g., laser printed on perforated sheets of cardstock. The printed map and ticket documents may include reservation codes which are machine readable for automated processing.

Still another object of the invention is to provide TRIPS software permitting users to compare reservation data and "shop" for ticket prices. The TRIPS software incorporating state-of-the-art computerized accounting and transaction processes. A feature of the invention is that the trip planner is no longer relegated to the prescribed or suggested routes, tours, and pricing of travel agents. Nor is the trip planner limited to a mail delay (such as when ordering tickets by telephone) or tedious price checking with an unmanageable number of ticketing agents. Rather, consumers and providers are saved the duplication and inconvenience of printing, issuing, distributing, presenting, and processing any separate reservation requests or paper documents.

The user constructs a user-defined travel route including transportation routes, waypoints, and POIs within a region of interest along the travel route. The TRIPS software responds by assembling a user-customized travelog or sequential assemblage of multimedia information for previewing the entire trip. The travel route including transportation routes, waypoints, and objects or points of interest can then be changed if necessary to suit the user preferences and choices. The user can then reserve, purchase, and print a ticket—while printing the customized travelog—all from the same computer terminal—e.g., stand-alone PC, networked PC, handheld personal digital assistant (PDA), or "dumb" network terminal.

An advantage of the invention is that travel planning can be optimized in an iterative process which incorporates reserving, purchasing, and ticketing the planned travel quickly and personally. The user constructs a travel route and at the same time constructs a customized travelog for previewing the initial travel route. On the basis of the multimedia preview of the initial travel route, the trip planner undertakes revision of the travel route, e.g. by changes in the selected transportation routes, waypoints, and selected POIs. The travel route is recalculated by the TRIPS software through reservation system links and the user-customized travelog is also reconstructed for further preview. Further refinements can follow in subsequent iterations until a satisfactory travel route is achieved and a ticket purchase is made though ticketing system links. All accounting and transaction information is tracked by the TRIPS software and a hard-copy ticket and map are then immediately printed for the user.

The present invention is specifically designed to account for the variability in backgrounds, interest, and situations associated with each traveler. In addition, the TRIPS invention manages diverse travel planning needs, focusing and shaping individualized, computer-aided information processes around flexible combinations of place, time, topic and transaction inquiries and responses. Prior-art automobile routing software largely fails to address alternate transportation modes, and fails to provide substantial scheduling and chronological information and functions. As earlier noted, the prior computer reservation services (CRS) are limited to commercial airline reservations.

In order to accomplish these results, the present invention provides TRIPS for use with a digital computer device, a digital computer display, if desired, and a computer link. The computer link may be through the Internet or directly to a TRIPS online facility. A set of electronic maps is provided for presentation and user review on the computer display. A TRIPS database is accessible online or from a memory storage device and contains geographically locatable objects (loc/objects), attachments of supplemental points of interest (POIs), and attachments of scheduled events of interest (EOIs). The POIs and EOIs are organized into a plurality of types for user selection of loc/objects or POIs individually and by type. The loc/object or POI types constitute electronic overlays of the database for display over the electronic maps on the computer display. As used in this specification and claims, the phrase "points of interest" or POI's is generally used to refer to loc/objects for which multimedia information is available for describing the POI's and presenting the points of interest in a multimedia travelog as hereafter described. Similarly, the phrase "events of interest" or EOI's is generally used to refer to scheduled events for which multimedia information is available for describing the EOI's and presenting the events of interest in the multimedia travelog.

Typically, the TRIPS database is a Geographical Information System (GIS). Such a GIS manages data in the GIS database in relation to geographical coordinate locations of a selected geographical coordinate system. Thus, the TRIPS database manager relates points of interest and any other loc/objects of the database with particular locations on or near the surface of the earth in terms of coordinate locations such as latitude and longitude. The multimedia information hereafter described is similarly identified with the coordinate location of the subject POIs.

The TRIPS software constructed for user travel planning using the electronic maps presented on the computer display permits user selection of a travel origin, travel destination, and desired waypoints between the travel origin and travel destination. The TRIPS software calculates, delineates and displays a travel route between the travel origin and the travel destination via the selected waypoints. In conjunction with the reservation system, the travel route is calculated according to user choice of the shortest travel route, quickest travel route, user determined preferred travel route taking into account seat (boat, plane, train, automobile, . . . etc.) availability, pricing, and departure/arrival times. The reservation system is not limited to modes of travel. Lodging, restaurant, cultural event, sporting event, theme park, tour, recreational, and other types of reservations are also accomplished.

The TRIPS software permits the user to compare and "shop" for ticket/reservation prices by incorporating a transaction subsystem to handle inquiries, offers, bids comparisons, options and proposals to buy and sell, commitments and cancellations, billing, credit account validation, debit transfers, and "cyber-money" transfers. Typically, a TRIPS-generated itinerary document including maps and tickets will be printed on a laser printer or some similar printing device. A TRIPS-generated map/ticket document would be printed with appropriate encoding—e.g., bar codes—on the ticket parts, thereby allowing users to board airline flights, obtain rental cars, gain entry to a theater show, and more, all without having to wait in line, purchase, and/or present a separate ticket. The user would simply pass the map/ticket document over a scanning device which would "read" the bar code in order to perform appropriate recordkeeping and grant access. While bar-coding is suggested, other techniques may be used such as utilizing a unique numerical code which can be read by a more literate scanning device or the magnetic ink technology used for automatic check processing.

A feature and advantage of TRIPS is that the travel planner can preview on the computer display a travelog particularly customized for the user-defined travel route including both multimedia information on the transportation routes, waypoints, and POIs selected by the user, and actual reservation information on availability, arrival/departure times, pricing, . . . etc. The trip planner is neither constrained to viewing "canned" or preselected multimedia assemblages and travelogs for suggested routes planned by other editors, nor limited to a narrow choice of reservations. Rather, TRIPS delivers a user-customized travelog or multimedia information assemblage directed specifically to the user-defined travel route including the user-selected transportation routes, waypoints and POIs with convenient and immediate reservation and ticketing of the user-determined travel plans.

As a result of this preview, the trip planner can revise the travel route and travel plans. The TRIPS software then recalculates the travel route and allows user review of reservation information. This affords the user further opportunity for selecting new or different POIs in the newly defined region of interest along the new travel route. TRIPS further provides for previews of temporal, i.e., scheduled events of interest (EOIs)—as well as transactionable goods/services coupons or offers—found in the user-defined geographic area of interest. A new multimedia travelog preview is assembled corresponding to the new travel route and the process is repeated until the user achieves a satisfactory travel route and travel plan with the user-preferred reservations based on the iterative trip planning process and multimedia previews made available by the invention.

A feature of the invention is that one or more points of interest in the user-defined region of interest along a travel route can be converted by the user to waypoints on a new travel route. The POI status therefore changes from a possible side excursion off the main travel route to an actual waypoint on the new or revised travel route. The user therefore has available a wide selection of possible sites for defining a travel route and travel plan including route intersections, named places on the electronic map, various modes of travel, numerous POIs that may be reserved (e.g. theme parks, restaurants, or cultural tours), and the array of geographically locatable objects about which there is multimedia and/or reservation information in the TRIPS database.

In the preferred example the TRIPS software is constructed to display a user-customized map of the user-defined travel route. User-selected POIs and modes of transportation in the user-defined region of interest are listed along one side of the map with travel mode labeling and pointers to respective POI locations in the region of interest. Travel directions for the travel route are listed along the other side of the map with pointers to respective intersections corresponding to directions along the travel route. Preferably the map is vertically oriented with the travel origin at the bottom of the strip map and travel destination toward the top of the strip map with adequate spacing for ticket information and bar coding. An advantage of this arrangement is that the strip map and travel route are always oriented in the direction of travel and the right and left directions coincide with actual right and left directions.

In the preferred example the digital computer also incorporates a printer and the TRIPS software is constructed for printing a hard-copy map/ticket of the user-customized travel plan. This hard-copy show the travel route, list of POIs and pointers along one side of the strip map, list of directions and pointers along the other side of the strip map, itinerary of travel, ticketing information, and bar coded reservation and purchase information. The printed hard-copy is preferably vertically oriented also with the travel origin at the bottom and travel destination toward the top and provides an easily viewable area for reservation/ticketing information with a bar code near an edge.

The electronic maps, TRIPS database, and TRIPS software are typically stored on a CDROM and the digital computer incorporates a CDROM drive. The TRIPS software may include a replace function for updating the electronic maps and TRIPS database on the CDROM with replacement or supplemental information from a remote database (e.g., online database of remote server), global positioning system (GPS) receiver, PDA or another memory device.

In the preferred example, the TRIPS software is composed of a reservation-information-and-planning system linked to one or more travel service provider. The TRIPS user can be provided with communications links for online communication and transfer of reservation data, ticketing data, spatially related data, and software tools for map reading between computers and between users. For example a TRIPS user may communicate with another TRIPS system or user for transfer of user location data and any other spatially related data. In addition to a travel service providing reservation and ticketing data, the TRIPS user can also communicate with external databases, a central communications service bureau, and on-line mapping services for latest information relating to loc/objects, routes, and map modifications, priority messages, etc.

According to another embodiment of the invention, the TRIPS software is coupled to a radio location receiver such as a loran receiver or a GPS receiver for generating signals corresponding to the geographical coordinate location and direction of travel of a TRIPS user. Dead reckoning location systems and hybrid location systems may also be used. The database manager is constructed for displaying on the TRIPS computer display the location, direction of travel, speed and traveling route of the TRIPS user. The GPS receiver loaded with TRIPS data can be used in a separate and independent TRIPS without any databases of loc/objects as a stand-alone system or in combination with the second database and other available internal and external databases for display of selected loc/objects from such databases. A TRIPS user having made reservations and after obtaining a printed map/ticket may then use TRIPS electronic output as downloaded into a PDA or GPS to guide the user during their travel. Alternatively, the TRIPS electronic output may be sent on to an accommodations provider for making of further travel plan reservations. TRIPS users can exchange data for display, reservations, ticketing, or other use such as user location information, departure/arrival time information, and ticket pricing information. This is accomplished over a variety of communications links, wired or wireless, adding a communications dimension to the TRIPS.

In general then, the TRIPS invention provides flexible, selective input for a great variety of simple or complex sequential travel planning inquiries, as motivated and suited to the requirements, preferences and idiosyncrasies of individual TRIPS users. No prior art system handles even a modest portion of the whole range of most obvious user travel planning unknowns, problems or questions—like when to go where for what and how? Rather, prior art commercial airplane flight computer reservation systems (CRS), for example, assume users have already selected a travel time frame, departure point and destination. In other words, for the user to access any flight reservation information at all, prior art CRS require initial input of times and places for the start and finish of a potential flight. No provisions are made to ask or answer such typical user travel planning questions as follows. When is Bob Dylan, or the Bolshoi Ballet, or the New York Yankees, or migrating whooping cranes, or the new 1997 Ford Taurus GL, or President Bill Clinton, scheduled to appear? Where can we go on a family vacation to enjoy certain favorite activities? Or where in New England can one buy/repair a specific brand/model of camera? What can I do for entertainment, religious worship, cultural enlightenment, or other pastimes, during leisure hours between the scheduled appointments on my upcoming business trip? How much will it cost for tickets, accommodations and transportation for our proposed travel plan? The TRIPS invention, however, enables TRIPS users to compose inquiries and seek responses to many, many such common travel planning issues by means of flexible, adjustable, selective, integrated, successive utilization of the HOW?, WHEN?, WHERE? and WHAT/WHO? main input menus, related TRIPS sub-menus and/or other equivalent input means—as detailed hereinafter.

In addition, as earlier indicated, flexible, variegated operation is an important ingredient of the TRIPS novel capability to produce "customized" or individualized outputs that reflect and record selective usage of the TRIPS invention by different individuals in pursuit of personal travel objectives. Such customized or individualized import or meaning for different users is not necessarily expressed by differences in the content or structure of the resulting output. The entire significance of a particular item of TRIPS output for an individual user often stems, at least in part, from the specific combination of diverse travel information produced by the specific sequences of related TRIPS processes employed by the individual user during the particular TRIPS travel planning session in which the resulting output item was produced.

This capability is particularly applicable when the user seeks to make travel information inquiries while en route; e.g., from a remote location such as a moving vehicle. Such inquiries include: requests for emergency services, immediate reservations for lodging, meals, or transportation connections, or travel directions. In this regard the present invention provides a comprehensive travel planning service that can handle immediate requests from travelers en route or at remote locations, as well as more contemplative advanced planning.

Further, TRIPS output in various forms or media can be coordinated or correlated—e.g. printed paper maps used in conjunction with text, graphic and/or audio digital output by means of a system of named map grids. These various forms of TRIPS output complement or replace, and improve upon the conventional, loose and disparate sets of travel papers, documents and related paraphernalia typically used before a trip for planning and preparation, as well as during a journey for orientation, reference and access—such as crumpled maps with a jumble of tickets, disorganized notes, scattered itineraries, address or appointment books, more or less up-to-date brochures and guide books, and so forth. From digital displays interactively developed with user input, previews and selections, TRIPS prints out integrated, individualized travel plans on paper media including: built-in tickets and/or reservation confirmations with alphanumeric or bar codes for automated recognition; usefully scaled maps showing pertinent details; attached EOI/POI data; related travel directions; important contact names, numbers, and addresses; plus supplemental information selected by the user on locations, events and topics—organized into a convenient, orderly, compact arrangement keyed to the geographic and temporal dimensions of the user's planned route of travel. TRIPS output also includes the online transmission of the user's reservation requests, ticket purchases, changes, credit/payment arrangements, and so forth, directly to third-party providers participating in TRIPS. For use in conjunction with, or in lieu of, various conventional or TRIPS travel papers, TRIPS travel plan output is provided in various digital electronic formats—for example, "ported" into various compact, easily portable, "shirt-pocket" or hand-held, electronic computer devices and/or transmitted to specialized remote or in-vehicle TRIPS computer devices, as detailed hereinafter.

The invention also provides a new travel reservation information and planning process using a digital computer with computer display and electronic maps in combination with a travel service provider for processing custom travel plan and activities associated with travel. The process also uses TRIPS software for user travel planning. The process steps of the invention include providing user access to a database of mappable geographic information designed to produce a user-determined digital map on a display related to a user-determined travel plan. Most importantly, the process steps further include linking travel information associated with the geographic information and making the travel information accessible to the user. The process proceeds by making reservation information and materials associated with services or goods available from one or more travel service providers accessible to the user. A critical feature of this process is that it provides the user with an useful output associated with the travel plan not found in prior processes.

According to the process, further steps include linking the digital computer with the database via a modem for remote accessibility. The output of the process may be a map/ticket combination with machine readable encoded ticket and reservation information. The output may also include travel materials such as, but not limited to, airline tickets, POI displays, hotel couchers, restaurant coupons, and event tickets. The process may further accomplish linking and electronic data transfer between the digital computer and another digital computer, a PDA, or a GPS receiver. Other features of the system and process are set forth in further detail in the following specification and accompanying drawings.

BRIEF DESCRIPTION OF THE DRAWINGS

FIG. 1B illustrates preferred TRIPS "map ticket" travel plan output—as provided in electronic, hard copy or other media.

FIG. 7 represents relational and relevance functions among the TRIPS Subsystems.

DETAILED DESCRIPTION OF THE PREFERRED EMBODIMENTS OF THE INVENTION

Figure 1A:
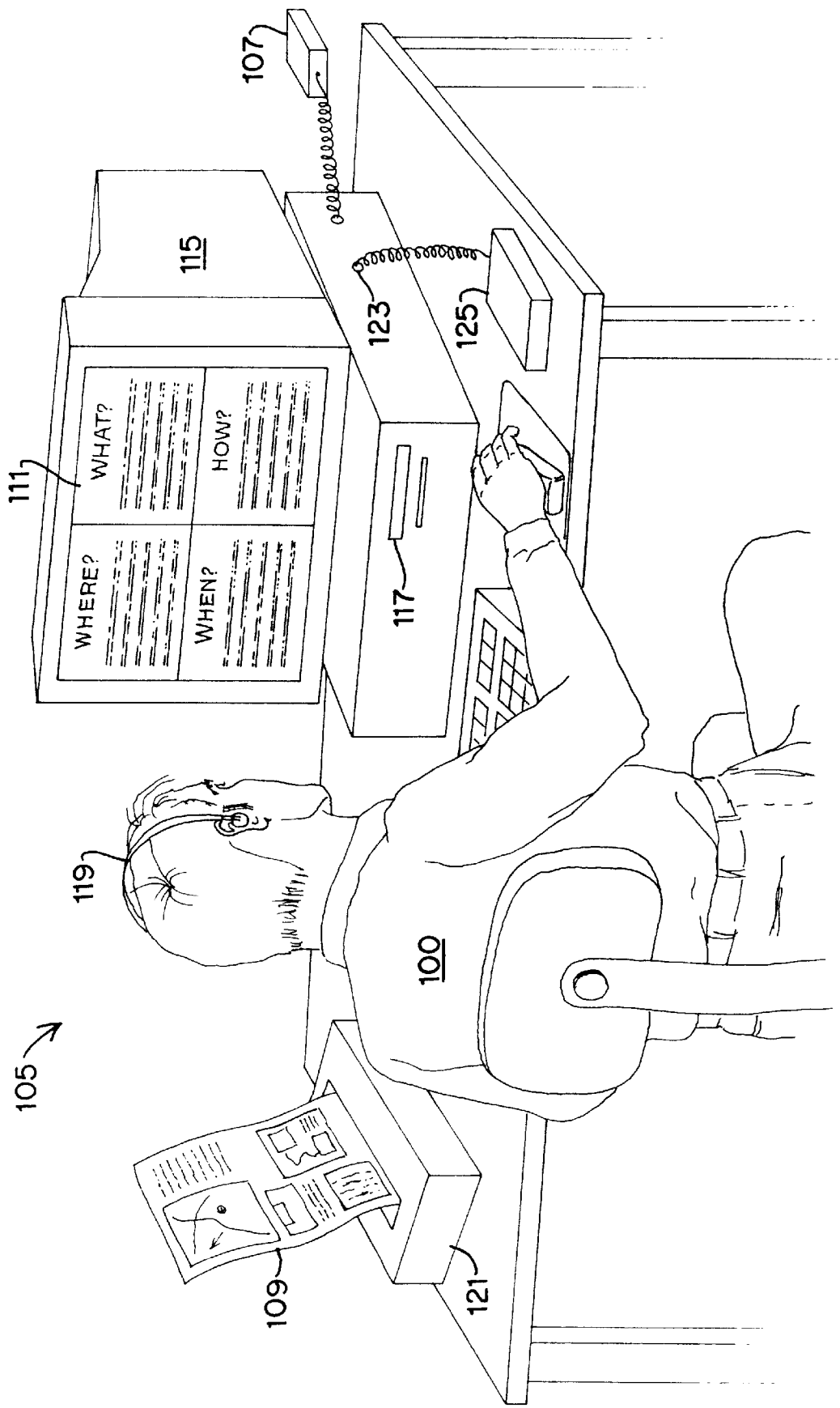
FIG. 1A is a diagrammatic perspective view of an end-user engaged in a typical individual TRIPS travel planning session, or episode of use, according to the present travel reservation information planning system invention.
Figure 1C:
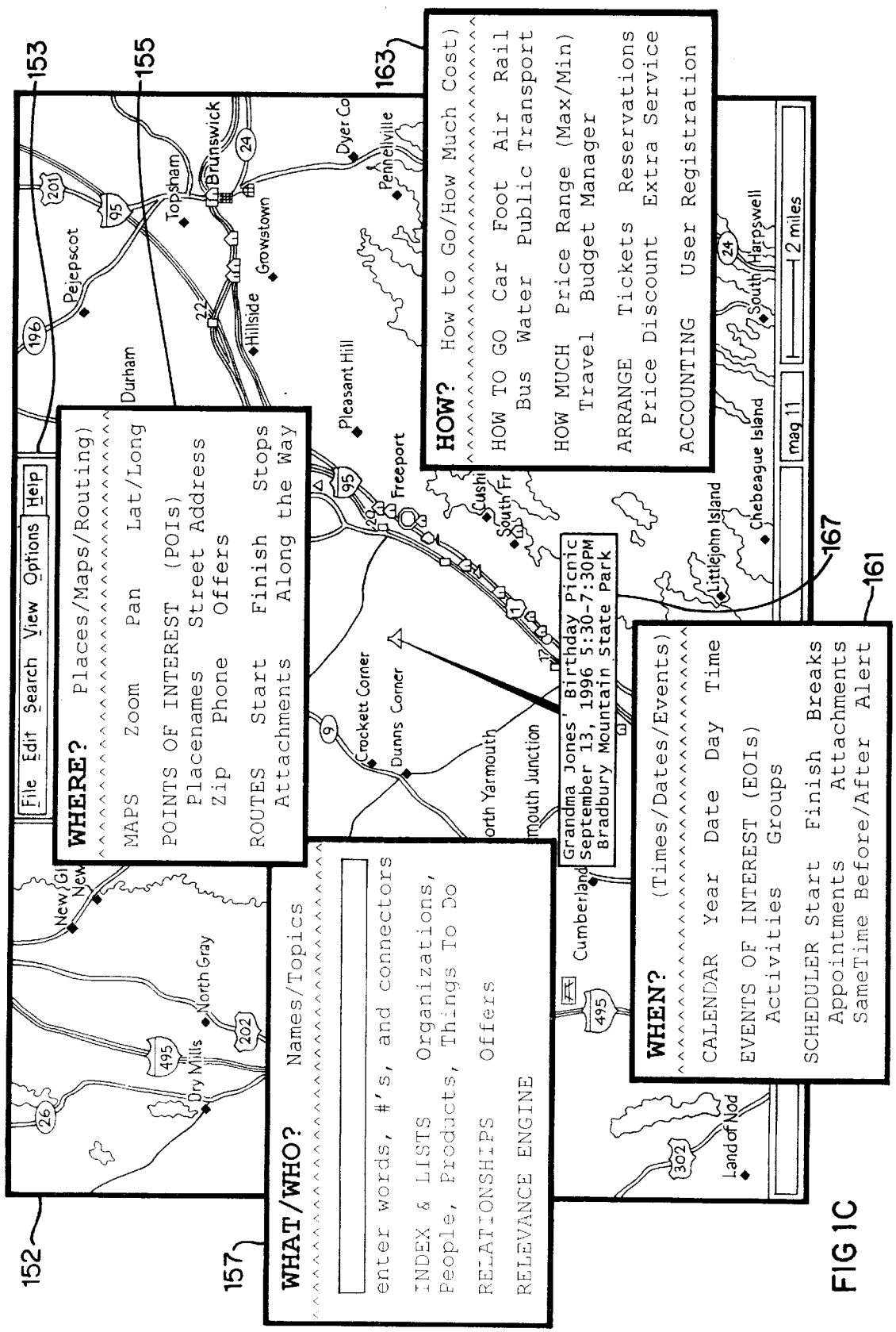
FIG. 1C depicts a preferred TRIPS geographic travel planning graphic user interface or GUI display with WHERE?, WHAT/WHO?, WHEN? and HOW? main input menus and related sub-menus.

FIGS. 1A, 1B and 1C illustrate a typical use episode—plus preferred outputs and inputs—for a computerized online, interactive, Travel Reservation Information Planning System or TRIPS, according to the present invention. In FIG. 1A, a home user or retail consumer 100 is engaged in the midst of a TRIPS computer-aided travel planning session on a desktop personal computer (PC) 105 with a computer communications link 107. An example of a TRIPS "map ticket" output is printed out at 109, and the user 100 now faces the TRIPS main input menus at 111, perhaps preparing to plan another trip or to revise his prior travel plan. More details on TRIPS output—which can also be digital or various mixtures of printed and electronic output—are provided hereinafter, particularly relative to FIG. 1B. A preferred TRIPS user input menu 111 configuration is described hereinafter with reference to FIG. 1C.

FIG. 1A

In FIG. 1A, the retail TRIPS user 100 is engaged in travel planning on a desktop PC 105, which has at least one computer communications connection or modem link 107 with one or more private or public computer networks such as the Internet. Links or distributed communications among computers are preferred for online access to updated TRIPS information and functions—as well as interactive communications with one or more third-party providers of diverse travel information, reservation, accommodation, transportation, ticketing, and/or other travel-related goods/services. Limited TRIPS embodiments, however, could be provided wholly on tangible media (e.g., by CD-ROM at 117) for use on stand-alone computers or local area networks. For example, hotel chains, state tourism bureaus, or local chambers of commerce could publish TRIPS embodiments wholly on disk media—as digital travel brochures—for planning trips, printing maps, discount offers, trip directions and other such information about a limited range of attractions, events or seasonal activities confined exclusively to "their" accommodations or local venue.

For more comprehensive travel planning, the preferred TRIPS embodiment shown in FIG. 1A provides information, functions and interactive sessions by a combination of online or distributed software working in concert with locally installed TRIPS software data and capabilities. For example, basic enduring mapping functions and data can be provided on CD-ROM at 117, which reduces delays involved in online transmission of masses of graphic mapping data. Along with these mapping capabilities, the CD-ROM product, typically purchased by phone order or in a retail store, also includes a subscription offer, user instructions and automatic set-up program, inviting and facilitating easy connection and interaction with authorized, compatible online TRIPS services. The CD-ROM product offers attractive maps and functionality as a stand-alone product—readily enhanced with updated and "real-time" travel information and services via distributed computer communications.

Thus, the preferred TRIPS embodiment, shown in use in FIG. 1A, comes partly on tangible media, for example, as a North American Atlas on CD-ROM with a TRIPS "starter" kit. This "starter" kit encourages and eases online connection(s) with one or more TRIPS service providers, via a modem link 107, typically over the Internet. Once online, the preferred embodiment lets the user "view" or download updated TRIPS map data, functions and timely, topical travel information. The user can make reservations and buy various tickets in "real-time" online—and download "today's" special discount offers from hosts of participating restaurants, hotels, retail shops, car rental agents, outdoor expedition outfits, or other third-party providers of goods/services throughout the United States, Canada and Mexico. When needed, TRIPS user inquiries can be processed online or via computer communications for immediate treatment and response. In sum, the FIG. 1A preferred embodiment facilitates access to current information and "real-time" services online—while also providing for rapid display of updated information in conjunction with locally installed and deployed complex graphics (e.g. dynamic, multi-scale map displays)—and/or multimedia previews of updated or supplemental information about places, events, topics, and/or special good/service offers.

Alternatively, all TRIPS functions, data and services can be provided entirely online (i.e. without significant stand-alone software components)—for example, from a central TRIPS service bureau, or by means of a TRIPS Internet World Wide Web Site. Such purely online TRIPS embodiments can be implemented utilizing recent advances in distributed applications, "agents" or online "applets" developed in Java, or equivalent computer languages—plus other state-of-the-art software enhancements for online or Internet usage.

The consumer or user 100 in FIG. 1A is typically accessing TRIPS at home or work using a state-of-the-art desktop PC computer 105, for example, including Intel 386 to 586 CPU or the equivalent, ample RAM and hard drive capacity plus standard input devices like keyboard and mouse or equivalents (not separately labeled in FIG. 1A). The preferred embodiment desktop PC platform in FIG. 1A includes a visual display or CRT 115, a CD-ROM drive 117, speakers or audio output for sound/voice 119 and a printer 121. Among other optional peripherals not shown in FIG. 1A, TRIPS user platforms can also include text/graphic scanner or reader input, touch-screen technology, voice recognition/synthesis equipment and other input/output devices.

TRIPS can also work with alternative end-user hardware platforms; e.g., networked work stations; "kiosk" information terminals linked to a central server; portable laptop, notebook, in-vehicle, or handheld personal digital assistant (PDA) portable computer devices typically equipped with a wireless communications and/or user location, e.g., Global Positioning System (GPS) capabilities. TRIPS can also be provided via "smart Cable TV" interfaces that combine simplified PC functionality, input/output with a mass-market "home" television appliance. Moreover, TRIPS may be implemented on a relatively low-tech PC functioning primarily or solely as an Internet or online travel reservation information and planning system terminal in the user's home or place of work, or even in the user's vehicle or handheld at a remote field location.

FIG. 1A offers a perspective view of a TRIPS travel planning session by a typical retail individual "home" consumer. Other service models also apply. For example, a private business or public agency could offer TRIPS services "over-the-counter", via telephone or fax inquiry service, whereby employees of the private or public entity would handle client inquiries by using the TRIPS system on behalf of the client, who is then provided TRIPS output in some form. A central service bureau can dispense TRIPS services via one or more distributed travel information "kiosk" terminals. TRIPS end-users are not necessarily just individual "home" consumers. Small businesses, people at work, corporate purchasing agents, or "wholesale" buyers of travel service, vacationing tourists or business travelers can all use TRIPS. For example, simplified standardized TRIPS travel information queries via wireless communications from remote and/or mobile in-vehicle users equipped with GPS are described hereinafter—with reference to FIG. 9 in particular.

Illustrated in FIG. 1A and described further hereinafter, TRIPS preferred output includes; (1) the digital display 111 for user reference, as well as voice or sound output 119; (2) paper or sheet media maps, travel directions, itineraries or travel schedules, reservation/discount offer/ticket documents, supplemental text and/or graphic information about events of interest (EOI) or points of interest (POI) 109; (3) TRIPS travel information output electronically transmitted to remote devices by way of one or more links for computer communication 107; and (4) comparable output from a TRIPS session transferred via a standard computer communications "port" 123 into one or more portable computer devices 125 for more convenient use on foot, in a vehicle and other typical travel circumstances. The information content of different forms of TRIPS output can be identical or equivalent, selective (i.e. edited or revised) or complementary. Moreover, TRIPS output in various forms or media can be coordinated or correlated—e.g. printed paper maps used in conjunction with text, graphic and/or audio digital output by means of a system of named map grids. These various forms of TRIPS output complement or replace, and improve upon the conventional, loose and disparate sets of travel papers, documents and related paraphernalia typically used before a trip for planning and preparation, as well as during a journey for orientation, reference and access—such as crumpled maps with a jumble of tickets, disorganized notes, scattered itineraries, address or appointment books, more or less up-to-date brochures and guide books, and so forth. From digital displays interactively developed with user input, previews and selections, TRIPS prints out integrated, individualized travel plans on paper media including: built-in tickets and/or reservation confirmations with alphanumeric or bar codes for automated recognition; usefully scaled maps showing pertinent details; attached EOI/POI data; related travel directions; important contact names, numbers, and addresses; plus supplemental information selected by the user on locations, events and topics—organized into a convenient, orderly, compact arrangement keyed to the geographic and temporal dimensions of the user's planned route of travel. TRIPS output also includes the online transmission of the user's reservation requests, ticket purchases, changes, credit/payment arrangements, and so forth, directly to third-party providers participating in TRIPS. For use in conjunction with, or in lieu of, various conventional or TRIPS travel papers, TRIPS travel plan output is provided in various digital electronic formats—for example, "ported" into various compact, easily portable, "shirt-pocket" or hand-held, electronic computer devices and/or transmitted to specialized remote or in-vehicle TRIPS computer devices, as detailed hereinafter.

Various forms of such TRIPS output preferably get "taken along" on actual trips—like conventional maps and tickets—in order to aid the traveler en route. In other words, the TRIPS invention provides handy, electronic and/or paper output for use while actually traveling: e.g., to find one's way in unfamiliar surroundings; locating a point of interest or essential facilities (e.g., parking, public safety, rest rooms, etc.); safekeeping arrival/departure information and/or other critical dates, times and events; confirming accommodation or transportation pre-arrangements; to access or acquire tickets to places or events; "cashing-in" special offers from TRIPS third-party providers for transport, meals, rooms and other goods/services; keeping track of important trip-related business/individual names, phone numbers and street addresses; plus other routine tasks involved in following or changing travel plans.

For enhanced portability and automated management of TRIPS output and other functions en route, desktop personal computers and other relatively bulky or power-hungry TRIPS user platforms include standard communication ports (e.g. Universal Serial Bus, IEEE 1394, infra-red, or the equivalent). As shown at 123 in FIG. 1A, such ports enable the transfer of maps, POI/EOI data or attractions, routes, reservations, schedules, directions, and other TRIPS information to and/or from one or more of various compact, highly portable computer device(s) 125. For example, the TRIPS user can transfer all or part of the output from a TRIPS travel planning session into a PDA, a "smart" mobile telephone, a GPS position sensor, an audio recorder/player device, a shirt-pocket or hand-held digital appointment book/scheduler/calendar/almanac, a miniaturized map database display, and/or a "ticketless travel" smart card—among other compatible, small and highly portable computer devices 125. Thus, as uploaded into a small, highly mobile device 125, TRIPS outputs are readily available for handy user reference and other operations out "in the field" (i.e., en-route while actually traveling): for example, "on the spot" text/audio travel directions; GPS waypoint guidance; claiming, confirmation and/or verification of discount offers and reservations; selected user notes on scheduled events of interest (EOIs); even sounding an alarm as the time for an important appointment or flight approaches; and various other timely, topical, locational and transactional travel information chores.

The TRIPS preferred embodiment in FIG. 1A generates diverse, useful outputs in response to user input inquiries configured around the common-sense travel issues of (1) WHERE? (Places), (2) WHAT?/WHO? (Topics), (3) WHEN? (Times), and/or HOW TO GO & HOW MUCH COST? (Accounts). Based on such intuitive issues, an overall user input configuration or typical main user input menu screen is illustrated at 111 in FIG. 1A and further described with reference to FIG. 1C. TRIPS inputs can be configured around other equivalent intuitive or mnemonic, user-friendly input menus (e.g. "Dates\Times, People, Places & Things to Do" or "Routes & Directions, Tickets & Reservations, Emergency Services" or "Anyplace, Anytime, Anything" or "Maps, Schedules, Lists & Tickets" and so forth). Preferred TRIPS embodiments respond with interactive processing to these "user friendly" travel planning inquiries by sets of operations or sequences of functions which retrieve, focus, and integrate characteristic travel information within TRIPS Subsystems for processing geographical, topical, temporal and accounting data records organized as a state-of-the-art relational database.

As introduced in FIG. 1A, preferred TRIPS embodiments enable users to create individualized or "custom" travel plans output in various formats or media by the manipulation and adjustment of selectable travel planning capabilities. Fully articulated TRIPS embodiments, for example, typically include optional capabilities such as: input and processing of transportation mode preferences, travel time/ date frames, starting point, final destination and optional intermediate waypoints; digital map information and functions such as mapping types or unique geographic points of interest (POIs); independent user exploration or computerized sorting/relating of travel topics, temporal events of interest (EOIs), tickets, reservations and other special offers for goods/services; selectable text, audio and/or graphic supplemental or updated information on selected topics, POI/EOI data and special offers; scheduling tools to evaluate and manage the temporal aspect of trip itineraries; multimedia travelogs or previews of places, events, topics as well as transportation, other accommodations, goods/services for which tickets/reservations/special offers are available via TRIPS; travel budgeting functionality for comparative analysis of factors such as travel time, distance, cost, etc.; and so forth. To generate compact, individualized "map ticket" travel plan output, optimally arranged in geographic/ temporal order of travel, users preferably engage, explore, integrate and/or reiterate two or more of such TRIPS travel information operations in order to generate, shape, focus, elaborate, edit and finish personalized output tailored to the user's personal travel preferences, needs, budget and timetable—as described hereinafter.

To illustrate the advantages and workings of the TRIPS invention, the instant disclosure posits typical travel planning situations or hypothetical cases. FIG. 1B, for example, presents part of a larger TRIPS travel plan generated by a fictional user planning to take a trip away from home in Knox, Ind. To simulate ordinary travel circumstances, it is assumed that this individual user wants a family member to drive them to the airport, to eat out together somewhere on the way to Chicago's O'Hare Airport to catch a flight. Perhaps, this hypothetical traveler is bound for a faraway location, wants to rent a car, and/or attend an event requiring an advance reservation. Added typical travel planning problems or issues could include where to stay for the night at the faraway location, arranging a return flight, getting home from the airport, and so forth. The TRIPS invention aids users with such practical travel planning issues or problems and accommodates differing travel requirements, styles and agendas.

For additional help illustrating how TRIPS works, this invention description focuses on two hypothetical individuals—Sara Smith and John Jones—who both are presumed to be residents of Knox, Ind. Sara Smith illustrates the travel planning needs, concerns, motivations and approaches of a person who plans to take a vacation in the near future. Sara Smith wants to explore different things to do, possible destinations, places and/or people to visits, methods of transportation, and so forth. By contrast, John Jones' primary destination and travel time-frame are already set by his hypothetical situation—like many business or family trips. John Jones is planning a trip to attend his grandmother's birthday party which is already firmly scheduled for 5:30–7:30 PM on Sep. 13, 1996 at Bradbury Mountain State Park in Pownal Me. (see e.g. FIG. 1C at 167). John Jones has a known or previously established travel destination, date/time around which to build and optimize a TRIPS travel plan, among other obvious differences—while Sara Smith wants help selecting a specific recreational focus, places to go, travel time frame, as well as optimal transportation, accommodations, scheduled events and budgeting for her vacation travel plan. The present invention is also applicable to varied travel planning circumstances and approaches, more complex requirements, situations and itineraries, as well as simpler travel scenarios. Moreover, the TRIPS software does not dictate that Sara Smith and John Jones start with the same input or follow parallel paths or steps in their individual travel planning sessions.

FIG. 1B

FIG. 1B illustrates TRIPS output—typically, a digital display or hard-copy paper media printout; however, output from TRIPS can include digital text, audio, and/or graphics, which can be electronically transferred to other remote or portable computer devices, for example, a third party computer reservation system (CRS) or a handheld PDA or in-vehicle GPS equipped device, as detailed heretofore relative to FIG. 1A and hereinafter relative to FIG. 9. FIG. 1B pictures a single "frame" or "page" of a larger set of TRIPS output. Typical TRIPS travel plans often include related multiple screens, digital frames and/or pages or sheets of paper, for longer, more complicated, itineraries and/or to show more detail at the user's option. TRIPS travel plans can also be shorter and simpler than the FIG. 1B example.

FIG. 1B illustrates partial TRIPS output from a hypothetical TRIPS travel planning situation, posed above relative to FIG. 1A. More particularly, FIG. 1B shows a compact arrangement of TRIPS output, in geographical and temporal travel order, with specific content, destinations etc, selected by a hypothetical user. The FIG. 1B output was generated by a hypothetical TRIPS user who intended to be driven from his or her home in Knox, Ind. to O'Hare International Airport in Chicago, Ill. to catch an airplane flight. The entire journey could further include renting a car, attending an event, staying for some time in a hotel, return flight and public transportation back from an area airport to home in Knox—detailed on more printed pages, digital screens or frames within the complete travel plan. Illustrating just the portion of this total TRIPS output for the first leg of the trip from the user's home in Knox, Ind. to O'Hare International Airport in Chicago, Ill., the travel plan in FIG. 1B, nonetheless, reveals the essential features of TRIPS output.

The travel plan for the trip to the departure airport, shown in FIG. 1B, was variously developed in a TRIPS travel planning session as follows. As detailed hereafter relative to FIG. 1C, first the TRIPS user might have entered his or her travel time frame within the WHEN? main TRIPS input field. Next, the TRIPS user might typically engage the WHERE? menu, choosing to proceed in the ROUTES sub-menu. Therein, either by mouse commands on a map display, by text entries in appropriate dialog boxes, or other means, the TRIPS user inputs the departure point or START and faraway destination or FINISH point for his/her intended trip. Alternatively, the TRIPS user could input his or her travel time frame after inputting his or her planned START and FINISH points. The user could also optionally input preferred modes of transportation, specify a particular airline or airport, intermediate stopovers, budget parameters, and/or various other TRIPS input options disclosed hereinafter.

The TRIPS user had already personally decided to be driven to the airport by a family member, stopping to eat on the way. Therefore, this hypothetical TRIPS user might well take advantage of TRIPS capabilities for locating and previewing of restaurants and other types of geographic points of interest (POIs) along a user-defined route as disclosed hereinafter and in David M. DeLorme and Keith A. Gray, U.S. Pat. No. 5,559,707 issued Sep. 24, 1996 and titled COMPUTER AIDED ROUTING SYSTEM (or CARS). In the course of computing an optimum route, this technology enables the user to focus on text information, even multimedia graphics and audio, about user-selected types of attractions, accommodations or other POIs presented in the user's planned order of travel. Thus, the TRIPS invention enables the user to consider topical information in varied media about restaurants or other locations within a user defined region or distance around a computed travel route. Furthermore, TRIPS provides improved capabilities for previewing of user-defined selections and/or integrated combinations of characteristic TRIPS temporal, topical, and/or transactional (as well as geographic) travel information—as detailed further hereinafter, with particular reference to FIGS. 4, 5, 6, 7 and 8.

While previewing such restaurant information about places to eat "along the way" from home to the airport, in preparing the travel plan output shown in FIG. 1B, our hypothetical TRIPS user picked out Jolly Ginger's restaurant in Merrillville, Ind. Jolly Ginger's might also have been selected while browsing for local restaurants or from a computerized search for area restaurants meeting certain specified criteria. Next, this hypothetical user took advantage of TRIPS capabilities for making reservations. Jolly Ginger's may have been the user's first choice for dinner or, perhaps other, arrangements for dinner were tried first. At any rate, this hypothetical user finally made reservations for two, at the Jolly Ginger restaurant for an appropriate date and time, using TRIPS transactional resources, as hereinafter detailed referring particularly to FIG. 8. As hereinafter detailed, with particular reference to FIG. 6, TRIPS also provides scheduling and itinerary management capabilities to help the user fit the dinner reservation into his or her itinerary for the drive to catch the scheduled flight out of Chicago. Then, for travel directions to the restaurant, this hypothetical user reengaged the TRIPS routing capabilities, then input the location of Jolly Ginger's as a stopover or an intermediate waypoint within his/her overall travel plan. Finally, in this hypothetical travel planning scenario, the TRIPS user called for the output, partly illustrated in FIG. 1B—perhaps, after further preview and/or revision of other aspects of his or her larger itinerary.

As disclosed hereinafter, the preferred TRIPS embodiment offers users many other parameters, options, functions and additional information often utilized in the course of typical travel planning sessions resulting in preferred travel plan outputs as shown in FIG. 1B. Moreover, TRIPS enables users to edit or revise TRIPS output to suit their needs and preferences. A user unfamiliar with O'Hare Airport, for example, might well opt for detailed layouts of the parking and terminal facilities. But, a different individual TRIPS user—who frequently flies out of O'Hare—would probably not include a detailed airport layout in his or her TRIPS travel plan output. The TRIPS invention facilitates user selection of such output features, including the user preference for levels of detail in printed or digital maps and related outputs.

Various interactions and sequences of TRIPS information processing can nonetheless result in identical output, both in structure and content. For example, one hypothetical user may simply have selected a favorite restaurant en route to Chicago from personal experience or as recommended by a friend. On the other hand, TRIPS enables users to browse and/or sort relationally databased information about numerous restaurants—so a second user might produce the same resulting output by computerized searching. For different users using various methods, the output shown in FIG. 1B reflects and embodies the individualized, user-chosen processes by which it was produced, utilizing the TRIPS invention. For one user, FIG. 1B shows the way to a favorite restaurant selected with little hesitation or consideration of other places to eat, based on previous personal experience or the advice of a friend. But, for a second TRIPS user, FIG. 1B shows the way to a new dining adventure selected by carefully browsing TRIPS information on a great many other local restaurants. A third TRIPS user could generate the FIG. 1B output picking Jolly Ginger's on impulse while visually exploring a map display of Merrillville, Ind., for example, or during an audio rendition of the menus from restaurants along the shortest route to Chicago. A fourth TRIPS user might utilize TRIPS differently—and pick Jolly Ginger's for dinner after taking advantage of a computerized TRIPS sort of restaurants along the route to Chicago searching for a certain type of cuisine at an eating place which honors a certain credit card. (Such TRIPS computerized searches are further described relative to FIGS. 4–8.) Thus, by providing a variety of ways and means to utilize the flexible TRIPS invention, TRIPS produces outputs addressing widely different user requirements and purposes—in some cases, outputs which are similar or identical in objective content and structure but, nonetheless, which possess very different meanings or significance for individual users—due to the fact that the travel plan outputs with co-incidental structure and content are differently interpreted by individual users, according to the varied processes and operational sequences engaged by each user in their individual TRIPS travel planning sessions or use episodes.

Flexible, variegated operation is an important ingredient of the TRIPS novel capability to produce "customized" or individualized outputs that reflect and record selective usage of the TRIPS invention by different individuals in pursuit of personal travel objectives. Such customized or individualized import or meaning for different users is not necessarily expressed by differences in the content or structure of the resulting output. The entire significance of a particular item of TRIPS output for an individual user often stems, at least in part, from the specific combination of diverse travel information produced by the specific sequences of related TRIPS processes employed by the individual user during the particular TRIPS travel planning session in which the resulting output item was produced. At the same time, TRIPS output exhibits characteristic structures and/or contents—as depicted in FIG. 1B and detailed immediately hereafter, FIG. 1B illustrates typical preferred TRIPS output, including an overview map 135 with a graphical representation 137 of an optimum computed route from Knox, Ind. to Chicago, Ill. Ordered text directions for this trip appear at 139 indicating a temporal/geographic progression of road names, compass directions, a list of nearby towns, highway exits, driving times, point-to-point distance and overall mileage. At 141, there appears a detail map, concentrating on Merrillville, Ind. and the Jolly Ginger's restaurant location, as found along the user's intended route, graphically represented again by shading at 143. Detailed driving directions to the restaurant are included at 145. Inside of a characteristic graphic border, at 147, is a RESERVATION CONFIRMATION provided and acquired through TRIPS and/or a third-party provider—as detailed hereinafter with particular reference to FIG. 8. 147 includes time, date, number of guests and certain user requirements (such as seating in a "nonsmoking" area). The TRIPS RESERVATION CONFIRMATION at 147 also shows an alphanumeric code (e.g. "*@5-IN-b21Q-5/96*") preferably provided by TRIPS for automated recognition at the restaurant and related TRIPS accounting functions. Additional information about Jolly Ginger's is provided at 149 by a box of graphic symbols with graphic arrow or pointer to the restaurant location upon the detail map. For example, as explained to users by TRIPS documentation or manual (not shown in FIG. 1B), the graphic symbols are defined to represent availability at the restaurant of certain cuisine, air-conditioning, liquor service, plus association with or approval by various credit cards or other agencies, and so forth.

FIG. 1B exemplifies alternative TRIPS outputs as displayed, printed out and/or transmitted or transferred electronically—which also might be much longer and more complicated than the FIG. 1B output, or shorter and simpler. For example, instead of or in addition to the alphanumeric code shown in FIG. 1B, the RESERVATION CONFIRMATION 147 can use a bar code or other equivalent coding/encryption for automated recognition/admission/accounting. An electronic RESERVATION CONFIRMATION might use an analog telephonic code, or digital public/private key encryption, or other equivalents. Moreover, the RESERVATION CONFIRMATION 147 can also include tickets for cultural events, theme parks, or myriad other attractions. TRIPS output is further capable, at 147, of including an airline reservation or other transportation coupons or vouchers, and/or various special price discounts and/or extra services offered by an extensive range of accommodation and goods or service providers that can participate in TRIPS e.g., hotels, banks, campgrounds, retail stores, hairdressers, gas stations, restaurants, taxis, video rental shops, tour guides, public safety, or health facilities—among many others. Thereby, TRIPS output provides the advantages of "built-in" reservations, tickets and/or special offers—as an intrinsic part of digitally generated, electronic and/or printed travel plan output also typically including maps, travel directions, itinerary or scheduling information concisely arranged in relation to the geographical/temporal order of travel—rather than a loose disarray of easily misplaced travel papers. The transactions involved in TRIPS reservation, ticket and/or special offer services are described hereinafter, particularly referring to FIG. 8.

As illustrated at 149 in FIG. 1B, in one form preferred for displays and printouts, TRIPS users can also select and/or variously output supplemental and/or updated information on topics places, events or offers of interest via other formats and/or media—e.g., text, voice, spreadsheets, video, music, various graphics and other multimedia. The text travel or driving directions at 145 and 139 can also be expressed for other modes of transportation or travel such as walking, subways, biking, canoes and so forth. TRIPS can output travel information in various media and/or formats such as voiced audio, mixed text and graphic symbols "attached" to map displays, electronic communications, and/or printouts, or to latitude-longitude or other geographical coordinate references, located photos or videos of locations and approaches thereto, which can further be related to dates/times, and so forth.

Multi-scale maps, 135 and 141, with routing indications at 137 and 143, are preferred TRIPS geographical information outputs. Alternatively, the maps can be perspective or diagrammatic or may include highly detailed views, such as building plans and airport terminal layouts. TRIPS expresses routes, and/or recommended course parameters, by various means—preferably but not necessarily with maps—also e.g. by combinations of text, still and/or moving graphics, audio, or even video clips or entire video recordings or graphic animations of travel paths, recommended routes, courses and/or expected terrain, surroundings or conditions as encountered or visualized underway.

TRIPS outputs typically and preferably have temporal significance: e.g., the estimated travel times included in the travel plan at 139—also the time and date of the confirmed restaurant reservation at 147 in FIG. 1B. For the expression of scheduling and other temporal information, TRIPS outputs include a broad variety of devices or symbols for communication of temporal information such as: clocks; calendars; timelines; timetables; conventional or contrived symbols for times of the day, seasons of the year, commonplace or ordinary occasions like birthdays and doctor's appointments; and designated or standard symbols for critical moments or dates/times such as departures/arrivals, the commencement of performances; and so forth. TRIPS temporally related output further includes the capability for visual, audio, or other signals from a portable, hand-held, electronic computer device e.g. to "sound an alarm" or indicate when the user is due for some previously arranged business or personal meeting, important connection, arrival or departure.

TRIPS outputs typically and preferably include various nominal, numerical, ideographic, iconic, distinctively colored or sounding symbols to indicate certain subject-matter or substantive content. Such symbols may be common or readily understood or specifically defined for the TRIPS user. For example, FIG. 1B is adapted from output from the AAA Map'n'Go® 2.0 CD-ROM North America travel planner by DeLorme Publishing Co., this disclosure's assignee. Particular shapes and colors of graphic symbols (e.g. red circles, red stars, yellow triangles, etc.) are used or designated in AAA Map'n'Go 2.0 to indicate hotels, restaurants, transportation terminals, the START and FINISH points of a computed route, plus other types of points of interest or POIs located on map displays. In TRIPS, comparable symbolic terminology can be used in the Topical, Temporal and Accounting Subsystems too, as detailed hereinafter. As such symbolic devices are made to appear on a TRIPS map display, itinerary, topical item and/or reservation confirmation, the TRIPS user is enabled to visually or auditorially identify selected types or species of geographical, topical, temporal or transactional information, which thereafter can be used for later inputs and operations—as detailed relative to FIG. 1C immediately below.

FIG. 1C

FIG. 1C illustrates a preferred TRIPS map display 152, comprising one typical TRIPS user interface, corresponding to the general TRIPS interface at 209 in FIG. 2, detailed hereinafter. On the map display interface 152 in FIG. 1C, a user has called up the four main TRIPS input menus denominated or titled as follows: 1) "WHERE?" at 155 (addressing the Geographic Subsystem pictured at 221 in FIG. 2 and at 417 in FIG. 4) (2) "WHAT/WHO?" at 157 (addressing the Topical Subsystem revealed at 213 in FIG. 2 and at 415 in FIG. 4); (3) "WHEN?" at 161 (addressing the Temporal Subsystem at 223 in FIG. 2 and at 419 in FIG. 4); and (4) "HOW?" at 163 (addressing the Accounting Subsystem 217 in FIG. 2 also outlined at 411 in FIG. 4). These four main TRIPS input menus (155, 157, 161 and 163 in FIG. 1C) were introduced at 111 in FIG. 1A. Including sub-menus for input detailed hereinafter, the four main input menus correspond to the Retail Consumer Input Block at 205 in FIG. 2 as well as the Main Menu at 413 in FIG. 4.

With this preferred TRIPS embodiment, users start up or continue travel planning inquiries in any one of the four input menus at 155, 157, 161 and 163 in FIG. 1C. Often using the map display interface at 152, ordinary TRIPS user travel planning sessions are regularly started relative to the WHERE? input menu 155, for example, searching for places to go—i.e. searching in the Geographic Subsystem, shown at 221 in FIG. 2 and 417 in FIG. 4, to find points of interest (POIs) to include as possible destinations in a trial or final TRIPS travel plan. Next, prompted by common-sense logic or everyday thought patterns for recreational, family or business travel planning, many TRIPS users will turn to the WHAT/WHO? menu to further investigate topical features of their possible travel destinations which they just located and selected using the WHERE? main input menu at 155 in FIG. 1C.

Figures 2, 3:
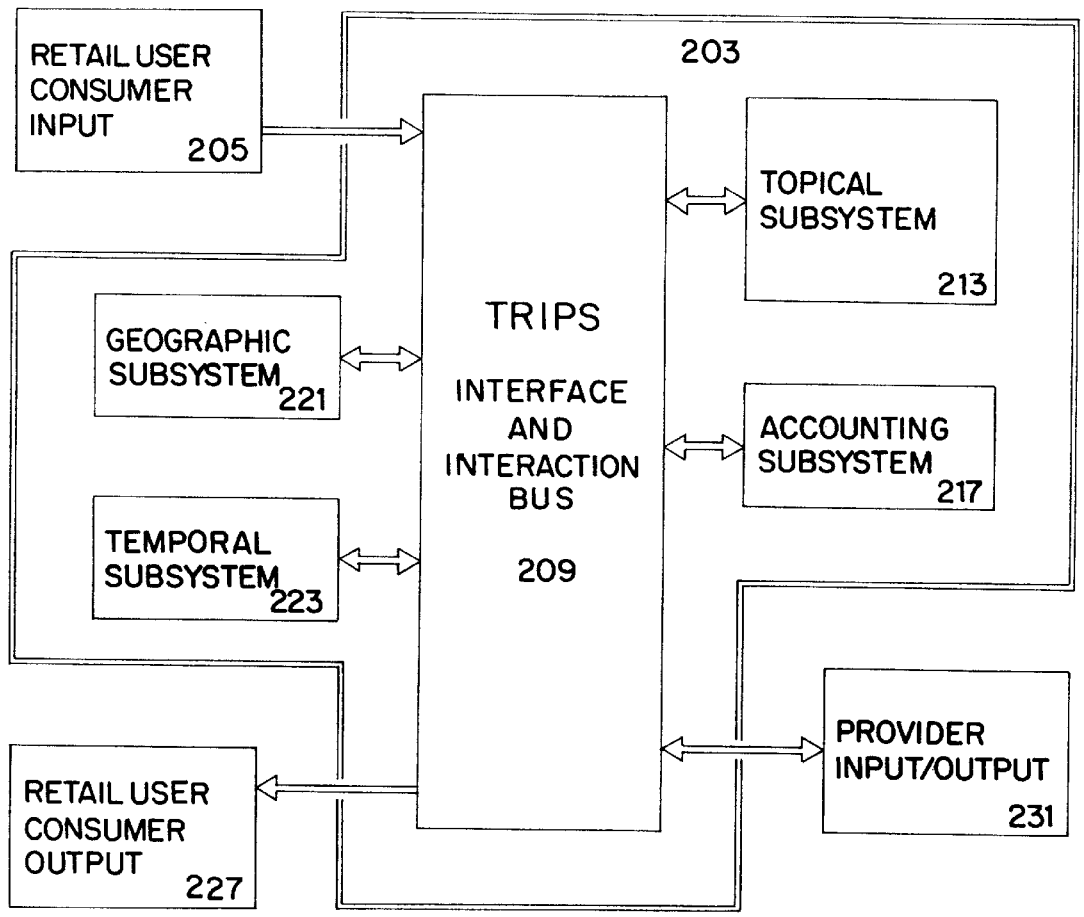
FIG. 2 is an overall block diagram of the interactive TRIPS system for handling retail consumer queries about places, times, topics and/or transactions such as reservations, tickets and various special offers.
FIG. 3 is a simplified representation of the preferred TRIPS data structure or "data packet", as used in the TRIPS relational database, electronic communications or transfers and the construction of individual travel planning sessions.
Figure 4:
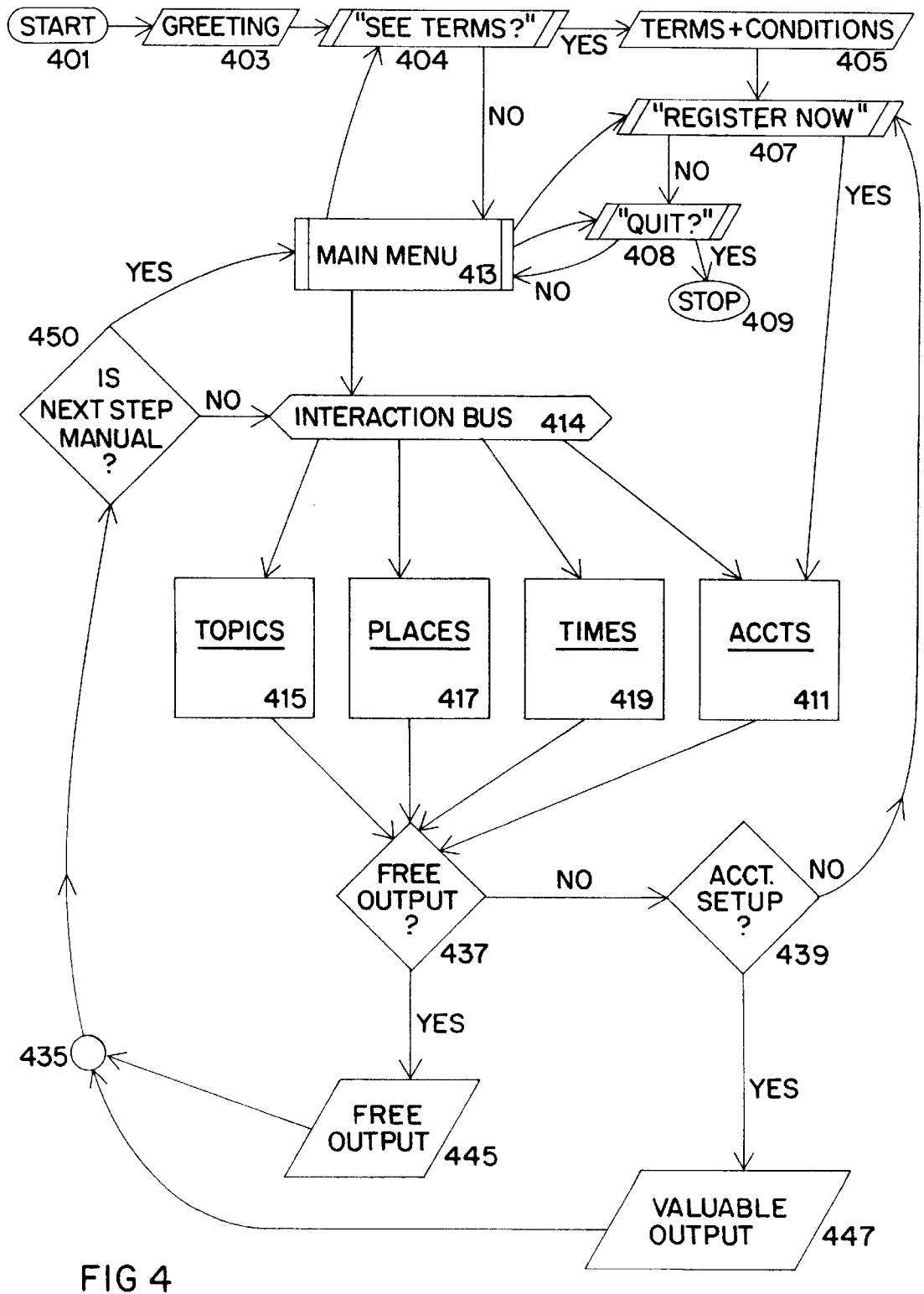
FIG. 4 is a flow chart of the overall TRIPS user interface, providing for a variety of sequential topical, geographic, temporal and transactional travel planning operations.

This WHAT/WHO? main input menu, shown at 157 in FIG. 1C, enables a TRIPS user to query the Topical Subsystem, outlined at 213 in FIG. 2 and 415 in FIG. 4. TRIPS travel-related topics, subject-matter or contents include things to do, attractions, sites, sounds, activities, people, customs, sights, and/or various other data records for which substantive information is available, using the TRIPS embodiment. But, as detailed hereinafter, a TRIPS travel planning session can also be launched in any other of the four main input menus. Moreover, TRIPS sessions can proceed by a great variety of input sequences—combining TRIPS operations controlled and implemented through use of the WHERE? 155, WHAT/WHO? 157, WHEN? 161 and HOW? 163 main input menus, and related TRIPS sub-menus, or equivalent input means.

For further examples, additionally or alternatively, the TRIPS user can also commence a fresh travel planning session, or proceed with an emerging TRIPS inquiry, by engaging either the WHEN? or HOW? main input menus, at 161 and 163 respectively in FIG. 1C. Accessing TRIPS' Temporal Subsystem (which is blocked out at 223 in FIG. 2 and at 419 in FIG. 4), the WHEN? main menu enables input at 161 in FIG. 1C in order to assess, for example, time of day or night and/or seasonal factors related to travel to specified locations or engaging in certain activities—also to browse calendars of events (EOIs), or other timetables like transportation or performance schedules. Corresponding to the Accounting Subsystem diagrammed at 217 in FIG. 2 and at 411 in FIG. 4, the HOW? input menu, at 163 in FIG. 1C, facilitates TRIPS queries about alternate modes of transportation (e.g. plane or car versus public transport), typical travel expense budget issues or considerations, as well as making ticket purchases, arranging for accommodations, reservations and/or other special goods/services offers.

The present TRIPS invention is not restricted to the input terminology or the technology illustrated in FIG. 1C. Other equivalent, user-friendly and easy to remember icons, symbols, sounds, colors, words, or diverse communicative devices could be substituted for "WHERE?", "WHEN?", "WHAT/WHO?" and "HOW?"—as well as sub-menu titles detailed hereinafter—in order to convey or evoke requests for characteristic geographic, temporal, topical, and accounting information. Other input means include, but are not limited to, technology for the recognition of voice commands, natural language text queries, keystroke or mouse input, "virtual reality" input/output devices, joysticks, map/calendar/subject-matter/transactional graphic user interfaces, relational data queries and/or other state-of-the-art input means known or readily implemented in the digital computer software field. Access or inputs to the TRIPS Geographic, Temporal, Topical and Accounting Subsystems (described in more detail with reference to FIGS. 2–9) need not be consummated or organized at the general level illustrated in FIG. 1C. In truncated or embedded TRIPS embodiments, for example, related input commands are not necessarily gathered together within distinct menus or command suites with other terms for related operations. Rather, the TRIPS user can select from among discrete, embedded, or loosely arranged input options such as "route", "POI", "fast", "fun", "food", "cheap", or various other defined or commonly understood terms and symbols. Such simplified input means facilitate computerized access by a remote or in-vehicle user and flexible processing of travel information about places, times, topics and/or transactions—as detailed hereinafter particularly relative to FIG. 9. TRIPS input can also be managed by characteristic graphical user interfaces.

As shown in FIG. 1C at 152, a preferred TRIPS embodiment defaults to a graphical user interface (GUI) in the form of a dynamic, multi-scale map display readily manipulated and queried by the user. Such map display GUIs are described in issued patents and pending patent applications assigned to DeLorme Publishing Co., Inc., also owner of this TRIPS patent disclosure. See e.g.: David M. DeLorme, U.S. Pat. No. 4,972,319 "ELECTRONIC GLOBAL MAP GENERATING SYSTEM"; David M. DeLorme, U.S. Pat. No. 5,030,117 "DIGITAL GLOBAL MAP GENERATING SYSTEM"; David M. DeLorme & Keith A. Gray, U.S. patent application Ser. No. 08/265,327 "COMPUTER-AIDED MAP LOCATION SYSTEM" [or CAMLS] filed Jun. 24, 1994; David M. DeLorme & Keith A. Gray, U.S. Pat. No. 5,559,707 "COMPUTER-AIDED ROUTING SYSTEM" [or CARS]; Keith A. Gray U.S. patent application Ser. No. 08/521,828 "COMPUTERIZED ADDRESS LOCATION AND COMMUNICATION SYSTEM" [or CALCS] filed Aug. 31, 1995; David M. DeLorme & Keith A. Gray, U.S. patent application Ser. No. 08/661,600 "COMPUTER-AIDED ROUTING & POSITIONING SYSTEM" [or CARPS] filed Jun. 11, 1996. The preferred map display GUI at 152 in FIG. 1C embodies such capabilities e.g.: to zoom to different scale maps with variable resolution or levels of detail; to pan or shift seamlessly across to other map locations i.e. other latitudes and longitudes; and to locate on map displays named places, zip code and phone exchange areas, street addresses, or other landmarks and/or ordinary language geographic location and direction identifiers. Users can also get supplemental or updated information on points of interest or POIs, including multimedia previews on places near optimum computed travel routes. The map display technology in the patents and applications just mentioned facilitates the communication or electronic transfer of discrete, compact files or packets of map-related information between remote computers equipped with compatible mapping technology and/or to and from auxiliary devices like highly portable GPS receivers or other handheld digital travel aids. Digital displays of selectively detailed geographic information can be used in conjunction with sheet media printed maps with reference to named map grids for coordination and correlation.

The dynamic map display, shown at 152 in FIG. 1C, primarily serves as an adjunct to the WHERE? main input menu at 155. This map GUI enables access to and processing in the TRIPS Geographic Subsystem, as detailed hereinafter with particular reference to FIG. 5. Interaction with the other TRIPS Subsystems can also be accomplished using the map display GUI or graphical user interface shown at 152. At 167, for example, there appears a map annotation (or Map Note) with a graphic arrow pointing to a particular map location. This Map Note contains Topical information (e.g., "Grandma Jones' Birthday Picnic"—i.e. WHAT/WHO? data) as well as Temporal information (e.g., "Sep. 13, 1996 5:30–7:30 PM", or WHEN? data). Accounting or transactional information (i.e. HOW? data) could be included too (e.g. in the form of a picnic area reservation confirmation). Moreover, as described in the DeLorme CAMLS, CARS and CALCS patents and applications cited above, graphic symbols can appear on the map display GUI 152 especially along roadways: for examples, a steeple indicating a church or a building symbol or red triangle representing a hotel or other lodging. Such graphical symbols indicate not only geographic locations but also can convey topical data on the types of points of interest or POIs (e.g. hotels or churches) found at those locations. In sum, the map display GUI at 152 mainly facilitates input for interaction with the TRIPS Geographic Subsystem—e.g. for finding places to go on the map display or routing functions, detailed hereinafter. The map display 152, however, can also facilitate interaction with temporal and/or topical information—or even accounting information e.g. by means of "located" symbols, text or tables indicating price information or available transportation or lodgings with vacancies, or other special goods/service offers.

The TRIPS invention works with other GUIs in addition to or as an alternative to the dynamic map display at 152. The temporal or WHEN? main input menu 161 can be implemented or complemented by a dynamic calendar, clock and/or timetable GUI (which could also incidentally convey a place, topic, or accounting information). Similarly, the WHAT/WHO? main input menu at 157 can be replaced or supplemented by a subject-matter GUI, for example, icons, indexes, listings, topical trees, and/or graphical topical universes, among possible graphic interface displays. This subject-matter or topical GUI could also convey overlapping, embedded geographic, temporal or accounting information. Travel budget queries, and/or reservation transaction inputs, as performed by the HOW? main menu at 163, can also additionally or alternatively be implemented via a GUI or transactional graphical user interface—e.g. an interactive presentation of the arrivals, departures, times, costs, seat availability and other data on the available accommodations such as transportation, entertainment, meals, lodging, as well as other special offers for diverse goods/services; and/or a dynamic travel budget spreadsheet which facilitates input of spending limits and tallies up the estimated expense of proposed travel plans. Such travel arrangement and/or budgeting GUIs can provide more user-friendly, intuitive, informative displays and means for input pertaining to reservations, tickets, modes of transportation, travel cost inquiries, cost controls, and so forth. Such travel arrangement or spreadsheet GUIs could further facilitate incidental topical, geographic and/or temporal inputs, information displays and other outputs.

Whether accomplished by the main input menus at 155, 157, 161 or 163, related sub-menus, associated GUIs such as the dynamic map display at 152 in FIG. 1C, or equivalents, TRIPS retail consumer input preferably prompts an interactive travel planning session involving of a series or sequence of queries and responses involving software operations in the Topical 213, Geographic 221, Temporal 223 and/or Accounting 217 Subsystems, detailed hereinafter referring particularly to FIGS. 2, 3, and 4. Quite often, TRIPS travel planning sessions commence common-sensibly with one or more geographic inquiries as input in the WHERE? menu searching for places to go, followed up by topical queries input in the WHAT/WHO? menu seeing what there is to do at places selected in the first geographical step or phase of the session. The present TRIPS invention facilitates many other inquisitive travel planning sequences or scenarios to seek and retrieve various personalized combinations of topical, geographic, temporal and accounting information. Using the preferred TRIPS embodiment shown in FIG. 1C, flexible user inquiries can be initiated in any of the four main input menus, then followed-up by later browsing or searches in any of the four related TRIPS Subsystems—with user selection of variations and options in focus, order, content, parameters, levels of detail, extent of integration between successive steps, automated versus manual execution of ensuing operations, accumulation, computerized filtering and/or user editing of the emerging travel information output, and so forth—in response to the travel-related concerns, interests and requirements of individual TRIPS users.

For example given a pre-set vacation schedule, a TRIPS retail user might be motivated to start his or her travel planning session using the WHEN? menu at 161 in order to input the pre-arranged START and FINISH dates and times for his or her vacation. Then, this kind of TRIPS user typically turns to other TRIPS main input menus in order to inquire about available places to go, things to do, events and/or accommodations which fit into the individual user's established vacation time-frame. Other users approach TRIPS on the basis of a preeminent topical interest—for example, in a particular activity e.g., scuba diving for business or pleasure. Such users may be inclined to start a TRIPS travel planning session in the WHAT/WHO? main input menu 157 exploring scuba-diving and related subject-matters, without prior limits on travel time, place, mode or cost. With differing but normal concerns, yet another TRIPS user will elect to initiate a travel planning session in the HOW? input menu at 163. For example, a rail buff or lover of train travel may be inclined to start travel planning in TRIPS by inputting a preference for his/her favorite mode of transportation. Budget-conscious travelers also tend to start in the HOW? input menu at 163, specifying their spending limits. In sum, a TRIPS user can begin or carry on an individualized travel planning session in any one of the four main input menus (155, 157, 161, and 163 in FIG. 1C) or by equivalent input means.

As disclosed hereinafter, the TRIPS user can furthermore follow-up the first step in any travel planning session by subsequent queries utilizing any or all of the four main input menus at 155, 157, 161, and 163. In other words, preferred fully articulated TRIPS embodiments provide flexibility and selectivity in the sequence of use of the four TRIPS main input menus—i.e. the order in which individual users address their intuitive common-sense questions about WHERE?, WHAT/WHO?, WHEN? and HOW? in making personally relevant travel plans. Geographically curious TRIPS users can re-iterate operations in the WHERE? main input menu 155, exploring different potential destinations or places to go around the world, or within a selected region.

Avid fans of a specific sports team or opera star, on the other hand, can conduct intensive searches for temporal information on game or performance schedules, repeatedly utilizing the WHEN? main input menu at 161. Other users or travel planning contingencies find the topical or WHAT/WHO? main input menu 157 most helpful, for example, for browsing or systematic searching of names and/or attributes of products, persons or organizations. TRIPS users also engage the Accounting Subsystem at 217 in FIG. 2 via the transactional HOW? FIG. 1C main input menu 163 to resolve travel budget issues or related queries about accommodations, reservations and/or other special offers for goods/services.

TRIPS operations can be repeated within, or varied among, these four main input menus at 155, 157, 161, and 163—as described hereinafter with reference to FIG. 4 in particular. Additionally or alternatively, TRIPS users can customize or individualize their travel planning sessions by engaging varied sequences of HOW?, WHAT/WHO?, WHERE? and WHEN? queries, or equivalent input genres. Thus, two TRIPS users—each with individual travel preferences, problems and agendas—could engage in different sequences of TRIPS main input menu operations e.g. as follows: (1) WHERE?, WHEN?, WHAT/WHO?, HOW?; or (2) WHAT/WHO?, WHEN?, WHEN?, WHEN?, HOW?, WHAT/WHO?, WHERE?, WHERE?, WHEN?, HOW?. A great many other sequences are feasible, varying in the number and order of operations, as well as the selection among the various main input menus, related GUIs or sub-menus. User selectivity within TRIPS and the opportunities for individualized or personalized output from TRIPS are further enhanced by variable TRIPS travel inquiry parameters, output/format/detail controls and travel information previews, manual versus automated sequencing options, as well as user-controlled integration capabilities among component steps or sub-sessions in a TRIPS travel planning session and between TRIPS Subsystems, as detailed hereinafter.

Consequently, TRIPS travel plan outputs often possess differential meaning for individual TRIPS users attributable, at least in part, to the dissimilar or differing sequences of input pursued or implemented by individual users. For example, one TRIPS user's travel plan may start with a TRIPS search for a particular scheduled event (e.g., the performance of a favorite opera) by using the WHEN? main input menu at 161. A second TRIPS user may create an almost identical plan for travel away from home, flying out of the same departure airport on the same plane and staying at the same hotel, but having started with input in the HOW? main menu at 163 in order to keep a TRIPS travel plan within strict budget constraints for a quick business trip. For this second TRIPS user, the significance of his or her travel plan concerns satisfying the budget constraints; but, in the mind of the first TRIPS user, essentially the same travel plan is primarily significant because it includes tickets to a favorite opera. In sum, TRIPS travel plan outputs possess distinctive meaning for different users, in many cases, due to the user's selection and sequencing of input and follow-up operations involved in generating the output—as well as user-defined TRIPS travel information previews, formats, parameters and content—deployed by the individual TRIPS user in light of her or his personal travel agenda, interests and motives.

For more specific input routines, expanded user features and selections, the main TRIPS input menus in FIG. 1C each include preferred sub-menus, such as "ROUTES" under WHERE? at 155 and "EVENTS OF INTEREST" (EOIs) under WHEN? at 161. For each major genre of TRIPS input at 155, 157, 161, and 163, the preferred embodiment provides sub-menu search tools, designed primarily for retrieval of particular or typical data records or items of information e.g., "POINTS OF INTEREST" (POIs) under WHERE at 155. Preferably, within each of the four TRIPS main menus, at least one sub-menu is additionally included for the relational analysis of two or more TRIPS data records—e.g., "SCHEDULER", under WHEN? at 161 which arranges the times/dates of scheduled events (EOIs). For improved user convenience and comprehension with regard to queries about places, times, topics and transactions, the four TRIPS main input menus also preferably include sub-menu commands which facilitate access to assorted GUIs: e.g., (1) "MAPS" under WHERE? at 155, shown at 152 in FIG. 1C; (2) a dynamic, interactive GUI in a "CALENDAR" format under WHEN? at 161; (3) under WHAT/WHO at 157, graphic user input capabilities such as topic trees and subject-matter graphical universes, via the sub-menu entitled "RELATIONSHIPS"; (4) under HOW? at 163, through the (a) "HOW TO GO", (b) "HOW MUCH" and (c) "ARRANGE" sub-menus respectively providing GUIs: (a) for graphical presentation and/or input of available transportation modes; (b) for management of travel budget parameters (e.g. using a spreadsheet format); (c) for display and implementation of reservation and/or other special offer request and confirmation transactions—using icons or other optional graphical software input devices. Further details now follow on these preferred TRIPS input sub-menus and equivalent means for entering travel inquiries.

The four TRIPS main input menus each should have at least one sub-menu generally facilitating inputs in search of one or more temporal, topical, geographic or accounting data records corresponding to principal TRIPS Subsystems outlined in FIGS. 2 and 4. For example, the sub-menu titled "POINTS OF INTERESTS (POIs)" under WHERE? at 155 provides software tools for locating unique or typical geographic places, areas or regions by inputs such as zip code, place name, street address, phone exchange, latitude/longitude and/or other geographical co-ordinates or location identifiers. Similarly, beneath WHEN? at 161, "EVENTS OF INTEREST (EOIs)" indicates at least one sub-menu facilitating pointed or categorical searching for specified temporal events, happenings or activities, as scheduled or predicted in time, usually by a sponsoring group. Roughly parallel sub-menus for input, under WHO/WHAT? 157, enable searching for particular topics, e.g. names and attributes of individual organizations, people, products (goods/services), and activities. The preferred FIG. 1C TRIPS embodiment also includes one or more sub-menus, under HOW? at 163, which facilitate searching available accommodations, tickets, reservations, special offers, or other TRIPS transaction or accounting records—either to retrieve a unique record or a collection, class or type of data records.

In other words, these TRIPS search sub-menus can isolate singular TRIPS data records or information items. POINTS OF INTEREST (POIs), EVENTS OF INTEREST (EOIs), and the equivalent sub-menus just discussed, are preferably utilized in a TRIPS travel planning session to retrieve one or a specified class or type of geographic, temporal, topical and/or accounting records or data items for utilization in combination with other TRIPS travel information and other sequential TRIPS operations. For example, one or a set of temporal data records (e.g. the dates/times of music performances selected by TRIPS user), can be combined or integrated in TRIPS with geographic information about the location(s) of the music performance(s). At the user's option, added searches and combinations can be performed in TRIPS—for example, including other characteristic TRIPS records information about one or more lodgings or other accommodations located nearby the performance location(s), or available transportation to the performance (s), or proximate timely special offers e.g. for tickets to the music performance(s). More details on combined searches appear hereinafter relative to FIGS. 2–8.

In addition to software tools to get specific TRIPS data records or items of geographic, temporal, topical, and transaction information, each of the principal venues for TRIPS inputs (illustrated by the four main menus at 155, 157, 161 and 163) preferably includes one or more sub-menus or other equivalent input means, generally for the processing of sets of TRIPS data records or plural items of related travel information. For example, ROUTES under WHERE? 155 includes a TRIPS sub-menu for input to prompt the processing of sets of primarily geographic TRIPS data records. This ROUTES sub-menu preferably provides user access to routing software described in the above-referenced U.S. Pat. No. 5,559,707 by inventors David M. DeLorme and Keith A. Gray, "COMPUTER-AIDED ROUTING SYSTEM" (or CARS) and related continuation-in-part entitled "COMPUTER-AIDED ROUTING & POSITIONING SYSTEM" [or CARPS] filed Jun. 11, 1996. Such software for routing facilitates input of the user's proposed initial departure point or START (or present actual location as determined by GPS or equivalent user location means), and proposed final destination or FINISH in order to compute one or more optimal routes according to user selected parameters e.g., Quickest, Shortest, Scenic, and so forth. Intermediate stops or waypoints can also be entered and, thereafter, the optimal route(s) computed from e.g. New York to Los Angeles via New Orleans or Miami. Additional features enable the TRIPS user to get information on POIs in user specified region(s) around the computed route(s), then to experience multimedia "Along the Way" presentations or previews about the POIs preferably in the geographic/temporal order of travel. During or after a multimedia preview of route-related POIs, TRIPS users can select and include or "attach" text, sound or graphics from the preview to their individual travel plan outputs—such as map displays, printed itineraries and/or electronic transfers to other digital devices.

Similar to the ROUTES sub-menu for calculating optimum relationships or travel routes between selected geographic places, SCHEDULER under WHEN? at 161 in FIG. 1C enables TRIPS inputs for computing relations between temporal data records i.e. juggling appointments, schedules, itineraries, timelines, calendars and other arrangements of events, times and dates in conjunction with the TRIPS Temporal Subsystem—as detailed hereinafter, particularly relative to FIG. 6—including: (1) browsing or searching for simultaneous or conflicting appointment or EOIs using the "Same Time" command; (2) similar retrieval functions for earlier or later events via the "Before/After" command suite; (3) preview and/or incorporate selected multimedia information on EOIs; (4) manage schedules, appointments and other temporal agendas; and/or (5) "ALERT" audio or other alarms in order to signal impending departures or other critical scheduled dates/times. As detailed further hereinafter with reference to FIGS. 2 to 8, the TRIPS user can mix or integrate travel information, as processed by means of the SCHEDULER sub-menu and/or equivalent functions, with other TRIPS geographic, accounting and/or topical data records—as well as with other TRIPS temporal information items.

Also, for relational analysis of multiple TRIPS topical records, at 157 under WHAT/WHO?, TRIPS sub-menu software tools are provided for the processing and relating of two or more subject-matter data records in conjunction with the TRIPS Topical Subsystem—as detailed hereinafter, particularly in relation to FIG. 7—including preferably state-of-the art sophisticated text searching in fully developed embodiments, or at least relational databasing capability for predefined data types and hierarchies or classes: e.g. Things to Do (scuba-diving, skiing, theater, etc.); Accommodations (hotels, campgrounds, restaurants, etc.). TRIPS topical data items can then be sequenced together, integrated or otherwise combined, at the user's option, with other data records and travel-related information as processed within the TRIPS Geographic, Topical, Temporal and/or Accounting Subsystems—with more details provided hereinafter, particularly referring to FIGS. 2–8.

Input for processing or relating of one or more TRIPS accounting records is facilitated in the preferred embodiments in FIG. 1C under HOW? at 163. For example, the TRIPS user can compare cost and availability of alternate modes of transportation, input travel budget parameters and arrange various reservations, tickets and other special offers. As detailed hereinafter in relation to FIGS. 2, 3, 4, and particularly 8, the TRIPS Accounting Subsystem manages member or user enrollment, related differential output/access tasks and "mailing list" routines, billing or other relations with TRIPS retail users and third-party providers of goods and services offered via TRIPS, as well as "ratings" or statistical bookkeeping on the usage of various items or facilities on TRIPS online or Internet sites. At 163 in FIG. 1B, the HOW? main input menu also includes sub-menus for relating and previewing preferred transportation modes under "HOW TO GO", travel budget data under "HOW MUCH", and reservations or other special offers under "ARRANGE".

FIG. 1C illustrates input facilities for a relatively fully-developed TRIPS embodiment. In the alternative, a streamlined or embedded version of the TRIPS invention involves more abbreviated or truncated means for access or input to the essential TRIPS Subsystems. For example, simplified TRIPS software, primarily oriented towards map and geographic information, can enable access to topical information by no more than a single command button e.g. "PRODUCTS" added e.g. to the top menu bar at 153 in FIG. 1C. Condensed temporal input means can also be installed or embedded in a GUI—such as a map display 152; for example, the time/date information aspect of a Map Note (e.g. the birthday Map Note 167) can be the only temporal input means for a "dumbed-down" version of TRIPS. Simplified, standard travel information inputs (e.g. "push-buttons" for rescue services, local accommodations or route directions) are described below, particularly referring to FIG. 9, for wireless online travel information inquiries to a TRIPS site from users equipped with GPS in vehicles or at remote field locations.

FIGS. 2 & 3

FIG. 2 is a block diagram laying out the major components of the novel travel reservation information planning system (TRIPS) invention 203. FIG. 3 is a simplified representation of the preferred data structure for storage, retrieval and processing of the characteristic species TRIPS travel information—i.e. for the software management of geographic, temporal, topical and/or transactional records in TRIPS.

A TRIPS Retail Consumer Input is shown at 205 in FIG. 2. Retail user input 205 includes travel planning inquiries preferably formulated using variable query sequences addressing common-sense travel plan decisions or issues framed as Where?, When?, What/Who? and/or How? queries facilitated by the four TRIPS main input menus in FIG. 1C, or by equivalent input means. In FIG. 2, the main input menus and common-sense travel issues correspond, respectively, to the Geographic 221, Temporal 223, Topical 213 and Accounting 217 Subsystems in the TRIPS travel reservation information planning system 203. Said four characteristic Subsystems—at 221, 223, 213 and 217—handle TRIPS user inquiries directed to place, time, topic and transaction decisions, respectively, and therefore correspond also to the discrete relational data sub-structures shown in FIG. 3, respectively, for GEOGRAPHIC, TEMPORAL, TOPICAL, and ACCOUNTING DATA.

In FIG. 2, the Interface & Interaction Bus at 209 generally represents TRIPS processes for user-controlled sequencing, variable integration and selective accumulation of geographic, temporal, topical and accounting travel information in response to TRIPS user input travel inquiries. The TRIPS Interface & Interaction Bus 209 functions to furnish flexible user-directed access to, from and among the four Subsystems at 221, 223, 213 and 217 within TRIPS 203. In advanced or fully articulated TRIPS implementations detailed hereinafter, the Interface & Interaction Bus 209 also manages integrated and/or automated operations. Integrated TRIPS operations include the transfer of characteristic TRIPS data, relational database parameters and/or software commands—while automated TRIPS operations entail prescribed sequences of travel information operations, software "scripts" or batch files, multi-step processes, slide shows, animations, etc.—as detailed hereinafter particularly referring to FIGS. 4–9. Alternatively, the TRIPS Geographic 221, Temporal 223, Topical 213, and Accounting 217 Subsystems can be utilized "one-step-at-a-time" or manually (i.e. with user intervention after each and every step or Subsystem). The TRIPS Subsystems are also amenable for ad hoc exploration or user-controlled browsing—as well as computerized searches or integration. The FIG. 4 flow chart and relevant text further illustrate and detail preferred means for arranging TRIPS travel queries about places, times, topics and/or transactions.

Preferably, TRIPS 203 further offers/brokers Provider Input/Output 231 to and from third-party providers of travel information and services—optimally in real time online. Such third-party participation online enables enrolled TRIPS users to enjoy more immediate offerings, such as updated information on accommodations availability i.e. vacancies, special offers for price discounts or extra services, reservations and/or tickets for diverse accommodations or events, and so forth—as described in more detail hereinafter, particularly referring to FIG. 8.

TRIPS Retail User Outputs are generally represented at 227 in FIG. 2. Such retail output includes digital displays, printouts on sheet media, as well as electronic communications to remote and/or auxiliary portable devices—detailed heretofore with particular reference to FIG. 1A. FIG. 1B depicted TRIPS Retail User Output in a preferred "map ticket" format arranged in geographic and temporal order of planned travel. Hereinafter, for purposes of preferred online or Internet embodiments, FIG. 4 breaks down TRIPS retail output, differentiating access by registered or enrolled users to VALUABLE OUTPUT 447 as opposed to FREE OUTPUT 445 which is made available to anonymous Internet "surfers," as an enticement to become members or registered users. The retail consumer output block as outlined at 227 in FIG. 2, however, generally includes both the "free" and "valuable" varieties of online output.

FIG. 3 represents a simplified standard TRIPS data structure as used to build TRIPS database(s) and TRIPS data objects. The TRIPS relational database, electronic communications among TRIPS devices, ongoing TRIPS operations and overall TRIPS travel planning sessions are constructed by means of "data packets" conforming to the standard data structure in FIG. 3. Preferably, every TRIPS "data packet" has a telltale OBJECT I.D.: e.g. a unique random number, or a binary representation of the precise date/time it was first created or the most recent time/date that particular TRIPS record or object was processed. Further "stamping" of each discrete TRIPS data packet/object, for example with "input device" and "data type" designations, aids object manipulations or transfers between computers—as disclosed in David M. DeLorme and Keith A. Gray, U.S. patent application Ser. No. 08/265,327 titled "COMPUTER-AIDED MAP LOCATION SYSTEM" [or CAMLS], assigned to DeLorme Publishing Co., Inc., which also owns this TRIPS disclosure. OBJECT I.D.'s are not ordinarily displayed to, or employed by, TRIPS users in a typical travel planning session. OBJECT I.D.'s rather function "behind the screen" as "identity tags" on working TRIPS data packets performing transparent software housekeeping related to tasks such as database management, electronic transfers and communications, TRIPS "ratings" and other accounting chores, and so forth.

As tabulated in FIG. 3, the standard TRIPS data structure provides for discrete storage and retrieval of, among other things, TOPICAL DATA. TOPICAL DATA is preferably chosen from a large diversity of content and subject-matters broadly related to travel, such as activities or things to do, common and/or proper names (e.g., of people, organizations, products, goods/services, natural and/or man-made phenomena, and so forth)—with supplemental information in various amounts and/or formats In fully articulated versions of TRIPS, preferred TOPICAL DATA includes diverse forms and media such as moving or still pictures, graphic images, alphanumeric text, tabulated information, audio/voice, and so forth. Such TOPICAL DATA can be analog or digital.

In FIG. 2, the Topical Subsystem diagramed at 213 (also equivalent to Topics at 415 in FIG. 4) processes TOPICAL DATA and related contents and supplemental subject-matter information—as detailed more hereinafter in relation to FIG. 7 in particular.

The standard TRIPS data structure, as expressed in FIG. 3, furthermore includes means for discrete storage and retrieval of GEOGRAPHIC DATA such as place names, waypoints along routes, plus all manner of map or mappable point, vector, raster or regional data locatable more or less precisely at actual, estimated or proposed spatial positions on or near the surface of the earth by geographical coordinates, such as conventional latitude and longitude (lat/long), UTM, other map grid references, and/or equivalent means. TRIPS GEOGRAPHIC DATA, as shown in FIG. 3, is preferably stored in, and retrieved or selected from, one or more map database(s), or geographic information system (s) (GIS) including many scales and levels of resolution or detail, spanning global or national areas, with regional map information, or even closer scale neighborhood, large facility or typical building floor plan layouts. TRIPS geographic information is preferably managed as map displays, or by other means of digital cartography, and/or correlated with TRIPS travel plan output and/or printed or hard-copy maps. But, additionally or instead, the TRIPS invention also inputs, stores, retrieves, processes, transmits and/or outputs geographic information or data apart from maps: e.g., as point, line or vector data; "locatable" textual, audio or graphic information; written or spoken directions (such as "Turn right, go north on Main St" or "Take Ramp #7, take escalator, turn right or west, follow signs to Gate B"). Such TRIPS geographic information is sometimes used by itself or independently (e.g., audio travel directions followed by the driver of a vehicle without visually consulting a map), or in conjunction with corresponding geographic correlative information like lat/longs, specific map grid references or names, related map displays, GPS receiver outputs, sheet or paper media travel plan outputs (which may be hard-copied TRIPS print-outs or separate companion paper products e.g. a print map book) or other pertinent outputs and information.

FIG. 3 GEOGRAPHIC DATA data is mainly processed using the TRIPS Geographic Subsystem at 213 in FIG. 2 (comparable to Places 417 in FIG. 4)—with more details provided hereinafter, particularly relative to FIG. 5.

Also included in the standard TRIPS data structure, shown in FIG. 3, is a sub-structure for characteristic TEMPORAL DATA, in turn, managed primarily by the Temporal Subsystem 223 in FIG. 2 (also, in TIMES, at 419, in FIG. 4). Such TEMPORAL DATA addresses years, dates, times, other usual chronological measures, indicators and/or arrays pertaining to events, time periods, appointments, actual happenings or postulated temporal occurrences—as recorded, proposed, scheduled, negotiated or predicted at points or periods in time, typically by one or more persons, interested parties or organizations, including TRIPS retail users or participating travel information/service providers. In FIG. 2, TRIPS 203 stores, retrieves and processes TEMPORAL DATA or chronologically related information utilizing well known means. TEMPORAL DATA in FIG. 3 and corresponding Temporal or Times Subsystem further include or manage the following: (1) for typical well-articulated TRIPS embodiments, an extensive, browsable, searchable calendar database and display of EVENTS OF INTEREST (EOIs) for queries and responses related to scheduled, predicted or proposed event of all kinds; (2) the related SCHEDULER sub-menu functionality for travel itinerary management, as presented heretofore in FIG. 1C under 161, and further described hereinafter relative to FIG. 6; (3) digital almanac functionality formed of tools and data related to the dates/times and other dimensions of natural phenomena—such as sunrise, sunset, high and low tide, moon phases, rainfall/temperature averages, and other data which is useful for planning and scheduling outdoors activities like hiking, camping, boating, observing nature, and so forth—as described in more detail hereinafter, with particular reference to FIGS. 6 and 9; (4) updates or more current information on diverse topics, replacing or supplementing earlier information and preferably provided online for freshness.

As diagrammed at 231 in FIG. 2 and further disclosed relative to ACCTS at 411 in FIG. 4 and to FIG. 8, the Accounting Subsystem at 231 manages ACCOUNTING DATA within the simple relational data structure shown in FIG. 3. ACCOUNTING DATA is involved in various transactional operations in TRIPS, such as: (1) user registration or member enrollment, plus the related "free" versus "valuable" access/output differentials; (2) accounting for travel service/information transactions, and other compensable exchanges among TRIPS site operators, retail users and/or participating third-party providers, for purposes of invoicing and billing in accord with standing TRIPS site policies and contractual arrangements; and (3) tracking and dispensing statistical data or "ratings" for the TRIPS online or Internet site usage or "hits" on the overall site and/or specified parts thereof—as an index or measure of participation and/or promotional value. These TRIPS transactional data functions are detailed hereinafter, referring particularly to FIGS. 4 and 8.

Retail users of preferred TRIPS embodiments start and/or continue travel planning sessions with inquiries directed to any one of the four Subsystems for Geographic 221, Temporal 223, Topical 213, or Accounting 217 processes and information in FIG. 2—as further detailed particularly referring to FIG. 4 hereinafter. Individual TRIPS travel planning sessions preferably proceed with variable sequences or series of chained together "sub-sessions" i.e. component steps. Each one of these steps or component "sub-sessions" unfolds or occurs through the installation of new data, and/or the modification of previously installed data, within one of the five sub-structural parts of the TRIPS data object structure tabulated in FIG. 3. Moreover, the standard FIG. 3 TRIPS data structure—including OBJECT I.D., TOPICAL, GEOGRAPHIC, TEMPORAL and ACCOUNTING DATA sub-structures—serves as the stock "data packet" (or software template or building block) for TRIPS relational database operations, electronic data transfers and communications, as well as the construction of emerging, more or less simple or complex, individualized TRIPS travel planning sessions.

For example, suppose John Jones from Knox, Ind. "logs onto" a TRIPS online or Internet site. The basic user identity data (name, address, membership code and so forth) is entered in the ACCOUNTING DATA sub-structure shown in FIG. 3 for processing in the TRIPS Accounting Subsystem 217 in FIG. 2. User registration and the differential access/output arrangements contingent upon membership or registered status are resolved in the Accounting Subsystem 217 in relation to the emerging ACCOUNTING DATA sub-structure, which is provided for John Jones' nascent TRIPS travel planning session. Next in the hypothetical case at hand, suppose John Jones commences his substantive travel planning session in TRIPS by electing to create a record of the date/time of the birthday party planned for his grandmother. Of course, this operation gets handled in the TRIPS Temporal Subsystem at 223 in FIG. 2 by the installation of John Jones' substantive input in the FIG. 3 TEMPORAL DATA sub-structure of the "data packet" or standard data structure devoted to John Jones' ongoing TRIPS travel planning session. If John Jones next decides to input his hometown of Knox, Ind. as the START or the departure point of his planned trip and the location of his grandmother's birthday party in Pownal, Me. as his intended destination or FINISH, this input is handled in the 221 Geographic Subsystem in FIG. 2 and entered in the GEOGRAPHIC DATA sub-portion of the FIG. 3 standard data structure or overall session "data packet". Further operations or "sub-sessions" at John Jones' option—e.g. asking after added place, time, topical or transactional information of interest— proceed in the characteristic TRIPS Subsystems and the corresponding data sub-structures.

The TRIPS invention facilitates integration between travel information from prior steps in a TRIPS session with ensuing component operations in a given travel planning session. As detailed further starting in relation to FIG. 4 hereinafter, after a TRIPS user opts to focus on a particular date/time or a certain topic, then TRIPS "intelligent" software can shape or enhance later steps or operations based on those prior temporal or topical inputs. For a more specific instance, after John Jones has input the date/time of his grandmother's birthday celebration inside the Temporal Subsystem at 223 in FIG. 2, subsequent queries about places, topics, other times, plane flights, car rentals, and so forth, are more readily focused upon the time-frame in which John Jones wants to travel. This is accomplished because the TRIPS software enables users to opt for subsequent queries to be influenced by sub-structural information (e.g. TEMPORAL DATA) previously recorded within the FIG. 3 standard structure for the current TRIPS user session or episode.

In the same vein, after a TRIPS user has indicated particular topical interests early in a travel planning session, subsequent geographic or temporal inquiries, for example, can readily concentrate on information about places and times pertinent to those topics in which the user showed interest. More specifically, suppose Sara Smith independently explored or systematically searched in the Topical Subsystem 213 in FIG. 3 for information on the subjects of "scuba-diving" and "coral reefs"—engaging audio-visual presentations as well as text. TRIPS records Sara Smith's expressed interest in scuba-diving and coral reefs, for later reference, in TOPICAL DATA as shown in FIG. 3, which is a standard sub-portion of the structure of the TRIPS "data packet" being used to build her emerging TRIPS travel planning session. One advantage, in terms of content, is that Sara Smith can more readily retrieve the particular substantive information (e.g., text, pictures, sounds, etc.) on coral reefs and scuba-diving that she encountered for later preview, selection and incorporation or "attachment" to the output of her ongoing travel planning session. Sara Smith can also electronically transfer, digitally edit, progressively accumulate and/or combine or integrate the content of her particular searches into the topics of scuba diving and coral reefs by means of the TOPICAL DATA sub-structure and its tracking of her topical explorations or searches.

For follow-up operations, suppose Sara Smith turns next from the Topical Subsystem 213 to the Geographic Subsystem at 221 to look for places where she can actually go scuba-diving on coral reefs. For purposes of this next geographic or locational step, preferred TRIPS embodiment can either be more readily user prompted or automated to display maps and/or other geographically related data records about various coral reef locations suited to scuba-diving. These maps of special interest can appear almost magically as soon as Sara Smith turns to the Geographic Subsystem 221 because the TRIPS invention can be programmed, at that juncture, to check TOPICAL DATA in FIG. 3 and find records or pointers indicating her earlier underwater topical investigations. Otherwise, TRIPS can be programmed to "wait" until Sara Smith asks for such maps—just in case she has turned to the Geographic Subsystem 221 to do other tasks. Another alternative is embellishing the map displays with Map Notes listing the names and addresses of area charter services, resorts, schools, etc., specializing in scuba-diving around coral reefs, as found in the TRIPS relational database. The general idea is that a preferred TRIPS embodiment can take travel information from previous steps into account in arranging subsequent steps or operations—within an individual travel planning session in TRIPS—by consulting specified sub-structural records in the session's evolving TRIPS standard data structure shown generally in FIG. 3.

For yet another illustration of this general concept, suppose John Jones turns to the Accounting Subsystem at 227, in order to arrange for a convenient, hopefully not too expensive, round trip plane flight to his grandmother's birthday party—after entry or input of the date/time of the happy event in the Temporal Subsystem 223 in FIG. 2. This date/time input results in modifications to the TEMPORAL DATA sub-structure in FIG. 3. Also or instead, John Jones might turn to the Geographic Subsystem at 221, more specifically the ROUTES sub-menu within the WHERE? main menu for input at 155 in FIG. 1C, in order to consider optimum routes for the journey from his home in Knox, Ind. to and from the birthday party location. For example, John Jones might consult TRIPS about riding his motorcycle instead of flying, comparing costs and travel times. At any rate, whatever tasks or operations John Jones opts to do next in his TRIPS travel planning session can be facilitated—because, in anthropomorphic terms, the TRIPS software "knows" the date/time central to John Jones' travel plans. To enhance or automate subsequent operations, among other functions, this date/time information was memorized in the TEMPORAL DATA sub-structure, shown in FIG. 3, which is a standard part of the "data packet" underlying John Jones' individual travel planning session. Thus, TRIPS can take the time/date of the birthday party into account in any subsequent phases of John Jones' session in TRIPS including subsequent iterative operations in the Temporal Subsystem 223 itself (e.g. collateral scheduling issues and tasks). Selective sequencing and integration of the steps or operations involved in typical individual TRIPS travel planning sessions are further described hereinafter.

FIG. 4

FIG. 4 is a simplified flow chart, which illustrates user decision points and pathways for conducting, or sequencing and combining, one or more travel information queries, according to the present TRIPS (Travel Planning Information Reservation Systems) invention.

The FIG. 4 flow chart illuminates several dynamic features of the TRIPS invention, described immediately hereinafter. The user (or member) registration procedures and associated "free" versus "valuable" output/access differentials are preferable for TRIPS Internet or online embodiments. Manual and/or automated sequencing of the component operations that make up a individual TRIPS travel planning session facilitate independent exploration and/or variable integration of topical, geographical, temporal and/or accounting TRIPS travel information data records. In the course of individual travel planning sessions or use episodes in TRIPS, the travel information engaged by the user accumulates as personalized travel plan output, preferably in temporal/geographic travel order. Selections and arrangements of TRIPS travel information are subject to "playbacks" or previews, involving multimedia in fully articulated TRIPS embodiments. The TRIPS user is enabled to further sort, organize and/or edit emerging output to generate a final, customized travel plan over a succession of interactive travel planning steps, or sub-sessions—as delineated in FIG. 4.

TRIPS operations commence at 401 in FIG. 4, with a typical "splash screen" or "home page" Greeting 403 which introduces the TRIPS Internet travel planning site's features, capabilities and rules. At 404, inveterate "surfers" can opt for instant access to the Main Menu at 341, and explore limited travel information. Alternatively, the user can choose the "SEE TERMS" prompt at 404, and study the Internet site Terms+Conditions at 405, including: e.g. legal notices, licensing and contractual terms, restrictions on copies, uses and liability; explanation of the user or member registration protocols, benefits and obligations; payment/credit terms; and the like. The opening "home page" also often displays other announcements or messages: e.g. trial offers, promoting new TRIPS site services and functions; advertising, typically placed by participating third-party providers of TRIPS travel information/services; instructions or tips for the user; incentives encouraging user registration or membership enrollment; and so forth.

Whenever desired, user registration is achieved through the "REGISTER NOW" prompt at 407 in FIG. 4. This leads to "Accts." at 411 (i.e. "Accounts" abbreviated). Accts. corresponds to the Accounting Subsystem at 217 in FIG. 2 and the HOW? main input menu at 163 in FIG. 1C. To receive membership privileges on a TRIPS Internet site, users enroll through the USER REGISTRATION sub-menu, or by comparable means. Users register, "sign up" and/or set up an account by routine protocols for input of their name, address, credit card numbers and other personal or business data required or requested by the TRIPS Internet site proprietor. On account of such enrollment, or by user password entry, or by equivalent means, registered status is duly entered within the ACCOUNTING DATA sub-structure of the standard TRIPS data structure that evolves as part and parcel of the course of any TRIPS travel planning session—as detailed elsewhere in this disclosure with particular reference to FIGS. 3 and 8. As entered in the data structure of the current TRIPS travel planning session, the fact that the user is duly registered gets recognized at 439, and then permits access to and/or downloading of VALUABLE OUTPUT at 447 in FIG. 4.

Such enrolled users or "paid-up" subscribers are typically eligible for and automatically receive extended TRIPS travel information access, added outputs, functionality, special discounts and extra service offers. Thus, registered users enjoy enhanced travel planning and more VALUABLE OUTPUT 447 in FIG. 4. At the discretion of the TRIPS Internet site operator, anonymous online visitors or unaccountable Internet "surfers" are allowed access to at least restricted TRIPS functionality, services and/or travel information—e.g. FREE OUTPUT at 445. As flow charted in FIG. 4, these differential access/output arrangements—which favor the registered or self-identified TRIPS consumer over the anonymous user or cyberspace "surfer"—are preferable, especially for commercial Internet or online embodiments of TRIPS. The general aim is to attract "traffic" with FREE OUTPUT 445 while reserving VALUABLE OUTPUT 447 for registered users/members with a valid account. Accts. at 411 in FIG. 4 facilitates the tracking and management of diverse transactions, including: (1) the participation and obligations of the retail users and third-party providers of TRIPS travel information/services; (2) statistical data or "ratings" on actual usage of the TRIPS site. These TRIPS transactional or accounting data, financial and membership records, processes and functions are managed routinely in Accts. 411 in FIG. 4, preferably performed transparently as automated steps through the Interaction Bus 414, as detailed hereafter. TRIPS Accounting Subsystem and transactional operations are detailed elsewhere in the present disclosure—with particular reference to FIG. 8.

In FIG. 4, the Main Menu 413 and the Interaction Bus 414 correspond to the TRIPS Interface & Interaction Bus 209 in FIG. 2—as well as the main input menus at 155, 157, 161 and 163 in FIG. 1C—plus equivalent input means like graphical user interfaces or GUIs. Moreover, the Main Menu 413 and Interaction Bus 414 in FIG. 4 correspond to, and coordinate the response to, alternative input means embedded in specialized TRIPS field or in-vehicle embodiments that typically include the wireless communication of GPS position sensor data along with simplified, "push-button" travel information inquiries sent by users actually en route or at remote locations. Such automated, standardized operational TRIPS sequences are further described hereinafter—particularly referring to FIG. 9.

From the Main Menu 413 in FIG. 4, TRIPS users command and conduct individualized travel planning sessions or episodes of use. Users are free to return to "SEE TERMS" 404, read the Terms+Conditions 405 and/or "REGISTER NOW" at 407 and 411. Users can "QUIT?" 408 or Stop 409, if they decline to register, or at anytime from the Main Menu 413. But, anonymous visitors or "surfers" can also return to the Main Menu at 413—even if they resolve not to register at 407 and not to "QUIT?" at 408—and still get access to a restricted selection of "free" browsing and/or travel information output, as determined by the proprietor or operator of the TRIPS Internet or online site.

Through the Main Menu at 413 and/or the Interaction Bus 414 in FIG. 4, TRIPS users generally select or formulate and then proceed with one step or one or more sequences or sub-sessions of component TRIPS travel information processes or operations. Each such step or set of operations engages only one of the TRIPS Subsystems at 415, 417, 419, or 411 for Topical, Geographical, Temporal, and/or Accounting travel planning inquiries and responses, respectively. To handle more complex travel information queries and responses, the Main Menu 413 and/or the Interaction Bus 414 enable sequences of travel planning operations included of two or more component TRIPS steps or discrete sets of Subsystem operations.

Mirroring the central or pivotal role of the TRIPS Interface & Interaction Bus at 209 in FIG. 2, both the Main Menu 413 and Interaction Bus 414 in FIG. 4 serve to co-ordinate user access to the assorted TRIPS Subsystems—namely: Accts. 411 (matching the Accounting Subsystem in FIG. 2 at 217); Topics 415 (equivalent to the Topical Subsystem 213 in FIG. 2); Places 417 (identical to the Geographic Subsystem 221 in FIG. 2); Times 419 (same as the Temporal Subsystem 223 in FIG. 2). The structure and the function of the four TRIPS Subsystems were described heretofore, with reference to FIGS. 1C and 2 especially. These Subsystems are further detailed hereinafter, particularly with reference to FIGS. 5, 6, 7 and 8.

Users can engage in "one-step" operations in TRIPS as shown in FIG. 4, for example, searching for a specific geographical data item or a simple map in 417 and nothing else from any other TRIPS Subsystem. Or, an isolated TRIPS step in 415 can be used to obtain information only about one or more particular topics of interest. TRIPS preferred embodiments can also be used simply to gather limited temporal records, e.g.: the dates/times of one or more types or specific scheduled events—working just in 419. As determined by the TRIPS Internet site proprietor or operator, output from such singular operations is produced at 445 and/or 447 in FIG. 4. By their isolated nature, such "one-step" TRIPS operations accomplish no processing of travel information within any other TRIPS Subsystem(s). These elemental instances of TRIPS software utilization include a single step or set of operations, engaging only one of the TRIPS Subsystems at 415, 417, 419 or 411. After producing characteristic "one-step" output at 445 and/or 447, such isolated TRIPS operations proceed through 435 and 450, ending without more at the Main Menu 413.

The TRIPS invention, however, is designed to facilitate more progressive, prolonged, complex, informative, cutting, variably automated, and/or selectively integrated travel planning sessions or episodes of use—comprising a plurality of component steps. More diverse and personally useful travel information browsing and processing gets done preferably by sequentially or serially engaging two or more of the characteristic TRIPS Subsystems at 415, 417, 419, or 411 over the course of a more articulate planning session or use episode.

In any such series of TRIPS operations, intermediate output is produced at 437, 439, 445 and 447, then the next step proceeds by returning to the Main Menu 413, or to the Interaction Bus 414, through 435 and 450. Intermediate, emerging output at 445 and/or 447 accumulates—subject to user-editing and software sorting or filtration processes—during an overall TRIPS travel planning episode or session. Within the preferred TRIPS relational travel information database system, for his or her next travel planning step, the user can engage any one of the four Subsystems at 415, 417, 419 or 411. This next step or "sub-session" can be performed via the Main Menu 413—i.e. as a "manual" or user-directed travel information operation. Or, TRIPS operational sequences can be partially or completely "automated"—i.e. performed through the Interaction Bus 414 with the aid of a prearranged software "script" (e.g. macro, batch file, etc.)—as detailed more hereinafter, with particular reference to FIG. 9.

For their next step, users can decide to circle back to a TRIPS Subsystem already engaged previously in the same travel planning session—for example, to return and revise their earlier output or hunt for new information of the same kind. But, preferred TRIPS travel plans are generally produced by means of alternating operations amongst the four TRIPS Subsystems at 415, 417, 419 and/or 411—as illustrated in the FIG. 4 flow chart. Users can independently explore or browse for topical, geographic, temporal and/or transactional travel information of personal interest—moving among the characteristic TRIPS Subsystems. On the other hand, data, parameters and other software instructions or controls can also be transferred between the TRIPS Subsystems—for purposes of more integrated, computerized, relational travel information processing—as described hereinafter, particularly with reference to FIGS. 5, 6, 7 and 8. In sum, travel planning sessions using TRIPS preferably, and most usefully, chain together automated and/or manual sequences of more or less integrated and/or independent component steps. For access to and selection of diverse travel information, the TRIPS user engages and variably relates characteristic travel information from a plurality of the four TRIPS Subsystems (at 415, 417, 419 and/or 411) in order to develop and create an individualized TRIPS travel plan, according to the flow chart in FIG. 4. These preferred travel plans combine, integrate or blend together characteristic TRIPS geographical, temporal, topical and/or accounting travel information. In well-articulated embodiments of the TRIPS invention, users can preview multimedia travel information presentations of user-defined collections of topical, geographic, temporal and/or transactional data records. In this fashion, travel plan output is accumulated or compiled, arranged, selected, and/or edited in the course of the sequence of component operations or steps which make up the individualized overall TRIPS travel planning session.

The present TRIPS patent disclosure further employs the term "sub-session" for one component set of operations as performed in one TRIPS Subsystem before returning through 435 and 450 to 413 or 414. Such sub-sessions are sequenced together to "build" an overall TRIPS travel planning session and its output. As the term implies, one TRIPS sub-session can have many elements, comprising one or more user activities and/or software operations performed as a set within a single TRIPS Subsystem, as shown in FIG. 4. For example, Sara Smith can explore the topic of "coral reefs" and "scuba-diving"—engaging a host of relevant topical data records and functions in Topics 415, within an initial sub-session. Thereafter, through 435, 450 and the Interaction Bus 414 or the Main Menu 413, Sara Smith can elect to engage in a subsequent independent or integrated sub-session. For example, in Places 417, in an ensuing sub-session, Sara Smith can proceed with extensive user-directed browsing and/or more systematic computerized searching for geographic travel information such as maps, travel directions and supplemental text, audio or graphics about specific locations or points of interest (POIs). Instead or in addition, Sara Smith can follow-up with another sub-session in Times 419—investigating scheduled events related to her underwater topic and/or, at her option, exploring for dates/times or events of interest (EOIs) that are completely unrelated to her previous sub-session(s).

A given sub-session concentrates on the type of travel information and/or functions characteristic of the TRIPS Subsystem involved. For example, temporally defined data and operations are managed in Times 419. Tickets, discount or extra service offers, reservations and related services can be obtained only by a discrete sub-session in Accts. at 411. Geographic information and processes are handled in Places 417, and so forth. Travel planning sessions, which address two or more of the characteristic kinds of TRIPS travel information, are included of sequences or series of sub-sessions in the corresponding characteristic TRIPS Subsystems—according to the FIG. 4 flow chart. During a particular TRIPS travel planning session using a fully articulated online or Internet TRIPS embodiment for example, subsequent or ensuing sub-sessions can be related to or integrated with the travel information accumulated from one or more prior sub-sessions—including travel information from other TRIPS Subsystems—or not, as the user prefers. In other words, sequential sub-sessions in TRIPS can be integrated with data, controls and parameters passed between successive sub-sessions and/or Subsystems. Or, in subsequent sub-sessions, the TRIPS user can engage in independent browsing or digressive computerized searching or sorting, not related to previous sub-sessions.

Thus, according to the TRIPS invention as shown in FIG. 4, ensuing or later sub-sessions can also relate or integrate travel information and/or operations from the current Subsystem with TRIPS travel information selectively accumulated over the course of one or more earlier sub-sessions or component steps, that are part of the same TRIPS travel planning session or episode or use. For example in Places 419, Sara Smith can easily call up one or more maps relating to the topics of "scuba-diving" and "coral reefs" as selected and related in a previous operation in Topics 419. Similarly, in Accts. 411, John Jones can "shop" for and/or reserve airplane flights, places to stay, car rentals and/or other accommodations for the trip he is planning to attend his grandmother's birthday celebration. This browsing or computerized searching for timely accommodations reservations can be facilitated and chronologically arranged by John Jones' earlier input, in Times at 419, of the planned date/time for the birthday party or his larger proposed travel time-frame.

John Jones can benefit still further from the novel capabilities of the TRIPS invention for variable integration between successive steps and the assorted TRIPS Subsystems at 415, 417, 419 and 411—with the four characteristic types of travel information records preferably organized in a relational database. Building on the foregoing example, suppose the geographical location of Grandma Jones' birthday party got input as well, in Places 417, by means of an earlier manual or automated component operation. The location and date/time of the family birthday party then can be displayed as shown at 167 in FIG. 1C. Subsequent sub-sessions in John Jones' overall TRIPS travel planning session can thereafter be integrated with or take into account both the geographical information on his intended destination and the temporal information about the time and date of his planned trip to attend his grandmother's birthday party.

Moreover, from within any Subsystem in the midst of an ongoing sub-session or from the Main Menu 413, users of preferred online/Internet TRIPS embodiments can set up or arrange for sequential operations or sub-sessions in any of the four Subsystems. Relational parameters, commands and characteristic data can be set up in advance for one or more subsequent sub-sessions. The user can call for or script one or more subsequent sub-sessions for more or less automated execution. and so forth. For example, when inputting the intended birthday party date/time in Times 419, John Jones can arrange to have his subsequent sub-sessions relate to this prior temporal input. Thereafter, in the course of his emerging individual TRIPS travel planning session, when and if John Jones proceeds to Accts. 411, tickets or reservations or other timely special offers—which are simultaneous, contemporary or chronologically related to the birthday party date/time—can be automatically or more readily displayed or previewed for user consideration. For another example, in a follow-up sub-session back in Times at 419, a multimedia preview of EOIs (or events of interest) scheduled for the time-frame around the birthday party can be made to appear on the TRIPS display automatically or by a simple command. In this way, for further development of his personalized TRIPS travel plan, John Jones can preview and/or attach selected information about conflicting and/or temporally contiguous appointments, events, performances, deadlines or other EOI data—as detailed hereinafter with particular reference to FIG. 6.

Integration between a plurality of sequential sub-sessions is feasible. For an illustration, manual or automated entry of the birthday party location in Places 417, in a preceding step, can facilitate John Jones' later explorations in Accts. 411— for example, shopping for lodging or transportation reservations. The prior geographic input can also help searching in Times 419 for EOIs or scheduled events of interest limited to the local geographic area (e.g. a nearby sports or cultural event John Jones' might want to attend either before or after his grandmother's birthday party). The alternative stock hypothetical case in this disclosure provides added examples of integration involving multiple sequential sub-sessions in TRIPS. After selecting "scuba-diving" related to "coral reefs" in Topics 415, Sara Smith can prompt and preview a display of TRIPS maps of the locations of particular "coral reefs." The presentation of maps can further include listings and location information about a specific collection of scheduled events related to "scuba diving" (e.g. "located" or geocoded dates/times for particular diving classes, dive boat sailings, days/hours which particular dive-shops in specified places are open, seasonal or reservation availability information for particular scuba-diving related services), which are also pinpointed at specific geographic locations on the TRIPS display. A map display or series of map screens— integrated with dates/times and available reservation/ticket information related to the linked topics of "scuba-diving" and "coral reefs"—is thus presented to Sara Smith for preview by means of sequential, relational operations performed in the Topics 415, Places 417, Times 419 and Accts. 411 Subsystems, consistent with the flow chart in FIG. 4. Added details on such preferred TRIPS sequenced relational database operations, engaging a plurality of the TRIPS travel information Subsystems, are provided elsewhere in the present TRIPS disclosure—particularly referring to FIGS. 5–8.

Thus, generally, in the course of individual TRIPS travel planning episodes, the novel TRIPS invention provides users with options to relate or integrate topical, geographic, temporal and/or accounting or transactional data records from two or more of the characteristic TRIPS Subsystems at 415, 417, 419 and 411 as shown in FIG. 4 flow chart. Within an individual overall TRIPS travel planning session, prior, later and intervening steps are not always integrated, however—i.e. controls, travel data, and relational parameters do not necessarily get passed or transferred between successive sub-sessions and Subsystems in TRIPS. The flexibility of the TRIPS invention also enables TRIPS users to opt for independent exploration, e.g., digressively browsing for information about specific sports or music topics, and/or unrelated computerized searching, e.g. an impulsive search for the street address of one or more persons or organizations on the TRIPS map displays—operations which are disconnected, at least at present, from some or all of the previous steps in an individual TRIPS travel planning session.

Otherwise stated, the novel TRIPS invention also adjusts for more random, ad hoc or user-directed browsing (wherein data and controls do not pass between two or more successive sub-sessions or steps). Thus, Sara Smith can "turn" the TRIPS software travel information integration capabilities "off" or "down" in order to conduct one or a sequence of topical, geographic, temporal and/or transactional explorations or computerized searches not related to coral reefs and scuba-diving. John Jones is likewise free to shift to browsing unrelated places, events or topics—perhaps, in order to compose and consider a more convoluted route or itinerary to and/or from the birthday party for his grandmother. For example, John Jones may want to visit an old friend or a certain kind of museum or reserve a table for two at a particular restaurant—before or after, on the way to or from, but unrelated to his grandmother's birthday party. In sum, the TRIPS invention is designed to facilitate such additional, separate travel agendas, sidetracks or diversions—also, enabling disjunctive or digressive changes of the user's interest or attention and coping with false starts, dead-ends and fruitless searches or explorations. In this way, TRIPS allows more free-ranging, independent user explorations and/or selections—plus unrelated computer processing—of the characteristic TRIPS sub-types of travel information and/or special offers—at the user's discretion or even whim.

Thus, a major object of the TRIPS invention is to facilitate flexible interaction between independent user travel information selections and integrated processing of topical, geographical, temporal and/or transactional (or accounting) TRIPS data records. Therefore the FIG. 4 flow chart of the TRIPS user interface allows for less related, or even disconnected, sequential travel planning operations—such as unrelated user-directed browsing and computerized searching—accommodating the personal preferences, spontaneous attention shifts and diverse evolving interests of individual TRIPS users. In other words, TRIPS travel planning sessions sometimes meander like ordinary conversation or common-sense thought patterns. Focused diversions or digressions are allowed. Some explorations or searches are fruitless or abandoned. Travel information gathered at will, on a whim, or even at random is subject to inclusion in an individual travel plan, however, at the user's option. This maximizes the capabilities in TRIPS for the generation of personalized or "custom" travel plan outputs, reflecting user interests and preferences. But, as required or desired, TRIPS users can further employ sophisticated software processes to help with their travel plans. One or more sub-sessions of serendipitous, user-directed browsing among the various TRIPS travel information Subsystems 415, 417, 419 and 411 can be preceded and/or followed-up by one or more sub-sessions which involve state-of-the-art software integration of characteristic geographic, temporal, topical and/or accounting TRIPS travel information. From the Main Menu 413, or from within an ongoing step or sub-session, preferred articulated embodiments of the TRIPS invention provide user commands/controls which modulate the kind and the extent of travel information data relations or integration to be performed during the current or successive sub-session(s)—as described in more detail hereinafter, with particular reference to FIGS. 5, 6, 7 and 8.

TRIPS travel information gathered by independent user-directed operations gets incorporated into the travel plan output emerging from the ongoing, individual TRIPS travel planning session in two general ways. For one thing, the user can "attach" or manually command that selected numerical, text, graphic and/or audio travel information items be included in his or her emerging travel plan output—as disclosed in David M. DeLorme and Keith A. Gray, U.S. Pat. No. 5,559,707 "COMPUTER-AIDED ROUTING SYSTEM" [or CARS], as assigned to DeLorme Publishing Co., Inc. also owner of the present TRIPS patent disclosure. Second, TRIPS travel information gathered during independent user-directed operations is incorporated into emerging travel plan output by being used as an ingredient or by becoming the basis of a subsequent integrated operational sequence. John Jones might independently look up the exact street address of a personal friend in upstate New York or West Virginia, for example—with the "People" directory in the "INDEX & LISTS" sub-menu under the "WHAT/WHO?" main input menu at 157 in FIG. 1C, which is the gateway for user inquires addressing TOPICS 415 in FIG. 4. This independently user-derived topical travel information—i.e. the street address and name of John Jones' personal friend—can thereafter be "mapped", geocoded or geographically located by means of a subsequent, integrative step performed in the Geographic Subsystem or Places 417 in FIG. 4. The old friend's name and address is thereby located and pointed out on the TRIPS map display, for example, by a symbol and captioning Map Note—as disclosed in Keith A. Gray, U.S. patent application Ser. No. 08/521,828 titled "COMPUTERIZED ADDRESS LOCATION AND COMMUNICATIONS SYSTEM" [or CALCS] filed Aug. 31, 1995 and owned by DeLorme Publishing Co. Inc., also assignee of the present TRIPS Application.

Generally, travel information from sequential operations in preferred TRIPS travel planning sessions accumulates. Travel information from prior sub-sessions appears on the current TRIPS display, or as current audio or electronic output, to the extent that it has been integrated with or "attached" to the travel plan operations or outputs involved in the current sub-session. Over typical TRIPS travel planning sessions, TRIPS users selectively accumulate travel information in the form of an intermediate or emerging travel plan which is routinely output at 445 and/or at 447 in FIG. 4 as a result of each sub-session. Successive sub-sessions and interim outputs often include a consistent evolution of user-focused and software related travel information component operations, straightforwardly culminating in integrated final travel plan output. But, the TRIPS user is also allowed to digress, shift interest and/or attention—modifying, or totally or partially rejecting or deleting the contents or output(s) from one or more sub-sessions. Final travel plan output is generated at 445 and 447 too, as determined by the user's satisfaction and sense of completion, bringing an individualized TRIPS travel planning session to a conclusion. Final or intermediate TRIPS travel plan output can be saved in memory such that the output from a previous travel planning session or a selected sub-session can be recalled, modified and/or merged into a later TRIPS operation or travel planning session.

Over the sequential sub-sessions or component steps comprising a preferred TRIPS travel planning session, the accumulation, compilation or accretion of TRIPS travel information is subject to selection, alteration, and editing by the TRIPS user. For example, John Jones can manipulate his keyboard, mouse, or other equivalent means to add or remove particular TRIPS geographical, accounting, temporal or topical travel information data records—typically comprising specified locations, dates/times or scheduled events, topical information items, and/or special offers or tickets/reservations—to or from the map, itinerary or other portions of his emerging travel plan for going to and from his grandmother's birthday party. Such evolving TRIPS outputs or travel plans can be further elaborated, modified and/or distilled over one or more successive sub-sessions by means of a variety of computerized processes designed, in general, to assemble, focus, arrange, co-ordinate, merge and/or "filter" or sort characteristic TRIPS travel information records.

For example, as a previous or an initial step, suppose that Sara Smith had called up a sizeable collection of topical information related both to "scuba-diving" and "coral reefs" in Topics 415. Thereafter, Sara Smith can go via the Main Menu 413 in TRIPS to Places 417 and/or to Times 419—where she can then implement geographic and/or temporal "filters". Otherwise stated, by means of data sorting techniques well-known in the art, TRIPS enables Sara Smith to refine/reduce her overly big collection of underwater topical travel information down to linked "coral reef and scuba-diving" topical records which are located in one or more specified geographic regions and/or which coincide with one or more specified travel time-frames. Such "filtering" or data sorting operations preferably get done with state-of-the-art relational databasing software technologies and are further illustrated in relation to FIGS. 5, 6, 7 and 8.

The TRIPS invention shown in FIG. 4 enables fairly complex or intricate travel planning sessions. For example, as just described, Sara Smith can gather and select one or more potential destinations for a scuba-diving vacation using a mixed process of independent selection and computerized operations in TRIPS. Thereafter, Sara Smith can "shop" for related reservations and accommodations in added sub-sessions. Sara Smith is free to delete one or more of her provisionally chosen destinations. She might shift to explore and compute entirely different or unrelated travel activity topics, geographic destinations, temporal events, and/or accommodations reservations. Sara Smith can also develop, compare, and merge or selectively combine two or more alternative travel plans. Hence, different TRIPS users or individualized travel planning sessions by the same user typically include distinctive or "custom" sequences of TRIPS operations in conjunction with a unique combination and/or selection of travel information contents or substantive trip plan output generated through the flexible, adjustable, operational pathways outlined in FIG. 4.

The FIG. 4 flow chart facilitates flexible utilization and so accommodates different travel planning techniques and approaches. For example, some TRIPS users tend to start with self-directed or independent, disjunctive travel information explorations and searches. Initially, such users browse and manipulate the various TRIPS Subsystems in order to selectively gather or "hand-pick" geographic, topical, temporal and/or accounting information items of personal interest. In such TRIPS sessions, subsequent component steps often work towards more integrated final travel plan output by user editing and/or automated operations which combine or filter the travel information initially accumulated independently by the user. Other users or travel planning problems incline to travel planning sessions which begin with integrated operations—for example, establishing the particular time-frame(s) and/or possible destination(s) defining a proposed trip as initial steps, allowing the TRIPS software to automatically accumulate and present related travel information previews for the user to consider. With this second approach, TRIPS users often proceed next with more independent exploration, "hand-picking" and "attachment" of the available special offers, tickets, accommodations, topics, things to do, people and organizations, information on geographic points or POIs and/or temporal events of interest or EOIs—which were assembled and presented by the TRIPS multimedia preview functionality relative to their previously established travel time-frame and/or proposed destination(s). As detailed hereinafter, preferred TRIPS embodiments are designed to facilitate selective, flexible utilization and accommodate a broad diversity of travel planning scenarios and alternative methods for proceeding along the TRIPS operational pathways delineated in FIG. 4.

Singular or sequential TRIPS operations typically result in FREE OUTPUT 445 and/or VALUABLE OUTPUT 447 in FIG. 4. But some transparent TRIPS operations generate no apparent output for the user. For example, site "rating" or transaction-counting operations in Accts. 411—that work "behind the screen" to collect statistics on TRIPS site usage. Users engaged in independent browsing or exploration sometimes find nothing of interest. No new or intermediate output gets generated by such unproductive sub-sessions, for possible inclusion in the user's final travel plan. Singular or sequential TRIPS sub-sessions, however, typically do generate new travel plan output for the user at 445 and 447—i.e. output which at least modifies, "filters" or cuts down the intermediate travel information output which were accumulated in previous component steps or sub-sessions.

Final travel plan output is preferably arranged, edited and integrated over the course of an individualized TRIPS travel planning session. Component travel planning sub-sessions or steps normally engender interim, evolving or emerging outputs at 445 and/or 447 in FIG. 4. Final travel plan output—satisfactory to the individual user—also gets produced at 445 and/or 447 in FIG. 4. Though singular or initial steps may generate only FREE OUTPUT 445—as a typical rule established by TRIPS site owners or operators, final TRIPS travel plan output may include a mixture of FREE OUTPUT 445 plus VALUABLE OUTPUT 447 (which requires user registration). TRIPS Internet site operators or proprietors normally require user registration or member enrollment as a prerequisite to get "valuable" outputs such as reservations, tickets and/or other special offers. Registration or enrollment includes setting up the contractual relationships, user accounts, billing and credit arrangements required for such commercial consumer goods/services transactions.

As determined by the online TRIPS site management, anonymous and/or unregistered users might be permitted at least the "free" part of travel plan output including both FREE OUTPUT 445 and VALUABLE OUTPUT 447. Through 439 and 407, users can then obtain the "valuable" portion of such mixed "valuable" and "free" travel plan outputs by submitting to the prevailing procedures for setting up a member or use account, registering or enrolling. As detailed further in relation to FIG. 8, such variable differential output/access arrangements promote user registration, member enrollment and/or retail consumer self-identification—which are desirable both on public and commercial TRIPS online or Internet sites.

After each TRIPS sub-session in one component Subsystem, the TRIPS software next determines at 437 whether FREE OUTPUT is to be generated at 445. This decision gets made in the TRIPS software with reference to the specific then current algorithm/formula for "differential access/output", as described hereafter relative to FIG. 8. If all or a part of the sub-session results include "valuable" output, as defined by the current differential access/output algorithm, operations are then referred to 439 (at least for the "valuable" portion). The TRIPS software determines whether the present user is registered at 439 and whether the user or member has a valid account, and/or whether the user is an enrolled member, has entered a valid password, or otherwise is qualified to utilize the TRIPS Internet or online site, and so forth. This determination is made consulting the database for registered users, enrolled members, valid passwords, or the equivalent—which is maintained in relation to the Accts. 411 Subsystem in FIG. 4. Unregistered or registered status is therefore entered within the sub-structure for ACCOUNTING DATA, inside the standard TRIPS data structure or packet for the current TRIPS travel planning session—as described elsewhere in this disclosure, referring to FIG. 3 particularly—and/or by equivalent means. Absent a valid account, the surfer, unregistered or anonymous user goes to the "REGISTER NOW" prompt at 407 and is given the opportunity to enroll in Accts. 411. When the user is judged to be qualified or have a valid account at 439, then VALUABLE OUTPUT 447 gets generated as prescribed by the prevailing "differential access/output" algorithm. Unregistered users are allowed only the "free" portion of output included of both "free" and "valuable" elements—as a rule—with the "valuable" part redacted and only available upon registration. Then, after final or interim "free" and/or "valuable" output is provided for at 445 and/or 447, upon completion of a singular "one-step" or a sequential component sub-session, the TRIPS operational path flows together at 435 and proceeds to 450, as outlined in FIG. 4.

As determined at 450, preferred embodiments of TRIPS provide capabilities for "controlled sequencing." In this present patent application, the term "controlled sequencing" refers—among other things—to "manual" sequencing controlled on a step-by-basis by the TRIPS user proceeding via the Main Menu 413. Alternatively or additionally, "controlled sequences" also include "automated" series of two or more successive TRIPS sub-sessions. Such "automated" sequences of a plurality of TRIPS operations can be linear, looped and/or contingent serial arrangements of component TRIPS operations generated and managed by means well-known in the art such as "macros" or batch files and/or equivalent techniques.

At 450 in FIG. 4, in effect, the TRIPS software decides IS THE NEXT STEP MANUAL?. Otherwise stated, at 450, the TRIPS software performs a routine EOF or "end-of-[batch]-file?" analysis—assessing whether any more "automated" TRIPS operations remain to be executed, according to the pre-arranged software script or batch file governing the automated sequence. Any remaining steps in a pre-arranged or "automated" sequence or series of component TRIPS operations are executed through the Interaction Bus at 414. The TRIPS software returns to the Main Menu 413 on completion of any such pre-arranged TRIPS script, batch file, macro, or other equivalent "automated sequencing" means. Furthermore, for added user input and control, automated sequences of TRIPS operations can be programmed to "pause" at the Main Menu 413 and ask for further user instructions or selections—before proceeding on with their "automated" software script.

This novel TRIPS capability for variable automated sequences yields many useful applications. For example, "animations" or "revolving" displays and tutorials showing TRIPS information and operations can attract, entertain and educate new users. TRIPS sites can provide standardized automated command sets to execute combined TRIPS operations—such as the simplified in-vehicle "push-button" user inputs for sequential processing of GPS time, position and directional data joined with standardized requests for e.g. emergency services, travel directions, and/or local available goods/services information, and so forth—as hereinafter detailed, with particular reference to FIG. 9. Advanced TRIPS users can concoct and implement their own "macros", batch files or automated sequences of operations in fully articulated TRIPS embodiments. As detailed hereinafter, sequential operations in an "automated" series of component TRIPS operations typically involve relating, integrating and presenting a user-defined collection of travel information from the diverse TRIPS topical, geographic, temporal and/or accounting Subsystems. In this way, the TRIPS capability for automated sequences facilitates presentations of one or more related TRIPS data records, for user consideration, preferably in the form of a multimedia preview of ordered travel information. For purposes of a tutorial or animated display of TRIPS features, functioning and travel information formats, for example, more independent and/or disjunctive (i.e. less integrated or unrelated) sequences of TRIPS operations and travel information content can be chained together by means of a pre-arranged software script. Such a revolving animation—provided on the "home page" of a TRIPS online/Internet site, as a promotional and user education tool—can include a collection of TRIPS travel information topics, locations, events and/or good/service offers consistently "rated" as popular on the TRIPS site (i.e. among the most frequently "hit" by anonymous surfers and registered users alike).

FIGS. 5, 5A, 5B, 5C & 5D

Figure 5:
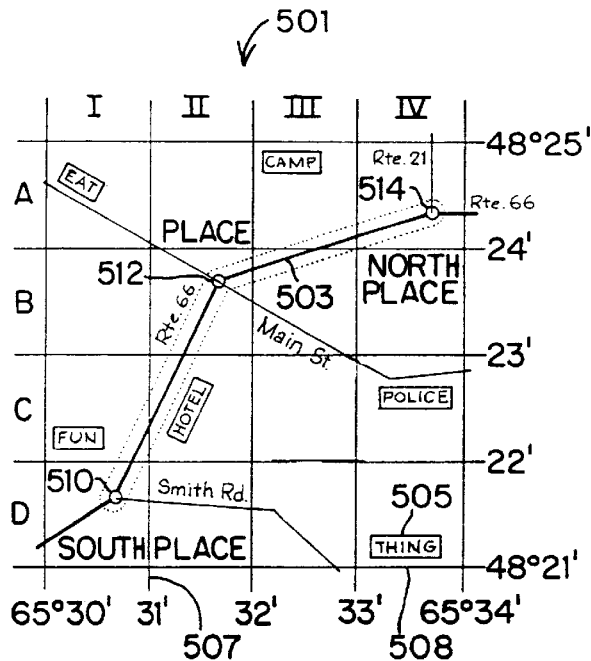
FIG. 5 including
Figure 5A:
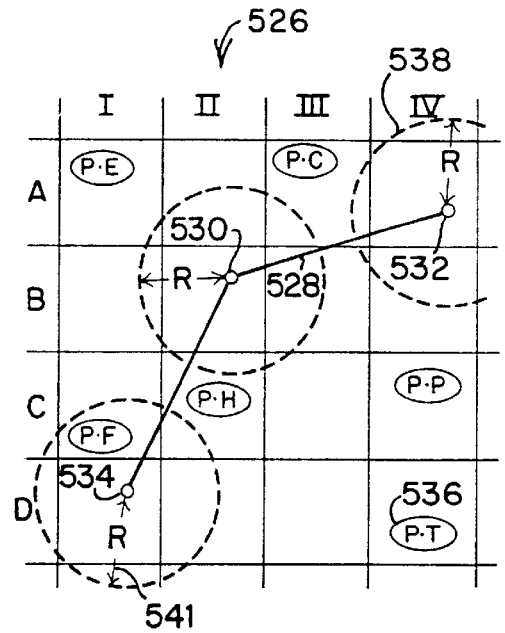
FIGS. 5A–5D, represents functioning within the TRIPS Geographic Subsystem—showing how route-related points of interest (POIs) are circumscribed and gathered within user-defined proximity to a computed route for multimedia preview.
Figure 5B:
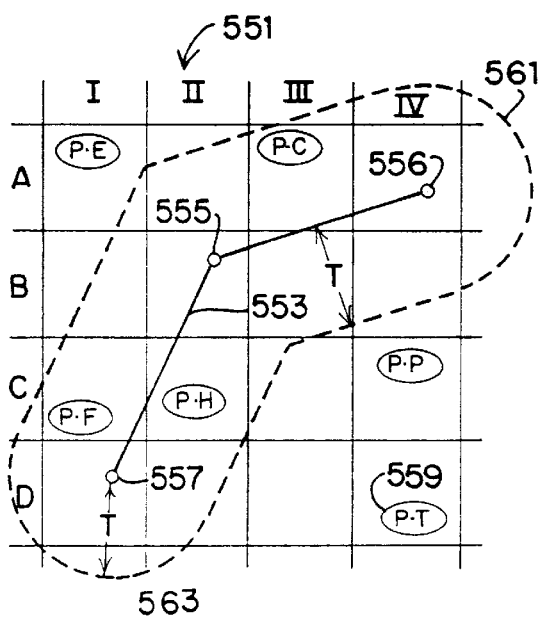
Figure 5C:
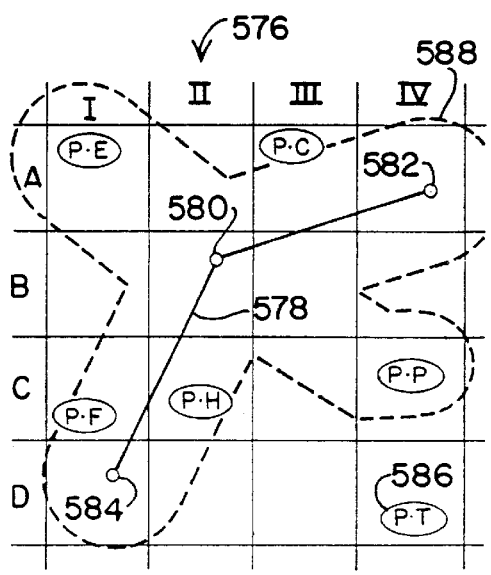
Figure 5D:
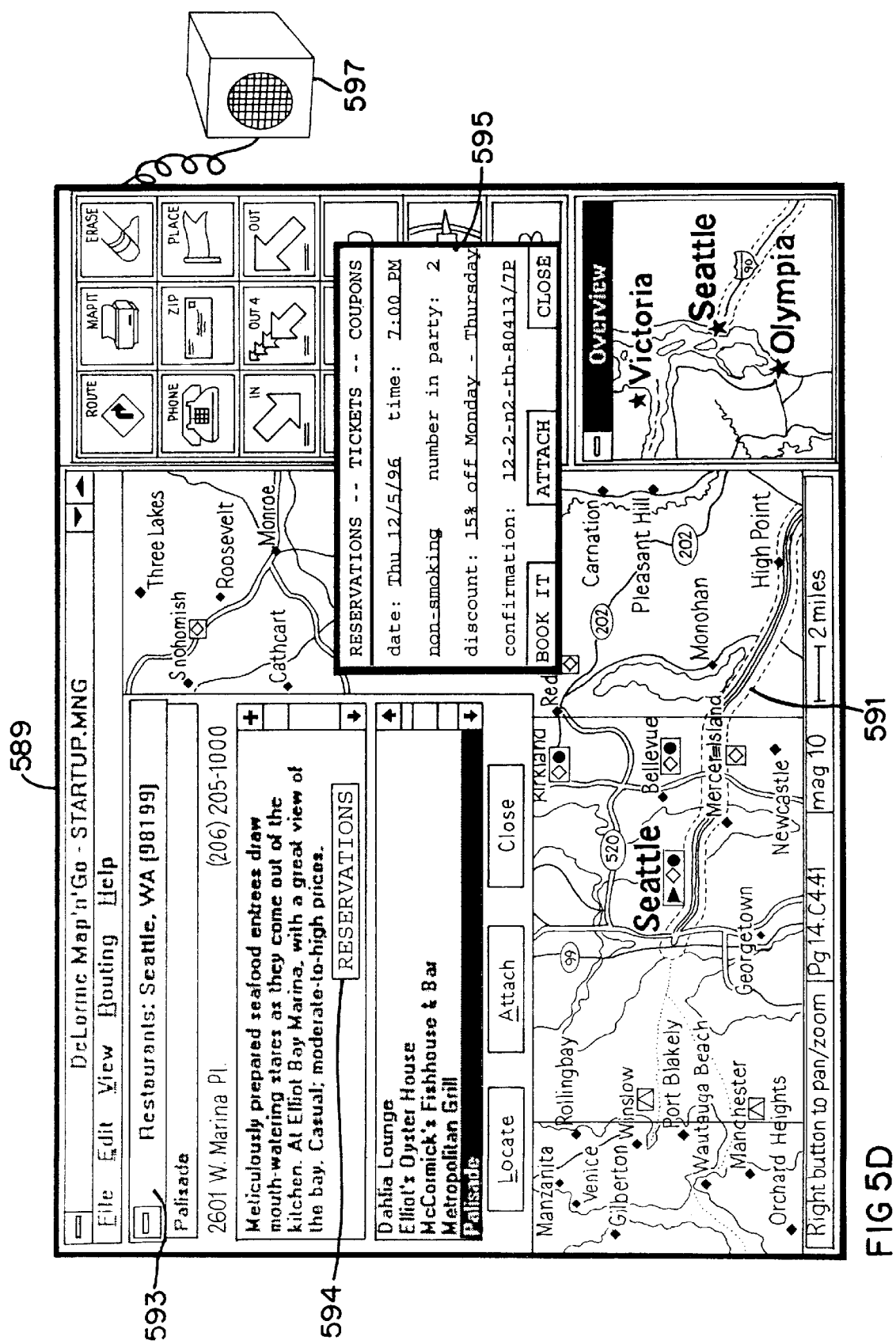

FIG. 5 depicts a simplified, preferred TRIPS map screen 501 showing waypoints 510, 512 and 514 along a hi-lighted, computed route 503. FIGS. 5A, 5B and 5C reveal alternative methods for circumscribing or retrieving one or more sets of topically classified geographical points of interest (POIs) located in the region or vicinity of the route. FIG. 5D illustrates a multimedia travelog preview about such a set of points of interest found along the route at 503 plus a related "map ticket" dialog box for transactional TRIPS user input e.g. to make reservations, buy tickets, get special offer coupons, and so forth—according to the present TRIPS invention. Thus, users are enabled to consider supplemental text, graphic and audio travel information on selected locations or POIs nearby possible routes for purposes of making travel plans and arrangements in TRIPS.

FIGS. 5, 5A, 5B, and 5C duplicate identically labelled figures found in U.S. Pat. No. 5,550,707 for COMPUTER AIDED ROUTING SYSTEM [CARS], David M. DeLorme and Keith A. Gray inventors, issued Sep. 24, 1996 and related U.S. patent application Ser. No. 08/662,600 titled COMPUTER AIDED ROUTING AND POSITIONING SYSTEM [CARPS], by same inventors, filed Jun. 11, 1996; both CARS and CARPS patent disclosures are incorporated herein by reference and assigned to DeLorme Publishing Co., Inc. (which is also assignee of the present TRIPS patent disclosure). TRIPS FIG. 5D is an adaptation of FIG. 1P from CARS and CARPS.

The CARS and CARPS disclosures, just cited above, describe preferable implementations of the TRIPS Geographic Subsystem illustrated herein in FIG. 2 at 221 and in FIG. 4 at 417 under "Places". Therefore, in a well developed TRIPS online or Internet system, the Geographic Subsystem includes at least the following software capabilities: (1) a map display graphic user interface enabling the TRIPS user to zoom to different scale maps with variable resolution or levels of detail, to pan or shift seamlessly to other map locations (i.e. different latitudes and longitudes) and to locate named places, zip code or phone exchange areas, street addresses or other landmarks and ordinary language geographic location and direction identifiers on the map display and related output, including printed maps and travel plans; (2) supplemental and/or updated information on points of interest or POIs, including multimedia on places near optimum computed travel routes, with at least some POIs topically classified e.g. as hotels, campgrounds, restaurants, public safety facilities, and so on; (3) multimedia travelog previews or presentations on sets of POIs found within an area or region circumscribed around a computed route with capabilities for the user to add selected POIs, or related text, audio or graphic information to his or her emerging travel plan; (4) electronic communication or transfers of discrete, compact files of map-related information between remote computer devices equipped with compatible mapping technology; and/or (5) transferring of geographic data files to and from auxiliary devices like highly portable GPS receivers or other handheld digital travel aids.

Fully articulated TRIPS embodiments improve upon the CARS and CARPS technologies. Among other advances, the preferred TRIPS relational database includes the Temporal Subsystem and Accounting Subsystem, further disclosed hereinafter relative to FIGS. 6 and 8 respectively. The TRIPS invention thus facilitates user browsing and/or computerized searching of chronological and/or transactional travel information by state-of-the art relational database technology—instead of, or preferably in conjunction with, interactions between geographic routing capabilities and multimedia topical information presentations on POIs or geographically located points of interest described in the earlier DeLorme CARS and CARPS patent disclosures.

TRIPS FIG. 5 illustrates various topical types or database classes of geographically located points of interest or POIs—e.g. "EAT", "FUN", "HOTEL", "CAMP" and "POLICE" as indicated at 505 by "THING". Such topical POI data types were implemented in the Map'n'Go 1.0 CD-ROM, published in July 1994, by DeLorme Publishing Co. Inc. and embodying the CARS invention. Map'n'Go 1.0 enabled database sorting of POIs by pre-defined data types—e.g. "Hotel", "Campground" and "Restaurant". Map'n'Go 1.0 enabled its users to prompt a multimedia preview or automated slide show presenting graphical, textual and/or audio travel information on user selected types of multiple POIs located along a computed route. Such Map'n'Go 1.0 multimedia previews could be focused at the user's option, for example, just on Hotel type POIs, only on Restaurants, or include information all Hotels, Restaurants and Campgrounds found in the area of the user's planned travel route—and so forth. Moreover, Map'n'Go 1.0 users could select and include travel information from these topically focused previews in their individualized travel plan output.

TRIPS improves on CARS and Map'n'Go 1.0—for example, by addition of temporal and/or transactional travel information and database relations. POIs in CARS and Map'n'Go 1.0 included geographical and topical data records such as latitude/longitude location information and multimedia describing particular hotels and restaurants. As shown in FIG. 3 in the present disclosure, the standard structure for TRIPS data records includes discrete temporal and accounting data as well as geographic and topical information. Therefore, in TRIPS, the standard data records for THING 505 and other POIs in FIG. 5 preferably include, or at least allow for, temporal information such as dates/times during which EOIs or events of interest ((e.g. a musical performance, a cultural or social event, etc.) are scheduled and/or for which designated goods/services are available. These added temporal contents and related database operations are described in more detail hereinafter with particular reference to FIG. 6. Furthermore, standard TRIPS data records for a geographic point of interest or POI like EAT or HOTEL in FIG. 5 preferably also includes structural provisions for accounting (or travel arrangement or transactional) information—e.g.: participating providers identities; pricing of offered goods/services; vacancy and/or availability information; plus an opportunity and means for TRIPS users to buy, claim or accept goods/services offered in TRIPS—e.g. plane tickets, car rental or lodging reservations, coupons for extra services or price discounts, and so forth—under designated terms and conditions. The additional transactional travel information contents in TRIPS and pertinent Accounting Subsystem database relations and operations are detailed further hereinafter, particularly in relation to FIGS. 5D, 8A and 8B.

Alternative TRIPS embodiments can include a more elaborate or a simpler Geographic Subsystem, however. For example, rather than a visual map display distracting automobile drivers, predominantly audio input/output are preferred for online TRIPS embodiments providing reservation and/or emergency services, or travel directions via wireless communications with TRIPS in-vehicle retail users. FIGS. 5A, 5B, and 5C illustrate a variety of methods for retrieval of topically classified points of interest or POIs from a user-defined region or area around a previously computed route i.e. an ordered array of waypoints or destinations that form an optimum travel route. Simpler TRIPS embodiments, operational modes, or particular episodes of use do not necessarily entail software routing between multiple waypoints or geographic locations. Limited TRIPS implementations can nonetheless search for and retrieve topically classified POIs or points of interest around an individual user-selected geographical point or location—as illustrated at 534 and 541 in FIG. 5A. POIs situated around a single location, a set of points or a computed route in TRIPS can further be sorted or filtered by topical, temporal, and/or transactional criteria—as detailed elsewhere in this disclosure, particularly regarding FIG. 8B. At least, the TRIPS Geographic Subsystem includes a plurality of spatially related data records which the user is able to process, select, and/or include with text, graphical, and/or audio plan output.

TRIPS FIG. 5D illustrates an ongoing preview of topical information on local restaurants, as arranged and presented by a preferred TRIPS embodiment. The underlying map display interface 589 indicates a previously computed route between user-selected geographic points by highlighting of recommended roads and waypoints at 591. Based on the methods disclosed in FIGS. 5, 5A, 5B and 5C and the above-cited CARS and CARPS disclosures, in FIG. 5D, the TRIPS user has chosen to preview supplemental information about one or more selected types or categories of POIs, for example, Restaurants at 593. Thus, to plan and make dinner reservations for example, the TRIPS invention facilitates a presentation about restaurants located in a user-selected area. At the moment depicted in FIG. 5D, the user can read text information about the Palisade restaurant selected from a list of route-related or area restaurants. As detailed elsewhere in the present and related disclosures, TRIPS users can also consider other or combined types of POIs such as Hotels, Campgrounds and so forth; the user could also consider graphic and audio 597 travel information—as well as text; the user is enabled to visualize, read, or hear travel information on multiple geographic points of interest or POIs retrieved within one or more user-defined regions or areas around a route of travel previously computed and/or one more selected places or geographic points; the user can "Locate" or indicate one or more POIs, like the Palisade restaurant, on the map display 589; one or more selected POIs can be added as new waypoint input to the user's planned route, which can then be recalculated; and TRIPS users can "Attach" (i.e. include or incorporate) supplemental information on selected POIs within their personalized travel plan output. The TRIPS invention further facilitates making reservations and/or ticket purchases, accessing special offers for goods/services, and other travel related transactions between TRIPS users and participating providers.

In FIG. 5D, the TRIPS user "pushes" an on-screen button at 594 as a first step in making reservations (e.g. dinner for two at the Palisades restaurant), and calls up the "RESERVATIONS—TICKETS—COUPONS" dialog box 595. In the 595 dialog box, the user enters the "date" and "time" desired for dinner; this date and time can also be selected in TRIPS, for example, from the computed estimated arrival time of the user at the reservation destination, as calculated by the routing software. TRIPS users can additionally input "terms and conditions" for the desired reservation—e.g. the requirement of seating in a non-smoking section, that there will be two (2) persons in the reservation party, and so forth—using the 595 dialog box. The 595 dialog box includes facilities for the user to input or accept special offers, such as a discount for meals at certain times. The user executes or "books" the proposed reservation, pushing the "BOOK IT" button in the "RESERVATIONS—TICKETS—COUPONS" dialog box. The TRIPS technology communicates the reservation request and facilitates its acceptance, rejection and/or alteration or a counteroffer from the participating provider e.g. the Palisade restaurant or its agent(s). Participating providers in TRIPS accept or confirm requested reservations preferably by transmission of an alphanumeric and/or bar coded transaction or reservation confirmation code—shown within the transactional dialog box at 595 in FIG. 5D. The dialog box at 595 also provides an "ATTACH" command or button to prompt inclusion of the resultant "map ticket" reservation in the TRIPS user's travel plan output. An example of a TRIPS "map ticket", attached to individual user travel plan output in TRIPS, was pictured heretofore at 145, 147 and 149 in FIG. 1B. The TRIPS Accounting Subsystem "knows" the identities of the participating provider (e.g. the restaurant) and the registered TRIPS user—such that the restaurant name and address, and identity of the party entitled to the dinner reservations are included on the "map ticket" output. FIG. 8B hereinafter outlines the preferred TRIPS "map ticket" data structure and details typical data relations or links between the Geographic Subsystem and the other TRIPS Subsystems involved in "map ticket" generation.

FIG. 6

Figure 6:
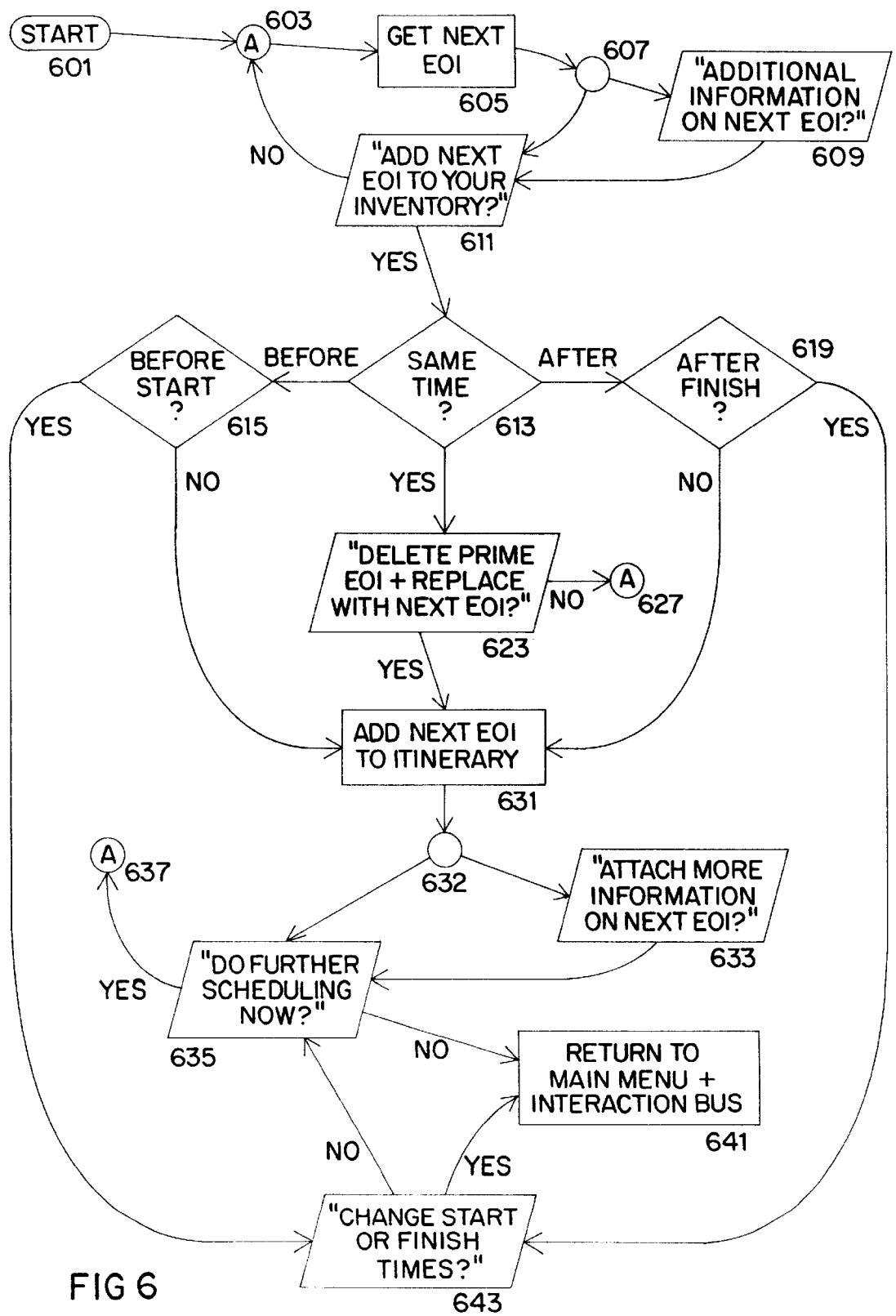
FIG. 6 outlines the TRIPS Temporal Subsystem for databasing times and dates, scheduling and other processing of timely travel information.

FIG. 6 depicts a simplified flow chart of TRIPS Temporal Subsystem software for travel plan scheduling functions—i.e., the building of individualized itineraries. In particular, FIG. 6 outlines processes for searching, browsing and/or selection of events of interest or EOIs—which include a broad variety of travel-related data in association with pertinent times/dates or equivalent gauges of time. Events of interest or EOIs in TRIPS include e.g. personal appointments, public or private scheduled events, predicted natural occurrences, time-limited reservations or offers for goods or services, scheduled or computed departure or arrival times/dates, and so forth. Preferred online TRIPS embodiments—such as an Internet travel reservation information planning system—are designed to facilitate flexible and independent user consideration and manipulation of travel information in association with dates/times in order to construct and/or modify personalized itineraries or travel schedules i.e. temporally ordered lists of EOIs, appointments and other scheduled or predicted chronological events, including e.g. scheduled or estimated departures or arrivals, and so forth.

For example, preferred TRIPS online or Internet embodiment enable retail consumers to begin and/or continue travel planning sessions by the entry of trip START and/or FINISH times/dates. Within this planned travel time frame, TRIPS users can also preferably select, input and/or modify one or more intermediate dates/times—e.g. personal appointments or events of interest or EOI selections from databases related or linked to the TRIPS Temporal Subsystem—as things to do during their planned trip. Computerized elements of the TRIPS invention—for example, routing software—also generate temporal data records such as the estimated arrival dates/times at final and/or intermediate destination(s), that can be incorporated as temporal input or data records in TRIPS. In sum, FIG. 6 addresses how the TRIPS invention enables users to manipulate, preview, pick and manage the chronological dimension of the TRIPS temporal, geographical, topical and/or transactional information involved in their individual travel plans.

FIG. 6 assumes the TRIPS user has already input START and FINISH times/dates for a business, family, or pleasure trip which he or she is engaged in planning with TRIPS. For example, such START and FINISH times/dates can be input employing the SCHEDULER sub-menu under the WHEN? main input menu at 161 in FIG. 1C. Preferred TRIPS embodiments also derive such a START and/or FINISH entry e.g.: (1) from the assorted departure and arrival dates/times of a flight reservation as booked or under active consideration by the TRIPS user engaging reservation arrangement capabilities provided or brokered by the TRIPS Accounting Subsystem; or (2) from estimated START and/or FINISH dates/times for a proposed journey, including the estimated elapsed time needed to travel an optimum route—computed taking into account user input of a place and time of departure, optional intermediate waypoint(s), a final destination, and selectable routing parameters. For a concrete example from one of the hypothetical cases sketched heretofore in this disclosure, consider John Jones' time frame for his planned trip from Knox, Ind. to Pownal, Me. and back to attend the family birthday party picnic for Grandmother Jones scheduled for 5:30–7:30 PM in the evening of Sep. 13, 1996. Based on his available vacation time, or other personal circumstances, John Jones could input 10 AM Sep. 10, 1996 as his departure or START time/date and pick another time on Sep. 15, 1996 to input as his firm or tentative return or FINISH time/date. Or these times/dates for the START and FINISH can be derived, wholly or partly, from available flight schedules or routing software consulted by John Jones within TRIPS.

As is often the case, FIG. 6 further presumes that the TRIPS user is already interested in or committed to at least one scheduled event—typically the purpose or occasion for his or her trip such as a public event, business meeting, personal appointment, family gathering, or other temporally defined data record. Such prior appointments or EOI times/dates are typically input by TRIPS users, using the "Appointments" facility within the SCHEDULER sub-menu, under the WHEN? main input menu, at 161 in FIG. 1C. TRIPS users can also select from an EOI database or EVENTS OF INTEREST calendar, or otherwise derive dates/times within TRIPS. For example, as an early or initial step in using TRIPS to make his travel plans, John Jones might well have engaged the SCHEDULER capability in TRIPS and input the time/date fixed for his grandmother's birthday party in Maine ("Sep. 13, 1996 5:30–8:30 PM" shown at 167 in FIG. 1C as part of a map note) typically including a brief text caption (e.g. "Grandma Jones' Birthday Picnic") as a label for the EOI.

As provided in FIG. 6, TRIPS users can develop individual travel plans by selecting one or more added EOIs, e.g.: a publicly scheduled entertainment event previously known to the user or found by searching or browsing a TRIPS digital events calendar; a time-framed special offer for goods or services posted in TRIPS by a participating third-party provider; or a time/date as negotiated by and between the retail user and the TRIPS system operator and/or participating third-party provider for a dinner reservation, a theatre or musical performance ticket, an educational conference, a sports or cultural event, a scheduled flight or a passage or cruise by ship, and the like. The TRIPS invention as outlined in FIG. 6 facilitates typical travel planning tasks involved in previewing, picking, and/or deleting various EOIs, appointments, events or dates/times within one's evolving itinerary, or travel schedule. FIG. 6 utilizes the term "Prime EOI" for one or more such previously input times/dates, more or less firmly or tentatively scheduled by the TRIPS user in developing his or her current TRIPS travel plan.

Thus, for purposes of building and changing individualized temporal travel schedules or itineraries, FIG. 6 illustrates TRIPS processes and user options involved in searching, browsing, and selecting additional travel information about related temporal events of interest (or EOIs)—which the user might add to his or her travel plan. Instead of or in addition to the one or more Prime EOI(s) already established in the user's emerging itinerary, FIG. 6 flow charts how preferred TRIPS embodiments enable the user to select, preview, schedule, or reject other candidate events, possible added or alternative appointments, pastimes or things to do—as memorized and represented to the retail user by the TRIPS invention. To facilitate such travel itinerary planning operations, the preferred online TRIPS embodiment, for example, includes comprehensive, chronological EOI relational databases—like the browsable and searchable CALENDAR and/or EVENTS OF INTEREST listings accessed within the WHEN? main menu for temporal input at 161 in FIG. 1C. For a more concrete illustration, John Jones might desire to consider and schedule other activities and events for his planned trip—but he is not inclined to skip his grandmother's birthday party. In this hypothetical case, John Jones also probably cannot re-schedule the time/date firmly set by and for his whole extended family for the birthday celebration. But, as is often the case in ordinary travel situations, one possibility is that John Jones can exercise some personal discretion and change his previously input travel START and/or FINISH times/dates—for example, by modifying his motorcycle route or departure time or by changing airplane flights to make time for some human or natural event in which he is especially interested. On the other hand, John Jones might not be free to enjoy such a flexible travel schedule planning—due to a limited vacation time, a tight travel budget or a more rigid personality. These and other ordinary, idiosyncratic or practical travel scheduling concerns and variables can be readily managed and accommodated by the Temporal Subsystem interface of a preferred TRIPS embodiments, as delineated in FIG. 6.

Having presumably already entered at least tentative START and FINISH times/dates before and after the central, previously scheduled birthday party for his grandmother, John Jones can start, at 601 in FIG. 6, to investigate other contemporary times/dates and associated information in TRIPS—which he may decide to include in his travel itinerary. At 603, "A" represents a connector for convenient flow chart expression. At 605, John Jones or other TRIPS users get, or are presented with, the "Next EOI" comprising the first, only, or a succeeding temporal data record or item in a list or array of EOIs. By means well-known in the art of database management, this EOI listing or array can include the entire universe of available temporal data records. But more typically and usefully, this EOI listing or array is made up by one or more computerized sorting operations and/or user-selections of the travel information associated with date/time data in TRIPS. At 605 in FIG. 6, John Jones can browse or search an EVENTS OF INTEREST calendar for all time and the whole world—as provided in a particular TRIPS embodiment. More often and practically at 605 in FIG. 6, the TRIPS user previews user-selected and/or computer-sorted arrays or listings of EOIs or TRIPS travel information associated with dates/times, optionally including various graphics, text and/or audio. The TRIPS invention facilitates searching, ranking, "filters" or sorting and/or user-selection of TRIPS data records based on a wide variety of topical, temporal, geographical and/or accounting criteria—including various combinations of such TRIPS database operations sequentially arranged by the TRIPS user—as detailed heretofore, particularly relative to FIG. 4.

For example, at 605 in FIG. 6, John Jones can preview information on theatre performances, scheduled for specified times/dates, also located within a specified geographic region, for which tickets are available through one certain participating provider in TRIPS, with the preview arranged in ascending order or ranking of ticket cost—including video or audio theatre performance excerpts in addition to or instead of text about the theatre performances. This hypothetical preview was set up at the user's option by a series of TRIPS relational database operations e.g.: (1) in the Temporal Subsystem, the EOI dates/times were limited to a certain time period; (2) the Topical Subsystem sorted or filtered out theatre performances (as opposed to personal appointments, political meetings, sports events, and so forth); (3) the Geographic Subsystem sorted and sited the theatre performances by location e.g. within a user-defined area along a travel route or around a selected geographic point; (4) the Accounting System further "filtered" the theatre performances by provider—perhaps, to take advantage of a special ticket price discount offered by a particular participating ticket agent or provider—then ranked the theatre performances by ticket cost with the cheapest tickets first followed by the plays with a more expensive admission price. Persons with state-of-the art relational database programming skills will understand that varied simpler and more complex EOI arrays can be presented at 605 in FIG. 6 in accord with the TRIPS invention. TRIPS users may actually see or hear two or more EOI data records at a given moment in such a preview; however, at 605 in FIG. 6, Next EOIs are processed one at a time—as a flow chart convention.

The connector at 607 in FIG. 6 means that the TRIPS user can elect to get additional, more detailed or updated information on the Next EOI at 609. For example at 609, John Jones can opt to view videos, still pictures, read or hear a review of a scheduled theatre or musical performance, or get a map showing the location of a hotel or seasonal natural phenomenon, or more topical details about a theatre or outdoor landmark, or further information on available reservations or ticket transactions, and so forth—which are related to the current Next EOI. At 611 in FIG. 6, the TRIPS user decides whether or not to add or include the Next EOI in his or her emerging travel plan itinerary.

At 611, the TRIPS user can either decide to go and get another Next EOI for consideration, by returning to 605 via "A" at 603, or TRIPS users can select the current Next EOI—tentatively, at least—for inclusion and, perhaps, further processing and evaluation, as part of a final or emerging travel plan or itinerary. When the current Next EOI gets added to a user's itinerary at 611, then at 613, 615 and 619, TRIPS automatically compares the time/date of this Next EOI with the other times/dates or Prime EOIs already included in the user's itinerary. At 613 in FIG. 6, TRIPS software determines if the time/date of the Next EOI is the same, or BEFORE, or AFTER the Prime EOI. For example, John Jones may be interested in attending a county fair, music or theatre performance presented in a TRIPS preview. At 613, TRIPS will detect any scheduling conflicts between these possible, candidate EOIs and the birthday party already scheduled for his grandmother. If the Next EOI e.g. a county fair or theatre performance happens only at the "Same Time" as the birthday party, then operations within FIG. 6 proceed to 623. Next EOI times/dates, that happen to fall BEFORE and AFTER a Prime EOI (e.g. the birthday party), are further analyzed at 615 and 619 in order to determine: (1) whether the current Next EOI time/date falls within the START and FINISH time frame previously specified by the TRIPS user—in which case operations proceed to 631; (2) or whether the current Next EOI is scheduled or predicted to happen at a date/time before the START or after the FINISH of the TRIPS user's trip as thus far planned—in which case operations are directed to step 643 in FIG. 6. Therefore, a theater performance happening after the planned return home of John Jones on Sep. 15, 1996, for example, will transfer operations from 619 to 643; whereas a county fair scheduled for dates and times before the birthday party for John Jones' grandmother—but not over and done before his scheduled arrival in Maine on Sep. 10, 1996—shifts the flow of operations in FIG. 6 to 631 next.

TRIPS users with firmly scheduled departure and arrival times/dates (i.e. a set time/date for trip START or FINISH) are enabled to consider only those EOIs scheduled within their unalterable travel time frame, by appropriate sorting of the selected Next EOIs at 615 and 619. The FIG. 6 flow chart, however, is also arranged for planning somewhat more flexible travel itineraries. Thus, from 615 and 619, Next EOIs with times/dates outside the current START to FINISH time frame are referred on to step 643. At 643, a more flexible TRIPS user can opt to change the current START or FINISH times/dates—for example, in order to include an "early" or "late" Next EOI by enlarging his or her planned travel time frame or itinerary. Candidate Next EOIs, having times/dates within the current START and FINISH time frame, are added to a user's itinerary or travel plan at 631—unless there is a direct scheduling or "Same Time" conflict with the Prime EOI which the user handled at 623 by deciding to keep the Prime EOI and not replace it with the Next EOI scheduled for the same time/date. At 623 and 627, for example, John Jones would almost certainly decide not to schedule any EOI, appointments, or other activities with the same time/date as his grandmother's birthday party—instead at 627 returning to "A" at 603 to get another Next EOI at 605. Of course many TRIPS users will often elect to replace a Prime EOI at 623 with the Next EOI at 631—if presented with a more attractive, convenient, or less expensive, or otherwise more desirable alternative. For example, John Jones might opt to cancel a previously scheduled dinner reservation within his travel itinerary if offered a reservation at another restaurant closer to his route, with cheaper prices, or with a menu more suited to his taste.

TRIPS users are given menu choices at 632. At 633, users can "attach" or incorporate additional travel information about newly added Next EOIs to their travel plans at 633. For example, phone numbers, hours of operation, address, personal or business name information, advertised prices of available goods or services and other handy topical, temporal, geographic and/or accounting TRIPS travel information can be "attached" to travel plan output for use en route. The CARS and CARPS patent disclosures—as incorporated herein by reference and also owned by the assignee of the TRIPS patent application assignee—describe "attachment" entailing user-selection and meaningful inclusion of such updated and/or supplemental textual, graphic and/or audio information with TRIPS travel plan output. CARS and CARPS disclose "attaching" POIs to maps by means of graphic arrows indicating related geographic coordinates or locations. A skilled computer programmer can extrapolate this "attachment" procedure to the case of TRIPS supplemental EOI information e.g. a scheduled performance date/time in association with a theatre review and/or a video excerpt of the play. Diverse travel information can additionally or alternatively be "attached" to—or visually and/or audibly associated with—temporal travel information outputs such as a calendar or itinerary. For example, a theatre review or short video excerpt can be "attached" to the TRIPS' users itinerary by being inserted in, or visibly linked to, a temporally ordered itinerary, or accessed by means of a software "button", prompt, or link corresponding to the date/time or other designations of a theatre performance. Following attachment operations at 633, the user decides at 635 whether to do further scheduling or itinerary construction Alternatively, at 632, the TRIPS user can proceed directly to 635. John Jones can elect to do further scheduling at 635 by returning to "A", then getting another Next EOI at 605. Via 641 in FIG. 6, TRIPS users opt to return to the Main Menu & Interaction Bus—detailed heretofore particularly with reference to FIG. 4 at 413. From the Main Menu & Interaction Bus, the TRIPS user can proceed with one or more integrated or independent travel planning sub-sessions or steps in the TRIPS Place, Time, Topic and/or Accts Subsystems, as detailed heretofore relative to FIG. 4. From 643 in FIG. 6, the TRIPS user can decide to return to the Main Menu through 641, for example, in order to change the START and/or FINISH times/dates of his or her travel itinerary for purposes of including a "late" or "early" EOI. At the Menu, the user can also proceed with editing and/or output the essentially final plans and itineraries.

FIG. 7

FIG. 7 presents TRIPS relational database tables illustrating topical, geographic, temporal and accounting or transactional relations involved in the processing of TRIPS travel information. These four tables correspond with the characteristic TRIPS Subsystems, disclosed heretofore particularly relative to 213, 221, 223 and 224 in FIG. 2 for the handling respectively of TOPICAL DATA, GEOGRAPHIC DATA, TEMPORAL DATA and ACCOUNTING DATA as tabulated heretofore in FIG. 3. FIG. 7 illustrates TRIPS improved relational database capabilities for the computerized temporal and/or transactional sorting/filtering of travel information data records subject to topical and geographic database relations.

Thus, the TOPICAL RELATION at 701 in FIG. 7 corresponds with the TOPICAL SUBSYSTEM 213 in FIG. 2 and the equivalent TOPICS at 415 in FIG. 4. In FIG. 1C heretofore, access to the TOPICAL SUBSYSTEM in TRIPS was described with reference to the WHAT/WHO? main input menu 157. TOPICS in TRIPS includes a wide range of substantive travel information content including place names, symbols, other graphics, digital images and analog pictures including video or animated visual images, audio, voice and other sounds, even tabulated data and/or functional algorithms. Such diverse topical travel information content is illustrated in the SUPPLEMENTAL INFORMATION column under TOPICAL RELATION at 701 in FIG. 7. By means well-known in the art, this TOPICAL DATA can be categorized and searched by pre-defined data TYPES like HOTEL, CAMPGROUND and RESTAURANT (or EAT), plus more specific SUB-TYPES like STATE PARK or PIZZA as depicted in corresponding columns in the TOPICAL RELATION flat tile at 701. User browsing and computerized searches can also be conducted by the specific NAME and/or SUPPLEMENTAL INFORMATION attributes. More fully articulated embodiments of the TRIPS invention further provide for browsing or searching by the proper or common names of people, organizations, goods/services, natural or human-made objects, and so forth, including state-of-the-art text searches and associations and other "fuzzy" database search or data matching technologies. By such means, for example, Sara Smith can manually browse or conduct computerized searches for TRIPS information on the related topics of "scuba diving" and "coral reefs". One or more TOPICAL DATA data records can be further related to TRIPS geographic, temporal and accounting travel information by preferred and well-known relational database methods as illustrated particularly in FIG. 7 and hereafter relative to FIG. 8B.

Skilled computer programmers can elaborate on the FIG. 7 relational database design in order to implement all of the sequential operational variations among the characteristic TRIPS Subsystems introduced heretofore, with particular reference to FIG. 4. For example, TRIPS users can start or continue travel planning sessions by input of a START and a FINISH (or END) times/dates for their planned travels. In FIG. 7, such temporal user input and database information are managed in TEMPORAL RELATION at 705. Alternatively, TRIPS users can initiate or proceed with their individual travel planning sessions in ACCTS 411 in FIG. 4 with transactional data and functions like manual browsing or automated searching of available offers for diverse travel-related goods/services from assorted providers participating in TRIPS. In FIG. 7, such transactional queries and TRIPS data records are managed in ACCOUNTING/TRANSACTIONAL RELATION at 707. Operations, data records, and relations in TOPICAL RELATION 701, GEO- GRAPHIC RELATION 703, TEMPORAL RELATION 705, and/or ACCOUNTING/TRANSACTIONAL RELATION 707 are arranged or combined through variable sequences of travel planning steps in TRIPS—as heretofore described, with particular reference to FIG. 4.

In other words, FIG. 7 in the present TRIPS disclosure presents a set of flat files for the enhanced temporal and transactional processing of travel-related information subject to geographic and topical software operations, as provided in U.S. Pat. No. 5,559,707, COMPUTER AIDED ROUTING SYSTEM [CARS] David M. DeLorme and Keith A. Gray inventors, issued Sep. 24, 1996, assigned to DeLorme Publishing, Co. Inc., owner of the present TRIPS disclosure. CARS provides for interactions between multimedia (i.e. topical) travel information and routing (i.e. geographic) software functions. On the one hand, CARS users can start their travel plan browsing or searching multimedia on topical types of travel information (e.g. hotels, restaurants, campgrounds, attractions) in order to select desirable destinations or waypoints for routing. On the other hand, CARS users can focus on particular geographic points, regions and/or routes—and consider supplemental text, audio and/or graphic information on POIs or places of various types (e.g. hotels, restaurants, etc.) found in the local area (e.g. within the map display, within a radius around a selected geographic point, within a corridor of user-defined dimensions around an optimum route of travel computed from user input of waypoints and routing parameters). As depicted in FIG. 7, the TRIPS invention improves on the prior patented CARS technology—adding on temporal and transactional data records and associated relational database capabilities as shown at 705 and 707 respectively.

For example, the TOPICAL RELATION table at 701 in FIG. 7 presents a topical list of types of travel information data records corresponding to the POIs or points of interest labeled "EAT", "CAMP", "FUN", "HOTEL", "POLICE", and "THING" at 505 in FIG. 5. Such POI lists are collected by the technology disclosed in the above-cited CARS patent to facilitate user travelog previews of information about accommodations, attractions and facilities as located within an area of interest to the user. In the relational database tables at 701, 703, 705 and 707 in FIG. 7, at the left in every tuple or row, a unique numerical "I.D." is keyed to each individual data record about the topical, geographic, temporal and/or transactional aspects of a typically located accommodation, attraction, facility, or POI—consistent with the unique OBJECT I.D. heading of the standardized TRIPS object data structure as disclosed heretofore in FIG. 3. For example, the I.D. number "891" is assigned in FIG. 7 to the THING type of POI also on the map display at 505 in FIG. 5. In FIG. 7, in the TOPICAL RELATION at 701 in the row headed by the "891" I.D., THING is also typed as a NATURAL FEATURE sub-typed as CORAL REEF and named BLUE WATER CAY.

More geographic, temporal, and accounting data records related to THING run across the lower tables 703, 705, and 707 in the horizontal rows or tuples headed by the "891" Object I.D. or key. For example, after the "891" I.D. in the 703 GEOGRAPHIC RELATION, specific geographic coordinates of latitude and longitude or LAT and LONG appear indicating the location of THING or the BLUE WATER CAY on maps of the earth's surface—in conjunction with the conventional place name, such as the local town name, associated spatially with BLUE WATER CAY to facilitate map labelling and text indexing. Likewise, in the GEOGRAPHIC RELATION 703, the unique I.D. number "256" corresponds to "BOB'S DIVE BOAT" of sub-type "SCUBA" within the "FUN" topic type. By means well-known in the art of relational databasing, additional geographic, temporal and transactional information about "BOB'S DIVE BOAT" is kept for efficient, flexible processing in rows headed at left by the key I.D. number "256", in the tables below in FIG. 7 at 703, 705 and 707. In this fashion, TRIPS preferred embodiments record and process travel information e.g. about the location, seasonal and daily dates/times when BOB'S DIVE BOAT takes scuba-divers out, and/or about the availability and cost of reservations, tickets or other special offers for BOB's DIVE BOAT.

Thus, FIG. 7 helps to explain TRIPS variable sequences and/or combinations of geographic, topical, temporal and/or accounting relational database operations that improve on the technology for user-selectable travelog previews or presentations of travel information disclosed in U.S. Pat. No. 5,559,707 COMPUTER-AIDED ROUTING SYSTEM [CARS] also assigned to DeLorme Publishing Company. The CARS patent describes an interactive technology for relational database operations and multimedia presentations of travel information filtered by topic (e.g. HOTEL or RESTAURANT) and/or by geography (e.g. within a region or corridor along a route computed according to user-selected criteria). In the present TRIPS disclosure, FIG. 7 and FIG. 8B hereinafter specify how further or alternative temporal and/or accounting relational database operations can be performed on the lists or sets travel information data records involved in such multimedia presentations or travelog previews. For example, TRIPS enables added sorting or filtering of CARS lists of POIs or points of interest by TEMPORAL RELATIONS 705 like dates/times when an attraction or accommodation is open or the time-frame between the START and FINISH times/dates for a proposed journey as input by the TRIPS user. TRIPS further enables combined or independent transactional sorting/filtering—e.g. for availability of special discount coupons shown in the last column under COUPONS or by price or other considerable factors shown under TERMS/CONDITIONS—within the ACCOUNTING/TRANSACTIONAL RELATION at 707.

FIG. 7 further illustrates specific arrangements within the characteristic TRIPS data relations at 701, 703, 705, and/or 707. Skilled database programmers can vary these arrangements or flat file structures for particular applications. Under TOPICAL RELATION 701 in FIG. 7, for example, a classification system of TYPES and SUB-TYPES of TOPICAL DATA or characteristic TRIPS topical travel information is illustrated in the first two columns after the column for unique data record I.D.'s. A more complex hierarchical system of topical information organization or a simpler one-dimensional set of pre-defined data types could also be appropriate for alternative TRIPS embodiments. The NAME column in TOPICAL RELATION 701 concentrates on public safety (e.g., "N. Place Police") or accomodations (e.g., "S. Place Hilton" hotel or "Main St. Domino's" pizza restaurant) or facilities for outdoor recreation (e.g. "Wetland Park" or "Bob's Dive Boat") or natural features (e.g. "Blue Water Cay" coral reef) in FIG. 7. As detailed relative to the WHAT/WHO main input menu for topical TRIPS user queries at 157 in FIG. 1C, TOPICAL DATA records in TRIPS can include NAMES of a broad range of particular products, people, organizations, natural phenomena, products or goods and services and activities or things to do, for which SUPPLEMENTAL INFORMATION is available in TRIPS. Generally, most substantive TRIPS travel information or content gets stored and processed in the SUPPLEMENTAL INFORMATION column, within TOPICAL RELATION 701, including diverse TOPICAL DATA or attributes such as phone numbers, addresses, features, various quantitative, qualitative, biographic and functional data expressed in visual, audio and/or text media. By means well-known in the art, such TRIPS topical travel information is subject to computerized searches, sorting and filtering operations by classificatory types or hierarchies, indexing, nominal or text searches and/or database operations on SUPPLEMENTAL INFORMATION attributes in fully articulated TRIPS embodiments.

TRIPS relational data operations—entailing two or more of the characteristic flat file TRIPS Subsystems or RELATIONS (701, 703, 705 and/or 707)—are preferrably linked or related by the unique TRIPS data record I.D. exemplified as a three-digit number in the first column of each RELATION or flat file in FIG. 7. For example in TOPICAL RELATION 701, the I.D."492" is associated with the NAME "Wetland Park," a campground or CAMP type of STATE PARK sub-type data record. In GEOGRAPHIC RELATION 703 after the same "492" I.D. number, "Wetland Park" is assigned a specific latitude and longitude (e.g. for map location), a PLACENAME (e.g., the local municipal political subdivision), a MAP SYMBOL (e.g., a a police station indicated by a badge symbol which can also serve graphic user interface or GUI functions on map displays), and a DATA SOURCE (e.g., indication of whether the specific GEOGRAPHIC DATA record came from the underlying TRIPS geographical database, GPS user location data, or geocoding operations, and so forth). The GEOGRAPHIC RELATION 703 can be otherwise configured by state-of-the-art spatial databasing technology (e.g., for polygons, vector or route data, demography, elevation data, terrain, and/or other map data attributes which are well-known in the art of geographic information systems).

Variable sequences of TRIPS relational database operations, and resultant presentations, are further enabled by means of TEMPORAL RELATION 705 and/or ACCOUNTING/TRANSACTIONAL RELATION 707. For example, within TEMPORAL RELATION 705, after the "492" I.D., temporal information—like the START and END dates of the "WetLand Park" camping season—is stored, retrieved and processed. The columns in TEMPORAL RELATION 705 provide for ranges of date/time specifications with further categorization or typing of the kind of temporal EVENT (e.g., HOURS/OP. or hours of operation, COUPON, SEASON, VACANCY, MEETING and so forth) and an ITINERARY DATA column for entry of user input or selections with respect to travel scheduling issues (e.g., ETA or user's estimated arrival at a destination as calculated by routing software, the date/time sought or confirmed for a reservation, ticket or other special offer, appointments or scheduled events of interest or EOIs, and so forth). For a further example, the "492" I.D. also enables joined or independent TRIPS relational database links or operations engaging the ACCOUNTING/TRANSACTIONAL RELATION 707—e.g. for making travel arrangements, reservation queries, ticket purchases, considering and/or "clipping" TRIPS coupons or special goods/services offers, and so forth. As detailed more hereafter relative to FIGS. 8A and 8B, the columns in ACCOUNTING/TRANSACTIONAL RELATION 707 provide for the key I.D. (e.g. "492" or "079"), GOODS/SERVICES classification or hierarchies, designation of the goods/'services PROVIDER, availability of reservations and special offers or RES., diverse TERMS/CONDITIONS or attributes of the goods/services offered in or through TRIPS and/or an inventory of COUPONS which are typically special price or extra service offers posted by TRIPS participating providers. For alternative TRIPS applications and embodiments, other flat file configurations and structures can be developed for TEMPORAL RELATION 705 or ACCOUN'TING RELATION 707 by skilled database programmers.

FIG. 8A

Figure 8A:
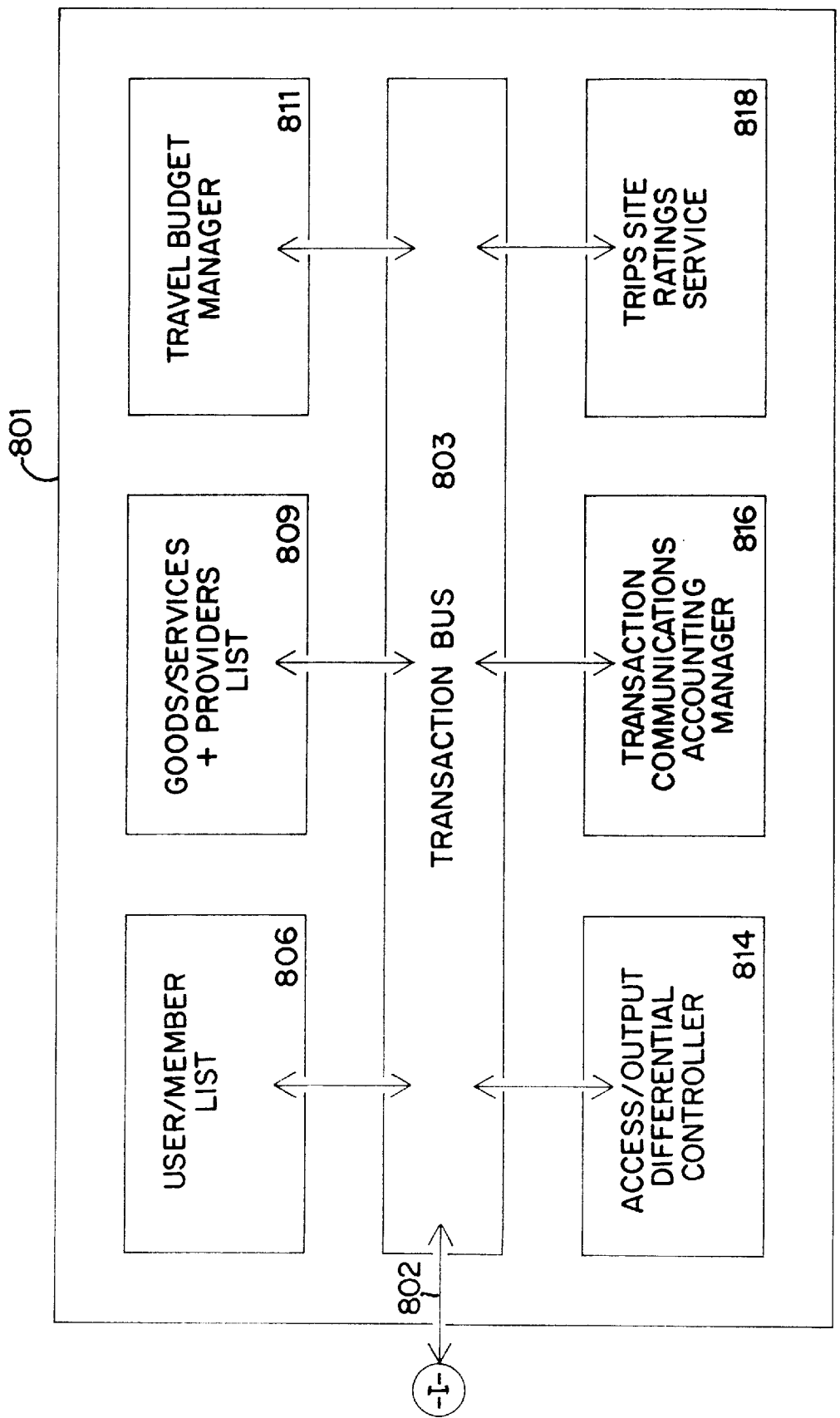
FIGS. 8A and 8B, details the TRIPS Accounting Subsystem, including membership enrollment or user registration functions, third party provider input/output, billing and ratings functions and relations with other TRIPS Subsystems in generating map/ticket output.
Figure 8B:
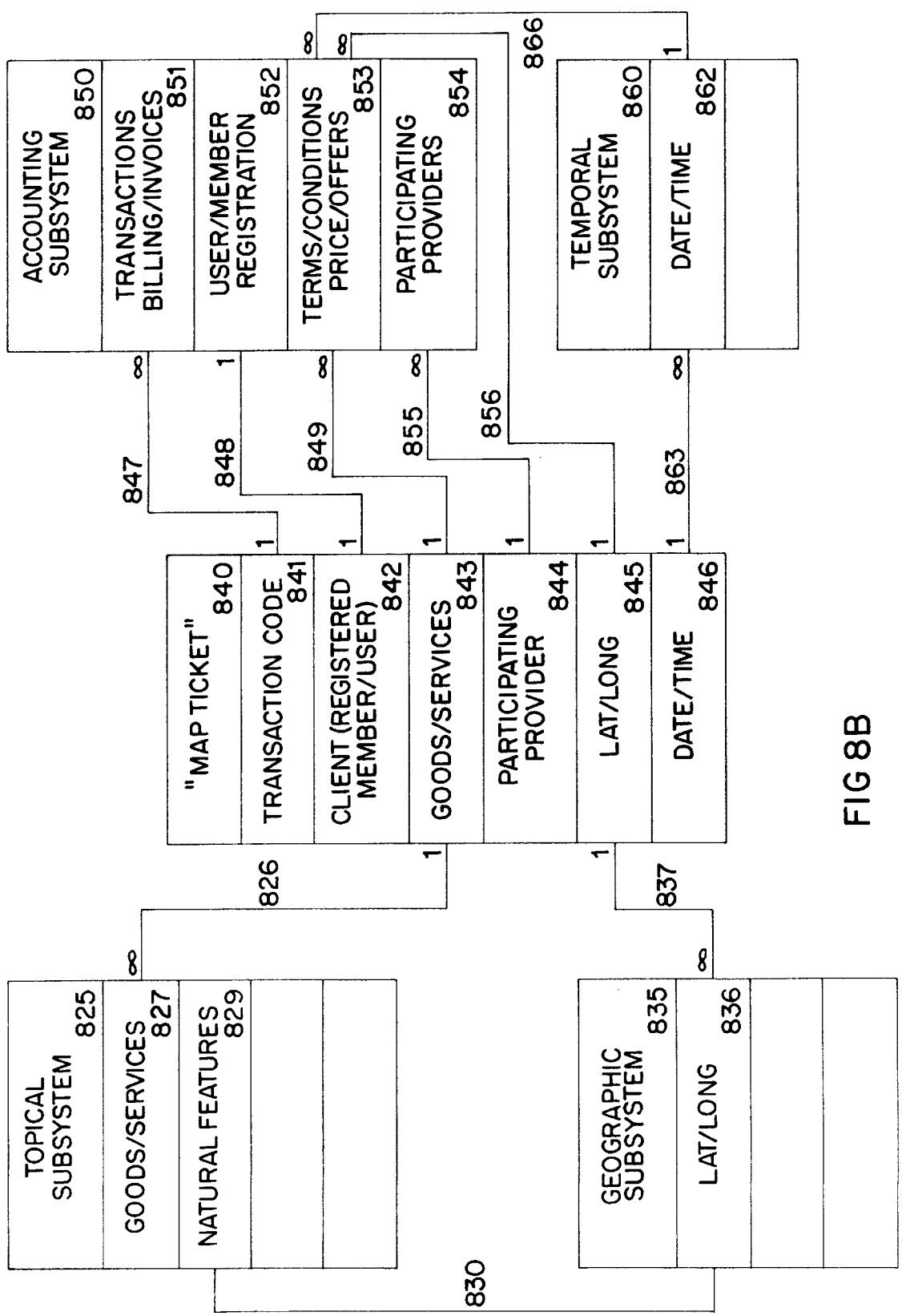

FIG. 8A is a block diagram of the TRIPS Accounting Subsystem 801. Heretofore in the present disclosure, the Accounting Subsystem was described relative to the HOW? main input menu at 163 in FIG. 1C, 217 in FIG. 2, ACCOUNTING DATA in FIG. 3 and Accts. 411 in FIG. 4. The TRIPS Accounting Subsystem at 801 in FIG. 8A manages the transactions and/or communications between users/members and participating providers, enabling "map ticket" travel arrangement outputs for diverse goods/services offered via preferred TRIPS embodiments. Further details on how such "map tickets" are assembled in TRIPS are provided hereinafter relative to FIG. 8B.

Corresponding to 217 in FIG. 2, the Accounting Subsystem 801 in FIG. 8A performs preferred TRIPS transactional or accounting operations through interactions at 802 and the connector "I" corresponding to the TRIPS Interface & Interaction Bus. Heretofore, this Interface & Interaction Bus was depicted at 209 in FIG. 2 and further described with reference to the Main Menu 413 and Interaction Bus 414 in FIG. 4. FIG. 4 and related text represent preferred TRIPS travel planning sessions as series or sequences of topical, geographic, temporal and accounting operations chained together and directed by the TRIPS user and/or automated software scripts, command sets, macros or batch files. In FIG. 8A, such manual or automated operational sequences proceed at 802 in and out of TRIPS Accounting Subsystem 801 to and from the TRANSACTION BUS 803. Within the Accounting Subsystem 801, the TRANSACTION BUS 803 co-ordinates accounting chores—managing data relations among characteristic TRIPS transactional functions and records.

FIG. 8A outlines the preferred functions and data records involved in fully articulated online or Internet embodiments of the TRIPS invention. At 806, USER/MEMBER LIST includes user registration or membership enrollment data and services detailed heretofore particularly relative to 407 and 411 in FIG. 4 plus the USER REGISTRATION submenu within the HOW? main input menu at 163 in FIG. 1C. In the present disclosure, "user" and "member" correspond referring to the retail consumers of TRIPS travel arrangements, information, and planning services. TRIPS travel planning services and information are provided online or distributed on tangible media such as CD-ROMs for use or purchase by the general public anonymously. The present invention can also be provided by limited distribution of online communications and/or tangible media that embody TRIPS to identified persons, registered users, enrolled members, agents, entities, or other specified TRIPS individual or organizational clients or consumers. But, preferred online or Internet TRIPS embodiments accommodate an anonymous or unidentified audience as well as registered retail clients or enrolled members. As detailed heretofore relative to 437, 439, 445 and 447 in FIG. 4, the preferred TRIPS online service system provides differential access/output to registered or identified users or members as opposed to anonymous Internet surfers or travel information shoppers. FREE OUTPUT of limited but inviting travel information is made available to all users at 445, attracting traffic to the TRIPS online site, and tempting anonymous surfers to register for added data and functionality. More sophisticated travel planning functions, more recent or detailed information about goods/services cost and availability, reservations, tickets, various special offers, and other VALUABLE OUTPUT get rationed out to registered users and/or enrolled members at 447 in FIG. 4.

In FIG. 8A, access to TRIPS' VALUABLE outputs is contingent on user registration or membership enrollment. At 806, state-of-the-art software enables subscription, user registration or client enrollment, user access controls such as passwords for signing on, and user/member list management functions. Enrolled or registered TRIPS retail consumers can input individual profiles, preferences or personal travel planning operational parameters—i.e. more or less global settings for subsequent implementation, automatically or by default, in the course of their individual travel planning sessions or specific component operations performed in TRIPS. For example, a corporate client engaging a TRIPS online site to plan and arrange its employees' business trips can have its workers using TRIPS bound by standard profiles which specify preferred providers, impose budget limits, favor travel at certain times and otherwise encourage compliance with company travel policies. Individual user profiles save keystrokes and repetitive entry of routine information such as home address as departure point, nonsmoking preferences, preferred transportation modes or accommodation providers, even topical interests such as favorites foods, recreation or brands, and so forth.

As employed in the present TRIPS patent disclosure, FREE OUTPUT means intermediate or final TRIPS geographic, temporal, topical and/or accounting travel information made available to unregistered or less qualified TRIPS users, typically at no charge. VALUABLE OUTPUT refers to intermediate or final TRIPS outputs as reserved for registered users, paid-up subscribers, self-identified consumers and/or enrolled members. The distinction made between VALUABLE and FREE OUTPUT in FIG. 4 provides a concrete illustration of the ACCESS/OUTPUT DIFFERENTIAL managed at 814 in FIG. 8A. Practical distinctions between FREE and VALUABLE OUTPUT or equivalent DIFFERENTIAL ACCESS/OUTPUT algorithms in TRIPS are made in various ways appropriate to the commercial and promotional needs and aims of TRIPS online site proprietors or operators.

In other words, as maintained and implemented at 814 in FIG. 8A, the current algorithm or formulation for DIFFERENTIAL ACCESS/OUTPUT or FREE versus VALUABLE OUTPUTS is determined by the TRIPS web site proprietor or operator, varying from virtual site to site and from time to time on a given TRIPS Internet site. One particular item of travel information might be FREE OUTPUT for some users, as part of a special introductory offer for example. This same travel information item may be VALUABLE OUTPUT on different TRIPS sites, or for another class of users, and/or after a certain period of time. Certain TRIPS Internet sites will offer more FREE OUTPUT to attract traffic and maximize their advertising audience. TRIPS online services reserved for enrolled organization members will likely emphasize the benefits of all the VALUABLE OUTPUT made available to their registered users. Publicly or cooperatively supported online TRIPS tourist information bureaus essentially provide FREE information or OUTPUT to promote their area but may require or encourage users to provide name, address, telephone number, etc.—for follow-up research, to produce "mailing" lists of prospective tourists, and so forth.

As used in the present TRIPS disclosure, FREE and VALUABLE are relative rather than literal terms. Registered subscribers do not necessarily pay more for the privileges and added advantages of enrolled status i.e. VALUABLE OUTPUT. Commercial TRIPS Internet or online sites can seek to attract "traffic" or expand their enrolled "audience" by offering "free" or nominal registration—hoping to profit mainly from charges to participating third-party TRIPS travel information and service providers. Additionally or in the alternative, online TRIPS services and/or travel information can be provided to "members only" who must provide a password to log on to the site or specialized parts of the site—with the TRIPS site operator deriving income from dues or enrollment fees. TRIPS users can be charged for time spent online and/or charged item-by-item for specified services or travel information outputs—by means well-known in the art. Feasible online commercial environments may require even unregistered users to pay an entry fee in the form of cyber-currency or online payment medium. Even for those TRIPS Internet sites which are cooperatively or publicly funded as online tourist bureaus providing "free" travel information, user enrollment or self-identification could be required or encouraged to generate lists of prospects with demonstrated online interest in the local region or selected subject-matter; such tourist information bureaus might offer VALUABLE OUTPUT to get names and address without any charge for the reserved travel information. In sum, the FREE versus VALUABLE OUTPUT distinction illustrates a specific implementation of the more generalized concept of ACCESS/OUTPUT DIFFERENTIALS which are managed in TRIPS at 814 in FIG. 8A.

Added levels of variable DIFFERENTIAL ACCESS/OUTPUT can readily be included. Typical transactions discussed in the present TRIPS patent disclosure actually contemplate three DIFFERENTIAL ACCESS/OUTPUT levels. Firstly, in order to attract "traffic" or anonymous Internet "surfers", a prime level of FREE OUTPUT attracts an "audience" for the advertising offered on the site, and also creates a pool of prospective registered users and new members. Secondly, to reward or motivate user registration, setting up an account, becoming a member or at least user input of their personal name and address information, a second access/output level offers further increments of VALUABLE travel information OUTPUT and functions. Thirdly, users can get special offers and/or options to purchase goods/services—including diverse accommodation and transportation reservations and tickets—provided directly by the TRIPS site and/or brokered through participating third-party providers. These purchases involve a tertiary level of credit terns, conventional accounts and billing, "cyber-money" and/or electronic payments, or equivalent provisions for compensation or exchange of value to pay for goods or services ordered or optioned online in TRIPS.

Moreover, TRIPS FREE versus VALUABLE OUTPUTS or DIFFERENTIAL ACCESS/OUTPUT algorithms are technically implemented in variety of ways—which can be combined, further elaborated, altered and controlled by the TRIPS operator or proprietor at 814 in FIG. 8A. For example, certain operations and travel information records can be provided FREE in a view-only mode; however, the user must register to download or print-out actual travel plans or operational results as VALUABLE OUTPUT. In the alternative or additionally, TRIPS users can get "free" access for a specified number of travel-planning sub-sessions or component steps—with enrollment and/or payments to get added sub-sessions on the TRIPS site. In order to continue travel planning, anonymous users can be required to register after spending a set amount of time "surfing" the TRIPS Internet site. TRIPS travel information and software functions can be preferably provided in part on CD-ROM or other tangible media with online supplements and updates. The data and programs on tangible media are logically provided "free" or included in the initial purchase price. Online access/output, however, is likely "valuable" or contingent on user registration and/or other consideration. Certain types of substantive travel information can be FREE OUTPUTS e.g. larger scale or less detailed maps, publicly scheduled events, brief topical information texts, plus special offers which third-party providers paid to "post" or advertise, on a given TRIPS Internet site. Users must register, however, to obtain VALUABLE OUTPUT such as enhanced or detailed maps, supplemental graphics or audio, fresh temporal information on vacancies at specific hotels and/or availability of tickets for upcoming scheduled events, and so forth. Setting up of an account in TRIPS would typically be required to "book" tickets or reservations to insure payment and client identification. DIFFERENTIAL ACCESS/OUTPUT can be implemented by function. User-directed browsing or "manual" exploration can be allowed "free" to Internet "surfers" or unregistered users for specified kinds of travel information, however, user registration is required in order to perform sequences of more "integrated" or "automated" component operations or steps as detailed elsewhere herein. Alternately, "free" use of limited stock commands might be commercially justified with "manual" selection and editing of travel plan output reserved to enrolled or accountable users only. By these and equivalent means, TRIPS online/Internet site operators or proprietors can distinguish and modulate variable levels or configurations of DIFFERENTIAL ACCESS/OUTPUT within the 814 controller block in FIG. 8A.

At 809 in the FIG. 8A block diagram, the TRIPS invention provides a database of goods/services and preferably related provider information. Listed goods/services are offered to TRIPS users who can make purchases or acquire rights to goods/service discounts or other terms within TRIPS. Thus, the TRIPS invention facilitates not only individualized travel planning or informational output but also contractual or transactional travel arrangements—e.g. ticket purchases, making reservations, taking advantage of special goods/service offers or options (typically subject to locational and temporal restrictions or conditions)—and so forth. TRIPS users can preview available goods/services offers, select, request and confirm specific TRIPS mediated transactions—as described heretofore in relation particularly to FIGS. 5D and 7. Then, TRIPS users can incorporate one or more consummated transactional travel arrangements into their customized TRIPS travel plan output in the form of "map tickets" (i.e. one or more electronic and/or printed digital documents, for use in their travels—preferably including combined TRIPS geographic, temporal, topical, and transactional or accounting travel information). Limited TRIPS embodiments can offer goods/services only from a single source or inventory, for example, as controlled and maintained by the TRIPS online site operator or tangible media publisher—e.g. a TRIPS online site operated by a single hotel chain or one airline or a CD-ROM embodying the TRIPS technology for purposes of making special "map ticket" coupon offers for goods/services provided by one manufacturer or distributor. But, the more fully articulated online TRIPS embodiments preferably provide and/or broker tickets, reservations and other special good/service offers and coupons from a plurality of third-party participating providers—as detailed hereafter particularly relative to transaction and communication facilities at 816 in the Accounting Subsystem at 801 in FIG. 8A. Such preferred implementations of the TRIPS invention include a state-of-the-art relational database inventory-plus-directory of available products and sources which is illustrated in FIG. 8A in the block at 809 titled GOODS/SERVICES & PROVIDERS LIST. The GOODS/SERVICES & PROVIDERS LIST can be computer-searched or user-browsed for one or many of the plurality of participating providers as well as particular or categorical goods/services that are offered, brokered or promoted by special coupon offers on the TRIPS online or Internet site.

At 816 in FIG. 8A, the Accounting Subsystem facilitates, tracks and accounts for diverse transactions among various parties including TRIPS users, providers, operators and/or intermediaries. Such transactions can be variously structured and compensated, as variably determined or arranged by the TRIPS site proprietor or operator and the parties. Participating third-party providers of TRIPS travel information and/or services are subject to various fees or charges, such as: commissions on reservations or ticket sales; charges for advertising or the online posting of promotional information and/or special coupon offers about diverse accommodations (e.g. restaurants, transportation, lodgings, entertainment, tickets, etc.) and/or various other related goods/services; payments for selective utilization of the electronic mailing or membership list of TRIPS registered users; access payments or subscription fees for TRIPS Internet site ratings information (i.e. current statistics on users' interest in particular locations, services, topics or events, etc., measured in terms of user "hits" or frequency of consumer visits or information requests); and so forth. In addition or alternatively, TRIPS users or retail consumers are charged in a variety of ways, e.g.: initial membership fees; charges for user time spent online; periodic subscription fees; fees-for-services or item-by-item charges for goods/services including reservations, ticket sales, goods, products, functions or outputs offered on or through the TRIPS site; and so forth. These transactions are negotiated, consummated, recorded, confirmed, accounted for, and as appropriate, charged, invoiced and/or reconciled within the TRANSACTION COMMUNICATIONS ACCOUNTING MANAGER block—at 816 in FIG. 8A—by means of state-of-the-art software and communication links for electronic commerce or online contracts, related accounting, billing, or customer services, and so forth.

TRIPS users input, manage and perform travel budget considerations with the TRAVEL BUDGET MANAGER at 811 in FIG. 8A described heretofore in regard to the HOW MUCH? sub-menu within the HOW? main input menu at 163 in FIG. 1C. Thus, TRIPS users or their employers—as well as the TRIPS operators or providers—can set cumulative travel spending limits, and/or keep tabs on estimated costs of various emerging or alternate travel plans or options. Such budgeting software functions are implemented by means well-known in the art of computerized fiscal monitoring and cost control.

Statistics on usage of the TRIPS system and its components are compiled, recorded and distributed by and from the TRIPS SITE RATING SERVICE at 818 in FIG. 8A. By means well-known in the art of computer programming and auditing user participation in online sites, the TRIPS invention at 818 preferably counts user "hits" or utilization incidents of selected TRIPS geographic, topical, temporal and accounting travel information records and functions. Such ratings statistics are gathered and made available at the discretion of the operators and proprietors of TRIPS online or Internet sites—for example: for planning the best or most profitable usage and pruning of various parts of the site; for pricing and marketing online advertising or travel information "posting" services provided by the TRIPS site; as an informational commodity provided for a fee or as a benefit of provider participation; as a criteria for user travel information presentations or previews (e.g. ranking the "most popular" travel locations, events, topics and/or goods/services offered by a TRIPS online site) as detailed hereinafter relative to FIG. 9; and so forth. The TRIPS SITE RATINGS SERVICE at 818 in FIG. 8A thereby enumerates and processes measurements of the frequency of retail consumer online "visits" or attention to, or calls for, operator-selected types and specific items of TRIPS travel information, goods/services and functions.

As described heretofore relative to FIG. 3, within TRIPS' standard data structure, the ACCOUNTING DATA sub-structure aids in keeping tabs on billable and/or rateable data records and operations, and other transactional accounting processes in TRIPS. For example, after a relevant component operation, and at the end of each TRIPS travel planning session, billing records for the TRIPS site users and providers plus site "ratings" statistics get incremented, cumulated, or updated by "reading" the relevant sub-structural ACCOUNTING DATA entries as an automated, routine and transparent step done in appropriate, corresponding parts of the Accounting Subsystem at 801 in FIG. 8A. TRIPS bookkeeping, and other transactional support operations are often performed, without pausing for user input (i.e., transparently or "behind the screen"), by way of automated or pre-arranged software scripts or programs, through the TRIPS Interaction Bus 414 in FIG. 4 and the subsidiary TRANSACTION BUS 803 in FIG. 8A.

FIG. 8B

FIG. 8B depicts relational database links and operations between the transactional or Accounting Subsystem and the other characteristic TRIPS travel information Subsystems in the process of "constructing" a typical TRIPS "map ticket". In the present TRIPS disclosure, "map ticket" means travel plan output from TRIPS: (1) which preferably includes geographic, topical, temporal and transactional TRIPS data records; and (2) which functions en route or while on travel e.g. as a reservation confirmation, admission ticket, and/or special offer coupon for diverse goods/services—including related travel schedule, location and topical information. The TRIPS map tickets are preferably displayed, or otherwise output (e.g. an audio or recorded or synthesized voice "map ticket"), in relation to specific locations on digital, electronic and/or printed maps. TRIPS map tickets often appear in the form of a "map note" i.e. a text map annotation with graphic arrow indicating one or more specific locations and corresponding geographic coordinates on an underlying map representation—as shown at 167 in FIG. 1C in the present TRIPS disclosure.

In the present TRIPS disclosure, "map ticket" output was further shown heretofore, at 147 in FIG. 1B, in the form of an alphanumeric coded or bar-coded restaurant dinner reservation, including name of the TRIPS user entitled to the reservation ("John Jones"), number of attendees in party, time/date and user's request for a nonsmoking section. FIG. 1B showed other features of typical TRIPS map tickets such as the name of the restaurant or the participating service provider (e.g. "Jolly Ginger's"), street address information and text travel directions to the restaurant at 145, plus supplemental restaurant information in iconic form at 149 (e.g. showing Jolly Ginger's has air-conditioning, serves liquor and honors specific credit cards), and so forth. With the surrounding text directions and supplemental information, the map ticket at 147 in FIG. 1B was placed, situated or "located" (i.e. made indicative of specific geographical map coordinates) by means of a graphic arrow pointing to the whereabouts of Jolly Ginger's restaurant upon the detail map 141 portion of the overall TRIPS travel plan output shown in FIG. 1B. For coordinated use with compatible portable computer outputs (e.g. map grid references), or for use completely apart from an electronic device, "map tickets" and related TRIPS travel plan output are printed out on paper or other sheet media. TRIPS travel plan output and related map tickets can also be handily used in digital or electronic forms—as detailed heretofore relative to FIG. 1A.

A marginal form of text and/or graphic map note—also suitable for TRIPS map tickets—was disclosed in U.S. Pat. No. 5,559,707 COMPUTER AIDED ROUTING SYSTEM [CARS], by inventors David M. DeLorme and Keith A. Gray, as issued Sep. 24, 1996, and assigned to DeLorme Publishing Company Inc. also owner of the present TRIPS patent application. Such marginal map notes are illustrated in FIG. 1N and detailed in related text in the CARS patent. TRIPS map tickets can also be "located" on a map display or map printout, or associated with specific street address locations by means of symbols and/or highlighted street segments—as disclosed in U.S. patent application Ser. No. 08/521,828 COMPUTERIZED ADDRESS LOCATION AND COMMUNICATION SYSTEM [CALCS], by inventor Keith A. Gray, filed Aug. 31, 1995, and also assigned to the DeLorme Publishing Company, Inc. The CALCS patent application further discloses "MapDocs" e.g. a compact digital file containing a map note such as textual street address information along with specific geographic co-ordinates. A TRIPS map ticket can include such a map note or MapDoc readily transmitted or electronically communicated to between remote computers for printing out, display or other output in conjunction with compatible mapping software. TRIPS map tickets are preferably displayed or printed out directly on or in close visual association with graphic maps. Map tickets, according to the present TRIPS inventions, can also be composed, communicated between remote computers, "located" and utilized by TRIPS users with reference to one or more particular geographic coordinates such as latitude/longitude, or by alphanumerical map grid indications—as disclosed in U.S. patent application Ser. No. 08/265,327, COMPUTER AIDED MAP LOCATION SYSTEM [CAMLS], David M. DeLorme and Keith A. Gray inventors, filed Jun. 24, 1994, also assigned to DeLorme Publishing Company, Inc.

TRIPS "map tickets" can be memorized and posted within TRIPS in a prepackaged or canned format—for example, in the form of coupons or tickets or reservation application forms to which users are attracted or which users call up and request or negotiate by filling in the blanks, as detailed heretofore relative to the TRIPS FIG. 5D "BOOK IT" dialog box at 595. An inventory of such special goods/services offers, reservations, tickets, and/or coupons or vouchers—and/or links to providers thereof—are maintained and accessed as detailed heretofore particularly with reference to the FIG. 8A GOODS/SERVICES PROVIDER LIST 809 and pertinent columns or attributes for RES. (i.e., availability of reservations), TERMS/CONDITIONS, and COUPONS in ACCOUNTING/TRANSACTIONAL RELATION 707 in FIG. 7.

FIG. 8B illustrates the related processes whereby available pertinent map ticket offers are selected and sorted by sequential travel planning operations preferably engaging the various TRIPS Subsystems for geographic, temporal, topical and/or transactional travel information and functions.

These processes for the combined computer sorting and user selection of appropriate transactional travel arrangements are described as "building" or "construction" of "map tickets" in the present disclosure. TRIPS map tickets are thus constructed by combined user selection and computerized sorting processes matching reservations, tickets and other special offers found in the GOODS/SERVICES & PROVIDERS LIST 809 in FIG. 8A with topical, temporal, geographic and transactional "filters" or relational database criteria as imposed over the course of the sequential component operations comprising the individual TRIPS user's travel planning session. For example, Sara Smith sorts and selects the map tickets available in TRIPS by expressing interest in the topic of scuba diving and coral reefs in TRIPS, further "constructing" or "filtering" her eventual map ticket output by sorting and selecting specific geographical places and/or chronological dates/times for her planned underwater vacation trip. Map ticket construction in TRIPS can be overtly displayed on a map screen e.g. by example, by symbols or lists or other representations of the available map tickets that fit through current relational database filters imposed by the TRIPS user's emerging travel planning session. Alternatively, map ticket construction can be managed transparently or "behind the screen"—for example, until a reasonable visible density or short list of the available "map ticket" inventory has filtered out as a result sequential geographic, topical, temporal and transactional operations focusing the user's emerging travel plan.

In the present TRIPS disclosure, FIG. 8B shows the data structure of preferred TRIPS map ticket or reservation confirmation or admission or special offer coupon output at 840. The data structure at 840 includes: (1) a unique transaction code e.g. an alphanumeric or bar code for use en route to confirm one's reservation, for automated ticket recognition and access, and/or validation of TRIPS coupons entitling users to specified price discounts, extra services etc.—and which also preferably forms or corresponds to the associated "invoice number" i.e. the unique code or transaction identifier for pertinent TRIPS tracking and billing functions within the Accounting Subsystem data structure at 850 which is described hereinafter; (2) client i.e. the specific TRIPS user or member arranging for and involved in a map ticket transaction—typically, e.g. the party reserving a table for dinner or one or more seats on a particular airline flight, or theatre or sports tickets, or the party eligible for a special TRIPS price discount and/or extra services "coupon" offer, and so forth; (3) goods/services i.e. a designation or specification of the particular tangible goods, accommodations or other service, or rights to discounted price, extra services, admission or access offered or assured by the map ticket to the TRIPS client/user/member from the participating provider; (4) participating provider i.e. the party offering or agreeing to provide particular goods/services to the client TRIPS user or member according to the terms and conditions of the TRIPS map ticket and the transaction that it represents; (5) lat/long i.e. latitude and longitude or other species of geographic coordinate or ordinary location specification—typically indicating the map location(s) of one or more restaurants, retail stores, hotels, bus terminals, airports, campgrounds, sports arenas and/or other sites at which goods/services designated on the TRIPS map ticket are to be provided; (5) date/time i.e. one or more chronological points in time, time-frames or temporal ranges relating to the goods/services designated in the TRIPS map ticket e.g. air flight departure date/time, time period for which a special offer is open, curtain time or the duration or start time of an entertainment or educational event, seasonal/calendar/ natural phenomena temporal information, hotel check-in time, service appointment date/time, the TRIPS user's estimated arrival time at a specific location (e.g. as computed by routing software in the TRIPS Geographic Subsystem), a mutually agreed-on meeting date/time entered by the user, and so forth.

TRIPS user sessions will often generate travel plan output including two or more map tickets for purposes of a particular trip or journey, for example: a dinner reservation "located" at a restaurant on the way to the airport (see FIG. 1B); an airplane seat or flight reservation with map and/or text directions to the departure airport and a detailed floor plan of air terminal; TRIPS map tickets for auto rental and/or hotel or other lodging reservations for use at the user's planned destination; or one or more user-selected special offers for goods/services available nearby the user's destination(s) or along the route of travel planned in TRIPS; and so forth. Moreover, in certain cases, one single map ticket can address goods/services available or offered at multiple locations and/or plural dates/times. In the interests of a simplified presentation, FIG. 8B illustrates the TRIPS database relations involved in generating one map ticket data structure at 840 related essentially to one unique location and one particular time/date, generated over the course of a particular TRIPS travel planning session described hereinafter. Persons skilled in the computer programming arts can readily apply the teaching of FIG. 8B to multiple TRIPS map tickets and/or several locations or dates/times per map ticket. FIG. 8B also obviously enables the user acceptance and/or modification of saved or "prepackaged" map ticket output as produced in prior TRIPS operations.

FIG. 8B particularly details ongoing operations in a TRIPS travel planning session involving the technique or approach attributed to Sara Smith in the present disclosure. Heretofore, Sara Smith exemplified the case of a TRIPS user browsing for things to do on vacation. Relative to FIGS. 2, 3 and 4, the present invention disclosure text portrayed Sara Smith starting an individual TRIPS travel planning session investigating "scuba-diving" and "coral reefs" within the TRIPS Topical Subsystem that was further described relative to FIG. 7. In FIG. 8B, this topic of scuba-diving fits under "goods/services" 827 (or an equivalent database classification like "activities", "things to do" or "products"), within the Topical Subsystem data structure blocked out at 825. At 829, a data type or logical category titled "natural features" embraces Sara Smith's interest in coral reefs (along with mountains, rivers or other types of terrain, climates, flora, fauna, land or water features, and so forth). The TRIPS invention is not limited, however, to the specific designated names or logical categories of travel information data types represented in FIG. 8B. Moreover, fully articulated TRIPS embodiments facilitate alternative scenarios for sequentially engaging the characteristic TRIPS geographic, temporal, topical and accounting Subsystems—as heretofore described, particularly referring to FIG. 4. Such varied TRIPS travel planning approaches and queries entail other appropriate configurations of "one-to-one", "one-to-many" or "many to many" travel information data record linking operations—which a skilled information system analyst can extrapolate from the specific individual/group data relations shown for purposes of the case or TRIPS use episode illustrated by FIG. 8B. As detailed heretofore, with particular reference to FIG. 7, preferred TRIPS embodiments deploy various relational database flat file structures or configurations which facilitate variable operational sequences retrieving, filtering, or relating TRIPS travel information and/or available travel arrangements by characteristic topical, geographic, temporal and/or transactional or accounting criteria, categories, or attributes, and so forth.

Sara Smith commences her hypothetical TRIPS travel planning session at 825 in FIG. 8B in the Topical Subsystem (also shown for example at 213 in FIG. 2, at 415 in FIG. 4, and accessed by the WHAT?/WHO main input menu at 157 in FIG. 1C). With different motivations and travel planning needs, other TRIPS users start or carry on individual sessions by data operations which engage other TRIPS Subsystems e.g.: (1) at 835 in FIG. 8B, the Geographic Subsystem (also shown at 221 in FIG. 2, as "PLACES" at 417 in FIG. 4, and accessible via the WHERE? main input menu at 155 in FIG. 1C); (2) at 850 in FIG. 8B, the transactional or Accounting Subsystem (also depicted at 217 in FIG. 2, as "ACCTS." 411 in FIG. 4 and accessed thru the HOW? main input menu at 163 in FIG. 1C); (3) at 860 in FIG. 8B, the Temporal Subsystem (also delineated at 223 in FIG. 2, as "TIMES" at 419 in FIG. 4, and accessed by means of the WHEN? main input menu at 161 in FIG. 1C). In sum, FIG. 8B shows specific data relations involved in a particular travel planning session in TRIPS—in which follow-up geographical, temporal and transactional travel information is subsequently related to an user's initial focus on one or more topics such as scuba-diving and coral reefs. Other routine travel planning scenarios in TRIPS follow-up initial temporal user input with variously ordered topical, geographical and accounting relational travel data processes, and so forth, taking advantage of TRIPS variable operational sequencing described heretofore particularly with regard to FIG. 4. The travel information data relations specified in FIG. 8B can be extended by ordinary computer programming skills to alternative operational sequences facilitated by TRIPS.

Sara Smith's exemplary TRIPS travel planning session starts to build map ticket travel plan output with preliminary "bookkeeping" operations. The Accounting Subsystem data structure 850 recognizes or registers Sara Smith as a user/member at 852; then Sara Smith's identity and registered status can be linked to, or associated with, the "client" portion 842 of the nascent TRIPS map ticket trip plan output data "packet" or structure at 840, by means of the data relation or link delineated at 848. Using an automated, transparent link at 847, the Accounting Subsystem further assigns a non-repeated transaction code 841 to Sara Smith's embryonic map ticket 840 from the unique invoice numbers available for TRIPS tracking or billing transactional data functions at 851. Thereafter Sara Smith's substantive TRIPS travel planning session proceeds with her selection of "scuba-diving" from many topics or "goods/services" at 827. Through the link at 826, Sara Smith's selection of "scuba-diving" gets installed at 843 in her emerging map ticket 840. Via the link at 849, the Accounting Subsystem at 850 can then in turn be alerted to Sara Smith's interest in available accommodations, reservations, tickets, or other special offers from participating providers whose terms and conditions at 853 relate to the "scuba-diving" topic, species or type of TRIPS goods/services.

At an early stage, Sara Smith's substantive travel planning session also focuses on a specific topographical topic from among many categories or species of "natural features" at 829 in FIG. 8B. Thus, the Topical Subsystem data structure 825 enables Sara Smith to access information on "coral reefs". Moreover, the TRIPS relational database design, outlined in FIG. 8B, entails a link or relation 830 from the general subject of coral reefs to many particular geographic coordinates (e.g. latitude and longitude or "lat/longs" 836) which indicate specific places where coral reefs are located the earth's surface and maps thereof. Then Sara Smith can select one or more of these coral reef locations from the Geographic Subsystem data structure at 835 to be installed by means of the link at 837 within her emerging map ticket 840 as lat/long data 845. In turn, this information on one or more coral reef site(s) or lat/longs at 845 can be related thru the link at 856 to corresponding information at 853 under the Accounting Subsystem data structure at 850. (For purposes of FIG. 8B, presumably, the Accounting Subsystem maintains records on the lat/long or location of designated good/services—among various other specifications—under "terms and conditions" at 853). In this manner, the present invention enables TRIPS users to browse or search for places or locations related to a topic. Thereafter in turn, the TRIPS user can readily access and preview information on other goods/services available at the topical location. Specifically, the preferred relational database design in TRIPS facilitates Sara Smith's exploration and selection of one or more coral reef locations for inclusion in her initial or final TRIPS "map ticket" 840 travel plan output. Following-up, by means of the link or relation at 856, Sara Smith can then prompt TRIPS to "filter" or sort out the data records in the Accounting Subsystem "situated" at or within a specified distance of her selected coral reef location(s). Thus TRIPS can assemble and present multimedia previews about transportation, other accommodations, reservations or tickets, or special goods/services offers available within TRIPS and related to location(s) of topical interest to Sara Smith. So, Sara Smith can use TRIPS to shop for flights, lodgings and entertainment around where she wants to go scuba-diving.

Sara Smith's specific approach to her TRIPS travel planning session further assumes Temporal Subsystem 860 input operations selecting one or more date/times defining her vacation plan time-frame. On the one hand, FIG. 8B contemplates that Sara Smith could select and enter START and FINISH date/times "manually" at 862—based for example on her personal preferences and her own understanding of the duration and the scheduling of vacation time allowed by her employer. On the other hand, START and FINISH date/times can be derived through the link or database relation at 866 from the temporal terms/conditions 853 of specific transportation or other accommodations reservations found and selected by Sara Smith in the Accounting Subsystem 850 in TRIPS. However entered or derived, specific dates/times 862 relevant to Sara Smith's vacation can be linked from the Temporal Subsystem data structure 860 into the date/time portion of Sara Smith's emerging "map ticket" 840 travel plan output data packet. TRIPS users can further investigate, preview, select and/or manipulate related dates/times—as detailed heretofore particularly relative to FIG. 6. Thru the link or relation shown at 866 in FIG. 8B, the TRIPS invention enables sorting TRIPS transactional records by chronological dates/times or other temporal criteria which, in FIG. 8B, are presumably managed and stored under terms/conditions at 853 within the Accounting Subsystem data structure at 850. This means Sara Smith can prompt a text listing and/or a multimedia presentation on events of interest, hotel vacancies, available flights or diverse other goods/services provided through TRIPS, which are particularly related to the date(s)/time(s) when Sara Smith is planning a vacation.

The locational and temporal relational database operations disclosed in the two preceding paragraphs can be readily joined by means well-known to persons skilled in relational database computer programming. Lat/long 845 and date/time 862 attributes can be combined to include the primary key or effective sorting criteria for TRIPS database operations. In this way, TRIPS users can "filter" or sort designated accommodations and goods or other services available via TRIPS in relation to both where and when they want to travel (i.e. both the geographic location and the temporal schedule of their planned vacation, family or business trip). From the results of such sorting on the location and/or times/dates for a trip selected and planned by the individual user, a fully articulated embodiment of TRIPS provides one or more geographically focused i.e. point or route-related and/or chronologically arranged multimedia previews or presentations on various selected types of goods/services offered in TRIPS. Thus, TRIPS advances or enhances the "Along the Way" route-related multimedia previews, which were disclosed in U.S. Pat. No. 5,559,707, COMPUTER AIDED ROUTING SYSTEM [CARS], by inventors David M. DeLorme and Keith A. Gray, issued Sep. 24, 1996, and assigned to DeLorme Publishing Company, Inc. which is also assignee of the present TRIPS disclosure. In sum, TRIPS enables user-selectable multimedia travel information previews improving on the just cited CARS patent with added transactional and/or temporal contents and relational database functionalities—as detailed herein particularly relative to FIGS. 7 and 8B.

TRIPS map tickets—and related travel information presentations on multiple goods/services offerings in TRIPS—preferably further include participating provider data at 844 in FIG. 8B. Travelers often select available goods/services based on substantive features, cost, convenient location or scheduling rather than the provider's identity or reputation. But, the participating provider field or domain at 845 and 855 can also be employed a primary key or search criteria in a well-articulated TRIPS relational databases. For example, selecting good/services by the brand or provider is preferable for those travelers eligible for a "frequent flyer miles" discount from a particular airline, or for travelers with a strong individual preference for particular brands or providers. TRIPS users can commence or continue travel planning by selecting one or more participating providers at 854 within the Accounting Subsystem table at 850. Thus, TRIPS users can arrange "filters" or sorting operations that limit subsequent map tickets or presentations of TRIPS offerings to the goods/services of specified providers. For example, Sara Smith can pick one or more participating providers at 854, setting up filters or TRIPS sorting criteria via the link or relation at 855, which will concentrate her selection of available flights and/or lodgings for her scuba-diving vacation on specified providers such as her favorite airline or chain of hotels. This capability for provider-specific transactions in TRIPS not only enhances user selectivity but also encourages provider participation in special goods/service offers in TRIPS as a promotional tool to attract more clients. By declining to impose such provider-specific filters, the TRIPS user can avail him or herself of goods/services offers from a host of competing providers—restricted instead, at the user's option, for example by geographical and/or chronological terms and conditions at 853 as described heretofore in relation to FIGS. 7 and 8B.

FIG. 9

Figure 9A:
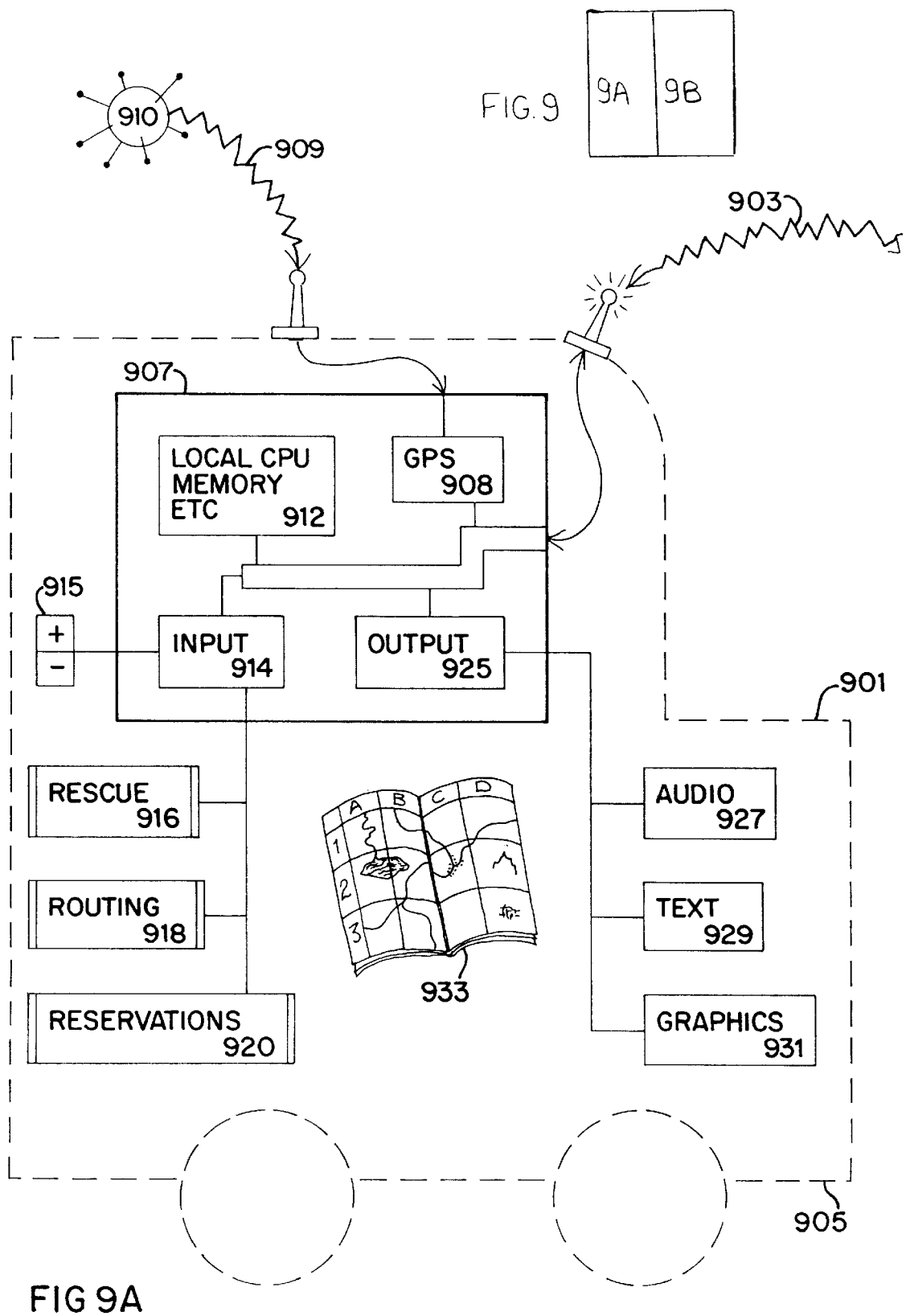
FIG. 9 exemplifies TRIPS capabilities for automated and/or integrated sequences of characteristic travel information processing, describing simplified, standardized "push-button" travel information inquiries from users at remote locations and equipped with wireless communication and GPS.
Figure 9B:
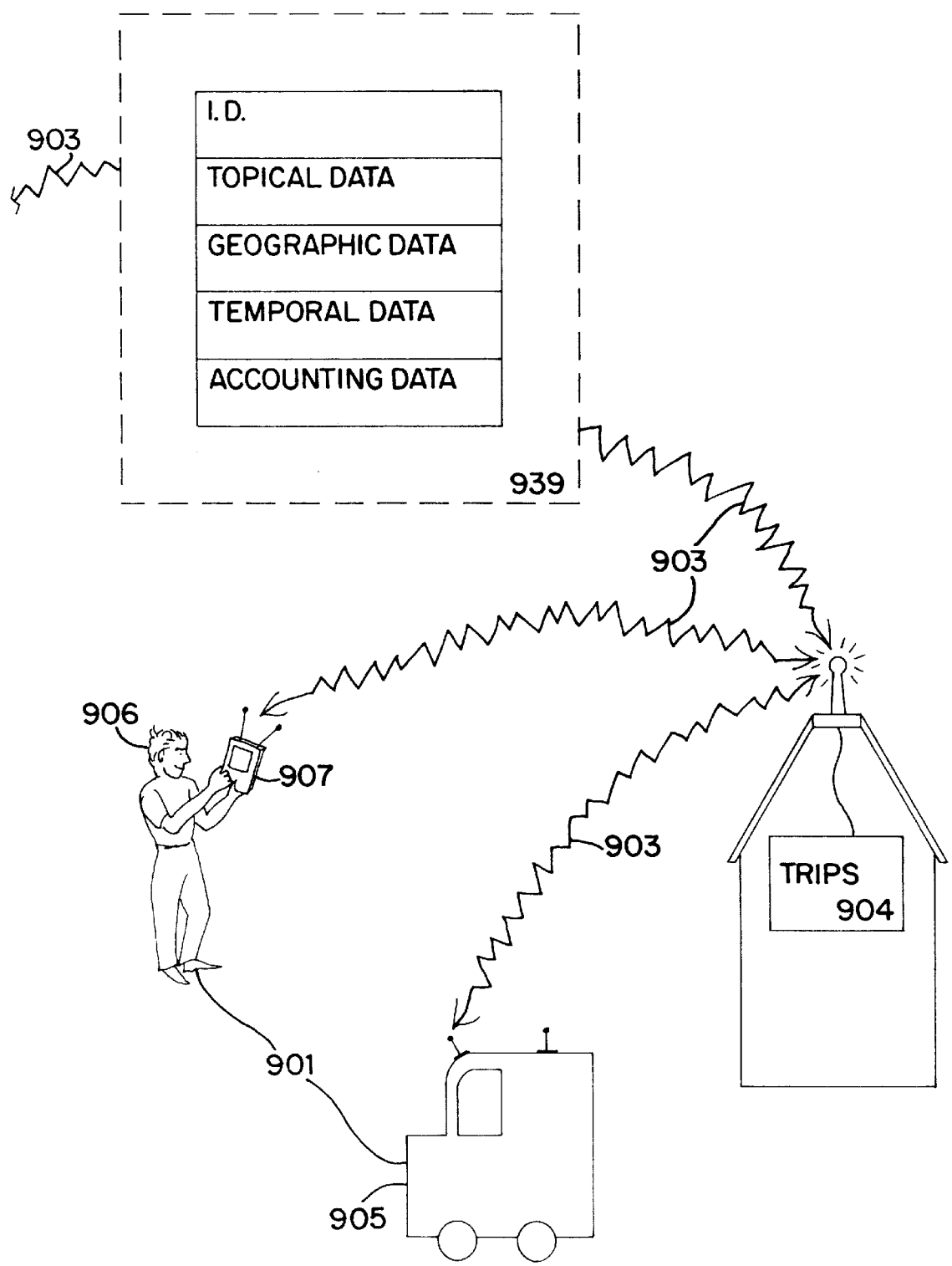

FIG. 9 illustrates an important alternative or additional embodiment of TRIPS—that permits mobile users 901, at remote locations (for example, en route in vehicles or on foot), two-way access by wireless communications 903 to engage the novel travel reservation information planning system of one or more TRIPS 904 communications facilities or service bureaus. FIG. 9 includes a wireless communication unit or WCU 907, typically hand-held 906 or mounted or used in a vehicle 905 like an automobile. The WCU 907 preferably includes a position sensor unit, e.g., GPS sensor 908, which provides data on the user's location, speed and travel direction and the current time—for example, by signals 909 from one or more global positioning satellites 910. The portable or mobile WCU 907 also preferably includes various simplified user INPUT means 914, 916, 918 and 920 designed for easy use while actually traveling or en route e.g. in a vehicle 905 or walking about 906; similarly simplified user OUTPUT means are shown at 925, 927, 929 and 931. TRIPS WCUs 907 facilitate two way communications at 903 of standard TRIPS data packets 939 with at least one TRIPS travel information and service provider 904. In sum, FIG. 9 outlines embodiments of the TRIPS invention enabling users to get travel information and/or make travel arrangements "on the go", walking in a city, from their vehicle, during an off-road expedition and so forth.

FIG. 9 illustrates portable TRIPS embodiments, which can function either with or without (elation to desktop TRIPS user setups as described heretofore with reference to FIG. 1A. On the one hand, TRIPS users can use portable FIG. 9 embodiments from a remote location in conjunction with TRIPS travel plan outputs prepared in advance on a home or work desktop installation. As depicted at 107 and 123 in FIG. 1A, TRIPS travel plans, including "map ticket" outputs, can be partly or entirely transferred to one or more TRIPS goods or service providers, and/or copied into various portable electronic devices 125—including mobile or handheld devices equipped with GPS 908, wireless two-way communications, and simplified input/output means, which can thus work as FIG. 9 WCUs 907. Coordination between TRIPS retail users' advanced TRIPS travel plans and their later immediate inquiries en route are facilitated by such "pre-trip" transfers online and/or to portable devices. On the other hand, FIG. 9 also depicts alternative TRIPS embodiments and remote usage scenarios which facilitate "on the spot" simplified travel planning and transactions, via WCU 907 from remote locations, by retail users actually en route, who have not necessarily engaged in previous desktop TRIPS travel planning sessions, arrangements, output or transfers specifically related to their current trip.

Thus, before embarking on a journey, a TRIPS user can make travel plans and arrangements, at home or work on fully capable desktop TRIPS platforms—as described heretofore relative to FIG. 1A—with a printer, CD-ROM, ample memory, state-of-the-art processor and input/output peripherals, relatively wideband hard-wired communications capabilities, and so forth. Then, for further assistance on the actual trip, part or all of the TRIPS desktop output can be transferred to the relevant TRIPS provider shown in FIG. 9 at 904 and/or transferred into memory at 912 of an appropriate WCU 907, which the user takes on the trip itself. In such situations, FIG. 9 embodiments can provide added, "on the spot" travel information/services in relation to the remote TRIPS user's individual "advance" travel plans and arrangements for his or her current trip, which can be memorized in the TRIPS user's WCU 907 and/or transferred to, or put "on file" with, the TRIPS online service Provider 904.

Alternatively, the TRIPS embodiments and use episodes shown in FIG. 9 do not require or necessarily involve desktop travel plan outputs about the current trip as prepared in advance by the TRIPS user, then committed to memory at 904 or 907 for reference in case the TRIPS user "calls" to get travel information and/or assistance en route. In other words, FIG. 9 illustrates TRIPS embodiments for immediate travel inquiries and responses to and from TRIPS retail users "on the road" or at remote "field" locations. Though preferred for coordination purposes, advanced TRIPS travel planning and output transfers are not essential. Wireless communications at 903 are preferred for portability; but many aspects of FIG. 9 are also applicable to hard-wired TRIPS kiosks or dedicated work stations at remote locations. For purposes of such immediate travel plan inquiries, responses and transactions from remote locations, the TRIPS user 906 is preferably already registered, or set up with a TRIPS account; remote TRIPS users' WCUs 907 must be compatible and in electronic communication with one or more TRIPS providers or bureaus 904 which handle topical, geographic, temporal and/or accounting or transactional travel information processing—as disclosed heretofore, particularly relative to FIGS. 2 and 4.

FIG. 9 reveals two-way communications or transmissions at 903—preferably wireless to facilitate mobile usage—which involve standard TRIPS data "packets," objects or structures at 939, disclosed heretofore with particular reference to FIG. 3. In other words, FIG. 9 embodiments facilitate TRIPS relational database operations for manipulating digital objects with unique I.D.'s and provisions for related TOPICAL, GEOGRAPHIC, TEMPORAL and/or ACCOUNTING DATA. For convenient use en route, e.g., in a vehicle or on foot, the WCU 907 preferably provides simplified or "push-button" input means at 914, 915, 916, 918 and 920, for example to make TRIPS inquiries from a moving car, as described hereinafter. On the road or from other remote places, the TRIPS users at 901 transmit and receive characteristically structured TRIPS data packets 939—that typically concern their immediate needs for travel information or arrangements e.g.: reservations and/or entitlement to a discount for the next meal at a roadside eating place or lodgings for the night ahead; current information about goods/services available nearby and/or up ahead along the user's intended or predicted route of travel; emergency services requests, such as vehicle repair or towing, ambulance, police or fire; related travel directions; and so forth. The TRIPS service bureau or provider 904 in FIG. 9 receives the simplified input or remote queries, which get processed by series or sequences of TRIPS geographic, temporal, topical and accounting operations—as generally delineated heretofore with particular reference to FIG. 4. Such processing at 904 in FIG. 9 is directed to the generation of responsive TRIPS travel information—including travelog previews and/or "map ticket" outputs—which gets sent back by wireless communications 903 to the individual TRIPS user or vehicle 901/905/906. This output from the TRIPS provider 904 is thereby presented to the remotely located TRIPS user 901 by his or her WCU 907. The WCU output controller 925 facilitates appropriate simplified audio 927, text 929, and/or graphics 931 output. The response from the TRIPS provider 904 to the remote user's inquiry is thus preferably presented in formats and media suited to the various circumstances of remote TRIPS users 901, e.g.: emphasis on audio to reduce visual distraction for drivers of vehicles; audio, text or graphic output of named map grids for remote users referring to printed maps at 933 with corresponding grids; alternative and/or supplemental graphic travel information outputs, including variably detailed map displays, and so forth.

Preferably, follow-up dialog between the remote TRIPS user 901 and the central TRIPS provider 904 is further enabled. For example, the WCU 907 in FIG. 9 also includes simplified input means 915 whereby the remote TRIPS user 901 can at least answer "+" or "−", (i.e. "yes" or "no") by way of reply or come-back to responsive communications from the TRIPS provider 904. In other words, by such simplified means for input of remote user replies at 915 or equivalent user interface technologies known in the art, remote TRIPS users can further elaborate or narrow their initial queries, make selections and travel arrangements which answer communications sent by and from one or more TRIPS providers 904, responding to typical remote TRIPS user queries. Remote TRIPS user interface capabilities are illustrated by the following dialog: (1) user pushes RESCUE button 916; WCU 907 or TRIPS provider 904 responds "Ambulance?, Police?, Fire? or Car Repair?"; user pushes "+" to select one or more needed emergency rescue services; (2) user pushes ROUTING button 918; WCU 907 or TRIPS provider 904 responds "Nearest? or Fastest?"; user voices "Fastest" to set a routing parameter; WCU 907 or TRIPS provider 904 then responds "GAS?, FOOD?, LODGINGS?" asking for further user specification of destination type; and (3) in later stages of a dialog initiated by user pushing RESERVATIONS button, the TRIPS provider 904 communicates a specific offer, e.g., "HOLIDAY INN—$40 Double Room"; user replies pushing "+" or "−" button at 915 to accept or reject. Thus, embodiments of the TRIPS invention, illustrated in FIG. 9, facilitate inquiry development, travel parameter and information selection, and/or specific dialogical two-way communications to make reservations or other simple transactions entailing offer and acceptance.

For purposes of such two-way transmissions, the "I.D." portion of the standard TRIPS data packet 939 includes a "device I.D." or a "sender-type" identification code which, for example, enables the TRIPS provider system 904 to recognize when it has just received an inquiry from a remote TRIPS WCU at 906. The ACCOUNTING DATA portion of TRIPS data packet 939 from the remote WCU 906 also contains data on the identity and wireless "return address" of the remote TRIPS user. Therefore, the central TRIPS service provider 904 is able to identify individual TRIPS users (at least by their unique alphanumerical or binary code), process particular individual queries, then send back responsive output to the "right" individual remote TRIPS user's electronic "return address" via TRIPS two-way communications 903.

At 904 in FIG. 9, a TRIPS signal or transmission that is identified as coming from a remote TRIPS compatible WCU 907 gets further processed at the TRIPS service bureau 904 by prescribed or largely automated sequences of characteristic TRIPS steps or operations specially designed to deal with such remote queries. Preferably, the first chore for such automated processing is to validate individual user ACCOUNTING DATA routinely included with such transmissions. By so identifying the individual remote user whose WCU 907 is sending a given transmission, the TRIPS service provider 904 can access the individual user account, user profile and "pre-filed" travel plan output (if any). These preliminary operations in the Accounting Subsystem determine that the TRIPS user is registered, initiate billing and other TRIPS transaction tracking procedures, and make available stored information about the user's identity, preferences and specific travel plan if one was submitted in advance. In handling input from a remote user, preferably, the second task performed more or less automatically at 904 is to determine the topic of interest of the remote user input (e.g., the reservations, emergencies, goods/services, or directions). In effect, the TRIPS Topical Subsystem is programmed to recognize whether a remote user has pushed the RESCUE 916, ROUTING 918, or the RESERVATIONS 920 "button" and/or some equivalent simplified and dedicated input means on his/her WCU 907; the recognition of the topic, purpose or substance of a remote TRIPS user's inquiry triggers appropriate processing and response on the part of the TRIPS provider 904. Thirdly, data packets 939 received from remote WCUs 906 preferably get parsed for GEOGRAPHIC DATA by the TRIPS service provider at 904; more specifically, the Geographic Subsystem is programmed to retrieve the remote TRIPS user's "real time" geographic location, speed and travel direction as detected and/or computed by the GPS attachment 908 on the remote WCU 907. Such information on a remote user's current position, course and rate of travel facilitates intelligent processing and responsive output at 904—for example: treating the present or predicted position of the remote user as the departure point or START for routing calculations and travel directions; similarly, treating the remote user's reported location as destination for emergency services; searching for proximate restaurants, lodgings, or other POIs from a combination of a remote user's present location and direction of travel or compass course; in a similar fashion, computing the remote user's distance from and/or estimated arrival time at places or probable destinations "ahead," i.e., along the remote timer's predicted route or travel direction; and so forth. Computing estimated arrival times and searches for timely EOIs are further enabled by the fourth preferably automated step or operation executed at 904 whereby the TRIPS Temporal Subsystem is programmed to capture the time/date of the remote user's inquiry or transmission which is kept by the GPS 908 and/or the digital clock with the CPU 912 of the remote user's WCU 907.

As illustrated in FIG. 9, standardized, simplified inputs or inquiries from TRIPS users at remote locations are facilitated by portable WCUs at 907—which are typically handheld 906 or installed or utilized in vehicles such as an automobile 905, bus, airplane, marine vessel, and so forth. Various portable devices can perform the functions of the WCU 907—e.g. a notebook or laptop personal computer, a personal digital assistant or PDA, a "smart" cellular phone, two-way pager, an "accessorized" GPS sensor, as well as a dedicated or specially manufactured appliance, and so forth—provided that the device includes appropriate embedded and/or attached elements, as described immediately hereinafter.

The WCU at 907 in FIG. 9 preferably includes, at 908, an attached or built-in global positioning satellite position sensor, or equivalent user location means. By monitoring signals 909 from multiple satellites 910, other radio signal analyses or dead-reckoning data computations, position sensors (such as GPS sensor 908) generate data on the current location of the sensor and its user. With digital clock data plus state-of-the art associated circuitry and programs, GPS sensor 908 and equivalent position sensing devices also compute and output current travel direction, speed and the precise time on a real time basis, i.e., updated at short time intervals, e.g., 10 seconds to 2 minutes. This standard GPS sensor 908 output is monitored by the processor and memory capabilities 912 within the WCU 907. Remote TRIPS user's WCUs 907 are programmed to transmit current user position (e.g., latitude and longitude), travel direction (e.g., compass direction or vector description), speed (e.g., miles, kilometers per hour), plus current date/time (e.g. Jan. 1, 1997, 0630.012457 hours) via 903 communication channels to one or more TRIPS providers 904. Such information on the remote TRIPS user's location, rate and direction of travel and current time are thus sent initially along with the first transmission of any remote TRIPS user query and preferably updated frequently thereafter. In the WCU 907, remote TRIPS users manage input at 914—picking among a limited selection of standard remote TRIPS travel information/arrangement request types, input means or "push-buttons."

As shown at 916, 918 and 920, simplified means for input of standard remote TRIPS user travel information and/or arrangement queries are exemplified by three hard-wired or software-dedicated keys or "push-buttons" respectively entitled RESCUE, ROUTING and RESERVATIONS. Alternative terminology for this set of buttons or keys includes EMERGENCIES, DIRECTIONS and ACCOMMODATIONS—among many other titles. Added or alternate simplified "push-buttons" or keys include, but are not limited to, GOODS/SERVICES, PRODUCTS, EVENTS or ATTRACTIONS and so forth. Such primary keys or stock input selector buttons for prompting and designating TRIPS remote user requests can be further aided by a simplified sub-menu, follow-up keystrokes, or other state-of-the-art user interface technologies for portable, compact, user-friendly, embedded, or "dumbed-down" computer devices for the consumer market. Sub-menus, follow-up keystrokes or equivalent user interface means for further input specification distinguish between remote TRIPS user queries for, e.g.: car repair or towing versus ambulance services; restaurant versus hotel or campground reservations; travel directions to the nearest grocery or hardware store versus pharmacy; etc.

FIG. 9 further illustrates facilities for managing output 925 within the WCU 907 including varied selection or combination of audio 927, text 929 and/or graphics 931. Such varied outputs express travel information and arrangement responses communicated from the TRIPS provider at 904 by return wireless communications 903 back to the user issuing a request at 907. These varied outputs also provide further selectivity or specificity in input of standard user requests. For example, after a primary input or "push-button" operation prompting a RESCUE 916 or a RESERVATIONS 920 request for example, the local WCU controller 912 or the TRIPS online provider 904 can respond with text 929, audio 927 and/or graphics 931 message or user selectable menu or set of options: e.g. "Car repair shop, Towing or Gas Station?"; "Medical Rescue, Police or Fire"; "Restaurant, Hotel or Campground"; and so forth—with a corresponding means for the remote user to select one or more specific options. Preferred embodiments for in-vehicle use provide audio 927 output of such selections, and even voice recognition technology for TRIPS user inputs and selection, for a user interface with minimal visual distraction for the vehicle driver. Text and graphics—for example, map displays—are preferred for vehicle passengers and other remote TRIPS retail users without visual distraction concerns. Travel information and arrangement responses from TRIPS 904 are also preferably expressed by varied selection or combination of audio 927, text 929 and/or graphics 931 fitting the needs and circumstances of the remote TRIPS user. For example, audio 927 is preferred for travel directions output for vehicle drivers keeping their eyes on the road. Passengers are enabled to navigate with added text 929 and/or graphics 931 including map displays. The responsive output 925, 927, 929 and/or 931—as transmitted from the TRIPS provider 904 and expressed by the remote TRIPS user's WCU 907—can include citation of particular map grid names from a system of named map grids for use, coordination and/or correlation with corresponding printed maps 933 employed by the TRIPS user at the remote location.

FIG. 9 TRIPS embodiments also enable responsive previews or presentations on two or more geographic POIs, temporal EOIs, or transactional "map ticket" outputs. This technology was detail ed in U.S. Pat. No. 5,559,707 COMPUTER AIDED ROUTING SYSTEM [CARS], issued Sep. 24, 1996, and the related continuation-in-part application Ser. No. 09/661,600 COMPUTER AIDED ROUTING & POSITIONING SYSTEM [CARPS], filed Jun. 11, 1996—both by inventors David M. DeLorme and Keith A. Gray, and both assigned to DeLorme Publishing Company, assignee of the present TRIPS disclosure. In the present TRIPS disclosure, the capabilities for such previews or presentations are further detailed heretofore, particularly with reference to FIGS. 5, 6, 7 and 8. Typically with restricted WCU 907 output facilities at 925, 927, 929 and/or 931, such travel information previews or presentations at remote locations may be simplified in content and formats by comparison with multimedia travelog slide shows and/or digital video displays on fully articulated desktop TRIPS user work stations. Nonetheless, as illustrated in FIG. 9, implementations of the TRIPS invention for remote queries en route manage selectable presentations on two or more related TRIPS travel information items.

For example, while walking in an unfamiliar city or driving on vacation or for business, suppose that a TRIPS user pushes the RESERVATIONS button on his or her WCU 907 to get information and to make arrangements for immediate accommodations, such as a place to eat or to stay overnight. By sub-menus, follow-up keystrokes, or equivalent means for further input specification shown at 915 in FIG. 9, TRIPS users can further focus their requests, e.g., in search of information on nearby restaurants, gas stations, hotels. and so forth.

In this case, suppose the remote TRIPS user is hungry and seeking to get directions to nearby restaurants. By two-way communications 903, this more specific request gets sent to the TRIPS provider 904—in conjunction with GPS 908 data on the current location, speed, travel direction and time data. This remote GPS data and specific TRIPS user request gets processed at 904 searching the TRIPS database for restaurants located in the vicinity of or along the predictable travel route of the remote TRIPS user. This responsive output is then communicated back to the particular remote TRIPS user's WCU 907.

Thus, the TRIPS provider 904 generates and transmits travel information—optionally including transactional reservation or discount coupon offers—on a list of restaurants on the TRIPS user's travel path. Information on two or more restaurants can be presented to and/or selected by the TRIPS user at his or her remote location using the WCU 907. For example, as audio output 927, information and offers related to several restaurants "down the road" can be voiced—with the TRIPS user enabled to select or accept by simple "push-button" or voice recognition input 915 indicating "yes" or "no" to get more information on a particular restaurant. to save such restaurant information in the local WCU memory 912, or to make a specific reservation and/or to accept a discount offer communicated from the TRIPS provider 904.

Preferably, the TRIPS provider 904 system is programmed to provide pertinent travel directions to the hotel or restaurant as an automatic follow-up step to a remote user making a reservation or accepting a discount offer. Reservations or discount coupons in TRIPS preferably include a confirmation code, for example a unique or descriptive alphanumeric identifier, communicated from the TRIPS provider 904, received and saved by the remote user's WCU 907. Thereafter, by means audio 927, text 928, graphics 931 or direct link to another computer, topical data on the hotel or restaurant, geographic travel directions and the transactional confirmation code can be combined and output by the WCU 907 as a "map ticket". As formed by the TRIPS provider 904, communicated to and output by the remote user WCU 907, a "map ticket" further preferably includes temporal information—such as the date/time for the dinner or hotel reservation—established by agreement between the TRIPS user 901 and the service provider and communicated and processed as TEMPORAL DATA at 939. For example, relative to a particular hotel or restaurant "up ahead" of the remote TRIPS user, the WCU 907 and/or TRIPS 904 are programmed to estimate the remote user's time of arrival at the hotel or restaurant based on the GPS sensor 908 current date/time computed relative to the remote TRIPS user's current location, speed and direction of travel. This estimated TEMPORAL DATA on the remote user's expected arrival time at the hotel or restaurant can be communicated and used in negotiating appropriate dates/times for the dinner or room reservations.

Although the preferred embodiments of the present invention have been described in detail herein, it is to be understood that these descriptions are merely illustrative. The inventive system may be modified in a variety of ways and equivalents in order to suit a particular purpose while still employing the unique concepts set forth.

We claim:

1. A travel reservation information and planning system (TRIPS) comprising:
   a. a computer;
   b. a TRIPS database of topical data and geographic data;
   c. means for a TRIPS user to relay via said computer one or more inputs related to travel, travel planning, activities associated with travel, or any combination thereof;
   d. one or more subsystems couplable to said TRIPS database and constructed to process said one or more inputs from said TRIPS user and to calculate one or more outputs responsive to said one or more inputs, wherein said one or more outputs include information on options or a range of options corresponding to said travel, travel planning, activities associated with travel, or any combination thereof; and
   e. a controller for regulating correspondence between said one or more inputs from said TRIPS user and said one or more outputs from said one or more subsystems, wherein one of said one or more subsystems is a temporal subsystem including means to enable said TRIPS user to preview, manipulate, and manage a chronological dimension associated with said travel, travel planning, activities associated with travel or any combination thereof.

2. The TRIPS as claimed in claim 1 wherein one of said one or more subsystems is a geographic subsystem comprising:
   a. means for gathering from said TRIPS database geographic information related to points of interest;
   b. TRIPS geographic software constructed to retrieve specific information related to one or more points of interest identified based upon said one or more inputs from said TRIPS user; and
   c. means to output to said TRIPS user said specific information related to said one or more points of interest.

3. The TRIPS as claimed in claim 2 wherein said geographic subsystem further includes means for calculating and identifying one or more travel routes associated with said specific points of interest and means for presenting to said TRIPS user output related to topics of interest proximate to said one or more points of interest.

4. The TRIPS as claimed in claim 2 wherein one of said one or more subsystems is a topical subsystem comprising:
   a. means for gathering from said TRIPS database topical information related to people, places, events, things, or any combination thereof;
   b. TRIPS topical software constructed to correlate one or more topic-related inputs from said TRIPS user and to integrate said topical information based on said one or more topic-related inputs into one or more topical subsystem outputs; and
   c. means to output to said TRIPS user said one or more topical subsystem outputs.

5. The TRIPS as claimed in claim 4 with said temporal subsystem comprising:
   a. temporal information containing representational gauges of time;
   b. an updatable temporal database including time-related information associated with said topical information;
   c. TRIPS temporal software constructed to correlate one or more time-based TRIPS user inputs with said one or more inputs related to said travel, travel planning, activities associated with travel, or any combination thereof; and
   d. means to output to said TRIPS user one or more temporal subsystem outputs related to said one or more time-based TRIPS user inputs and said one or more inputs related to said travel, travel planning, activities associated with travel, or any combination thereof.

6. The TRIPS as claimed in claim 5 further comprising means for linking said temporal database to one or more remote topic-information providers.

7. The TRIPS as claimed in claim 6 wherein said temporal database includes multimedia information related to said travel, travel planning, activities associated with travel, or any combination thereof.

8. The TRIPS as claimed in claim 5 further comprising a transactional subsystem including a modifiable database of cost information associated with said travel, travel planning, activities associated with travel, or any combination thereof, and a comparator for relational evaluation of the cost associated with alternative travel arrangements, travel activities, or any combination thereof.

9. The TRIPS as claimed in claim 8 with said transactional subsystem further comprising an accounting subsystem constructed to identify said TRIPS user by an access code, and to regulate and account for usage of output from said controller to said TRIPS user.

10. The TRIPS as claimed in claim 1 wherein said controller includes an interactive bus.

11. The TRIPS as claimed in claim 1 further comprising linking means for remote communication between said controller and said TRIPS user.

12. The TRIPS as claimed in claim 11 wherein said linking means is a wireless communicator.

13. The TRIPS as claimed in claim 12 wherein said wireless communicator includes a Global Positioning System (GPS) sensor.

14. The TRIPS as claimed in claim 11 wherein said linking means is an Internet link.

15. A travel reservation information and planning system (TRIPS) to enable an individual or a group to customize travel plans, to select activities to be conducted, and to self-process arrangements associated with such plans and activities, said system comprising:
   a. computer means including display means capable of displaying geographical, textual, and multimedia presentations;
   b. a TRIPS database comprising geographical information, textual or multimedia information, and temporal information, wherein any of said information is accessible by said computer means;
   c. means for a user to transmit to said computer means data, including temporal data, directed to travel plans or activities desired to be carried out;
   d. means for said computer means to receive from one or more suppliers of travel capabilities or one or more goods or services providers information associated with said travel or said activities and compatible with said temporal data;
   e. linking means for coupling said data from said user with said information from said one or more providers; and
   f. an output from said computer means to said user, wherein said output provides said user with information and supplies necessary to complete said travel plans or said activities desired to be carried out.

16. The TRIPS as claimed in claim 15 wherein said output from said computer means is a travel voucher.

17. The TRIPS as claimed in claim 15 wherein said output from said computer means is a coupon for goods or services.

18. The TRIPS as claimed in claim 15 wherein said output is an electronic output.

19. The TRIPS as claimed in claim 18 wherein said electronic output is a set of position coordinates deliverable to a Global Positioning System (GPS) device.

20. The TRIPS as claimed in claim 15 wherein said output is a voice output.

21. The TRIPS as claimed in claim 15 wherein said computer means is selected from the group consisting of personal computers, notebook computers, laptop computers, and personal digital assistants.

22. A travel reservation information and planning system (TRIPS) to enable a user to select one or more travel destinations and to make travel arrangements based upon a destination or destinations selected, said system comprising:
   a. a first computer means;
   b. means for linking said first computer means to a second computer means accessible by a user desiring to make travel arrangements, wherein said first computer means includes a map database having mappable geographic information;
   c. a topical information database couplable to said first computer means;
   d. a temporal subsystem including means to enable said user to preview, manipulate, and manage a chronological dimension associated with said travel arrangements; and
   e. an output couplable to said second computer means, wherein said output provides said user with information and supplies necessary to complete said travel plans.

23. The TRIPS as claimed in claim 22 further comprising reservation linking means coupling said first computer means to one or more goods or services service providers.

24. The TRIPS as claimed in claim 23 wherein said output is a paper map including a geographic display of said one or more destinations, information related to one or more points of interest obtained from said topical information database, and one or more reservation tickets for carrying out said travel plans.

25. The TRIPS as claimed in claim 24 wherein said reservation ticket is a voucher for goods or services.

26. The TRIPS as claimed in claim 22 wherein said output is an electronic output.

27. The TRIPS as claimed in claim 22 wherein said output is a voice output.

28. The TRIPS as claimed in claim 22 further comprising activities linking means coupling said first computer means to one or more activities service providers.

29. The TRIPS as claimed in claim 28 wherein said output is a paper map including a geographic display of said one or more destinations, information related to one or more points of interest obtained from said topical information database, and one or more reservation coupons for carrying out activities provided by said one or more activities service providers.

30. The TRIPS as claimed in claim 22 wherein said means for linking said first computer means to said second computer means is a direct cable link.

31. The TRIPS as claimed in claim 22 wherein said means for linking said first computer means to said second computer means is a wireless link.

32. The TRIPS as claimed in claim 22 with said temporal subsystem comprising:
   a. temporal information containing representational gauges of time;
   b. an updatable temporal database including time-related information associated with said topical information;
   c. TRIPS temporal software constructed to correlate one or more time-based user inputs with said one or more inputs related to said travel arrangements; and
   d. a temporal output designed to display a range of time-limited options associated with said travel arrangements.

33. The TRIPS as claimed in claim 32 further comprising a transactional subsystem including a modifiable database of cost information associated with said travel arrangements, and a comparator for relational evaluation of the cost associated with alternative travel arrangements.

34. The TRIPS as claimed in claim 33 with said transactional subsystem further comprising an accounting subsystem constructed to identify said user by an access code, and to regulate and account for usage of output from said first computer means to said user.

35. A travel reservation information and planning process permitting a user to custom plan travel and activities associated with travel, the process comprising the steps of:
   a. providing access for an individual or group to a database having geographic information and temporal information retrievable based upon one or more inputs from a user interested in developing a travel plan;
   b. linking travel information associated with said geographic information and said temporal information and making said travel information accessible to said user;
   c. making accessible to said user reservation information and materials associated with services or goods available from one or more providers; and
   d. providing to said user an output associated with said travel plan and compatible with chronological information input by said user.

36. The process as claimed in claim 35 wherein said output is selected from the group consisting of: building layouts, itineraries, reservation confirmation coupons, rental or lease reservations, discount or extra-service coupons, point-of-interest displays, airline tickets, train tickets, bus tickets, ferry tickets, coupons or tickets for goods or services, a visual display of information associated with said travel plan, and an audio output of information associated with said travel plan.

37. A product created by the process as described in claim 35.

38. The process as claimed in claim 35 further comprising the step of providing to said user a summary of travel options and expenses associated with said input travel plan.

39. The process as claimed in claim 35 wherein the step of providing access to said database includes linking a first computer means containing said database with a second computer means accessible by said user.

40. The process as claimed in claim 39 wherein the step of linking said first computer means to said second computer means is via a wireless link.

41. The process as claimed in claim 40 wherein the step of linking said first computer means to said second computer means is via a cable link.

42. The process as claimed in claim 35 wherein said second computer means is a personal digital assistant.

43. The process as claimed in claim 35 wherein the step of providing to said user an output associated with said travel plan includes the step of outputting an electronic display associated with a location of said user.

44. The process as claimed in claim 43 further comprising the step of outputting to said user an electronic display associated with a location of said one or more providers.

45. The process as claimed in claim 35 wherein the step of providing to said user an output associated with said travel plan includes the step of outputting a voice indicator of a location associated with said one or more providers.

46. A travel reservation information and planning system (TRIPS) to enable a TRIPS user to customize travel plans, to select activities to be conducted, and to self-process arrangements associated with such plans and activities, said TRIPS comprising:
   a. a geographic subsystem including textual or multimedia geographical information, wherein said geographical information is accessible by said TRIPS user;
   b. a topic subsystem including textual or multimedia topical information, wherein said topical information is accessible by said TRIPS user;
   c. a temporal subsystem including means to enable said TRIPS user to preview, manipulate, and manage a chronological dimension associated with travel, travel planning, activities associated with travel or any combination thereof;
   d. computer means for scheduling travel or desired activities compatible with said chronological dimension, wherein said geographic and topical information is accessible by said computer means; and
   e. an output from said computer means to said TRIPS user, wherein said output provides said TRIPS user with customized travel and activity plans that include information and supplies necessary to complete said travel or said desired activities.

47. The TRIPS as claimed in claim 46 wherein said information and said supplies necessary to complete said travel plans or said desired activities include display of geographical, textual, and multimedia presentations by said computer means.

48. The TRIPS as claimed in claim 46 wherein said output from said computer means includes a ticket selected from the group consisting of airline tickets, train tickets, bus tickets, and ferry tickets.

49. The TRIPS as claimed in claim 46 wherein said output is a customized map including travel materials selected from the group consisting of: building layouts, itineraries, reservation confirmation coupons, discount or extra-service coupons, rental or lease reservations, airline tickets, train tickets, bus tickets, ferry tickets, coupons for goods or services, a visual display of information associated with said customized travel plans and activities, and an audio output of information associated with said customized travel plans and activities.

50. The TRIPS as claimed in claim 47 wherein said information and said supplies necessary to complete said travel plans or said desired activities further includes a ticket means for providing a hard copy of said scheduling information, said ticket means selected from the group consisting of maps, airline tickets, train tickets, bus tickets, ferry tickets, point-of-interest displays, hotel vouchers, restaurant coupons, entertainment center coupons, event tickets, confirmation coupons, and coupons for goods.

51. The TRIPS as claimed in claim 50 wherein said computer means is selected from the group consisting of personal computers, notebook computers, laptop computers, and personal digital assistants.

52. The TRIPS as claimed in claim 46 with said temporal subsystem comprising:
   a. temporal information containing representational gauges of time;
   b. an updatable temporal database including time-related information associated with said topical information;
   c. TRIPS temporal software constructed to correlate one or more time-based user inputs with said one or more inputs related to said travel arrangements; and
   d. a temporal output designed to display a range of time-limited options associated with said travel arrangements.

53. The TRIPS as claimed in claim 46 further comprising a transactional subsystem including a modifiable database of cost information associated with said travel arrangements, and a comparator for relational evaluation of the cost associated with alternative travel arrangements.

54. The TRIPS as claimed in claim 52 with said transactional subsystem further comprising an accounting subsystem constructed to identify said user by an access code, and to regulate and account for usage of output from said first computer means to said user.

55. A travel reservation information and planning system (TRIPS) to enable a TRIPS user to customize travel plans, to select activities to be conducted, and to self-process arrangements associated with such plans and activities, said TRIPS comprising:
   a. a geographic subsystem including textual geographical information, multimedia geographical information, or a combination of the two, wherein said geographical information is accessible by said TRIPS user;
   b. a topic subsystem including textual topical information, multimedia topical information, or a combination of the two, wherein said topical information is accessible by said TRIPS user;
   c. a temporal subsystem including textual temporal information accessible by said TRIPS user and including means to enable said TRIPS user to preview, manipulate, and manage a chronological dimension associated with customized travel plans, activities to be conducted, and self-processing of arrangements associated therewith; and
   d. computer means responsive to one or more inputs from said TRIPS user related to said geographical, topical, or temporal information, wherein said computer means includes TRIPS software constructed to output to said TRIPS user information associated travel arrangements, topical events, or a combination of the two as a function of said one or more TRIPS user inputs.

56. The TRIPS as claimed in claim 55 further comprising a transaction subsystem including textual transactional information, multimedia transactional information, or a combination of the two, wherein said transaction subsystem is accessible by said TRIPS user and wherein said TRIPS user may transmit one or more inputs to said computer means related to said transactional information.

57. The TRIPS as claimed in claim 56 further comprising an Internet linking means for remote coupling of said TRIPS user and said computer means.

58. The TRIPS as claimed in claim 57 wherein said transaction subsystem includes transaction software constructed to create a hierarchy of access to said output of said computer means.

59. The TRIPS as claimed in claim 56 wherein said TRIPS software is constructed to calculate, delineate, and present one or more travel routes as a function of said one or more inputs from said TRIPS user.

60. The TRIPS as claimed in claim 59 wherein said geographic subsystem is constructed to display on a computer display accessible by said TRIPS user a multimedia travelog of one or more events and/or points of interest along said one or more travel routes.

61. The TRIPS as claimed in claim 56 wherein said TRIPS software is constructed to automatically transmit to said TRIPS user one or more geographic and/or topic outputs upon iteratively processing a single TRIPS user input.

62. The TRIPS as claimed in claim 56 wherein said TRIPS software is constructed to permit said TRIPS user to manually conduct an iterative examination of said geographic and topic subsystems based upon a plurality of TRIPS user inputs so as to produce a single geographic and/or topic output.

63. A travel reservation information and planning system (TRIPS) to enable a TRIPS user to conduct travel arrangements, said TRIPS comprising:
   at least one printed map corresponding to a selected geographical area, said printed map depicting surface features at a particular level of detail, said printed map comprising grid lines substantially parallel with coordinate lines of a selected geographical coordinate system, said grid lines defining boundary lines of printed map grid quadrangles identified by printed map grid quadrangle names;
   a first computer means having a display, said first computer means being programmed to display on said display selected display grid quadrangles identified by first display grid quadrangle names corresponding to said printed map grid quadrangle names;
   at least one database of selected geographical-coordinate-locatable objects (loc/objects) storable on a memory device and readable by said first computer means, said selected loc/objects identified by geographical coordinate location in said selected geographical coordinate system, said first computer means being programmed to display on said display locations of one or more of said selected loc/objects in said display grid quadrangles corresponding to map locations of said selected loc/objects in said printed map grid quadrangles of said printed map;
   a second computer means having an output programmed to indicate second grid quadrangles names for user correlation with corresponding printed map grid quadrangles;

a temporal subsystem including means to enable said TRIPS user to preview, manipulate, and manage a chronological dimension associated with said travel arrangements; and a topic subsystem including textual topical information, multimedia topical information, or a combination of the two, wherein said topical information is accessible by said TRIPS user.

64. The TRIPS as claimed in claim 63 wherein said second computer means includes a second display, said second computer means being programmed to display on said second display selected grid quadrangles identified by said second display grid quadrangle names for user correlation with corresponding printed map grid quadrangles;

and a data communications link between said first computer means and said second computer means.

65. The TRIPS as claimed in claim 63 wherein said second computer means is located at a location remote from said first computer means, said second computer means having at least one database of loc/objects, and said CAMLS includes a data communications link between said first computer means and said second computer means.

66. The TRIPS as claimed in claim 63 further comprising locating means couplable to said first computer means, to said second computer means, or to both.

67. The TRIPS as claimed in claim 66 wherein said locating means is a Global Positioning System (GPS) receiver.

68. A travel planning information and reservation system (TRIPS) for use with a device that includes geocoding capability, comprising:

a computer having a computer display;

a map database providing a set of electronic maps for presentation on said computer display, wherein said electronic maps have the capability of depicting transportation routes having identifiable waypoints including route intersections at geographical locations along said transportation routes, said identifiable waypoints on said electronic maps being identifiable in said computer by coordinate locations of a selected geographical coordinate system;

a TRIPS database of geographically locatable points of interest (POIs) identifiable by coordinate locations in said geographical coordinate system, said POIs being organized into a plurality of types for user selection of POIs by type, said POI types including overlays of said TRIPS database for display over said electronic maps on said computer display;

TRIPS software permitting user travel planning using said electronic maps presented on said computer display by providing user selection of selected waypoints that include at least a travel origin and a travel destination and can include intermediate waypoints, wherein said TRIPS software is capable of determining an additional group of said intermediate waypoints between said travel origin and said travel destination, and of calculating, delineating, and displaying a travel route between said travel origin and said travel destination via said intermediate waypoints according to user choice of a shortest travel route, quickest travel route, or user-selected preferred travel route;

said TRIPS software also permits user selection of a region of interest along said user-defined travel route, said region of interest having user-specified dimensions and permitting user selection of specified POI types within said region of interest and user selection of particular POIs from said selected types within said region of interest, said region of interest being identifiable in said computer by coordinate locations of said geographical coordinate system;

wherein said TRIPS database include travel information selected from a group consisting of graphics, photos, videos, animations, audio information, and text information about POIs of said TRIPS database and about said transportation routes and said identifiable waypoints of said electronic maps, wherein said TRIPS software is constructed to present a user-customized travelog for preview on said computer display of a user-defined travel route including said travel information in said TRIPS database on said selected transportation routes and said selected waypoints of said electronic maps and one or more of said selected POIs of said TRIPS database in said user-defined region of interest along said travel route, wherein said TRIPS software permits data transfer between a device that includes geocoding capability and said computer, and a topic subsystem including textual topical information, multimedia topical information, or a combination of the two, wherein said topical information is accessible by said user.

69. The TRIPS as claimed in claim 68 wherein said user selection of said selected waypoints occurs at a site remote from said computer, wherein said selected waypoints are recorded by said user with said geocoding capable device, and wherein said data transfer selectively includes either (a) downloading to said computer from said geocoding capable device of data that includes said selected waypoints so as to provide guidance of said user remote from said computer or (b) uploading of data that includes said selected waypoints and selected POIs from said computer to said geocoding capable device.

70. The TRIPS as claimed in claim 69 wherein said TRIPS software is constructed to display a user-customized strip map of said user-defined travel route, wherein said computer is coupled to a printer, and wherein said TRIPS software is constructed for printing hard-copy maps of said user-customized strip maps to be used in conjunction with said geocoding capable device.

71. A travel reservation information and planning system (TRIPS) comprising:

a. a computer;

b. a TRIPS database of topical data and geographic data;

c. means for a TRIPS user to relay via said computer one or more inputs related to travel, travel planning, activities associated with travel, or any combination thereof;

d. one or more subsystems couplable to said TRIPS database and constructed to process said one or more inputs from said TRIPS user and to calculate one or more outputs responsive to said one or more inputs, wherein each of said one or more subsystems is selected from the group consisting of geographic, topical, temporal, and transactional subsystems, wherein said one or more subsystems are constructed to permit said TRIPS user to initiate said one or more inputs in any one of said one or more subsystems, and wherein said one or more outputs include information on options or a range of options corresponding to said travel, travel planning, activities associated with travel, or any combination thereof; and e. a controller for regulating correspondence between said one or more inputs from said TRIPS user and said one or more outputs from said one or more subsystems.

72. The TRIPS as claimed in claim 71 wherein said geographic subsystem includes:
   a. means for gathering from said TRIPS database geographic information related to points of interest;
   b. TRIPS geographic software constructed to retrieve specific information related to one or more points of interest identified based upon said one or more inputs from said TRIPS user; and
   c. means to output to said TRIPS user said specific information related to said one or more points of interest.

73. The TRIPS as claimed in claim 72 wherein said geographic subsystem further includes means for calculating and identifying one or more travel routes associated with said specific points of interest and means for presenting to said TRIPS user output related to topics of interest proximate to said one or more points of interest.

74. The TRIPS as claimed in claim 72 wherein said topical subsystem includes:
   a. means for gathering from said TRIPS database topical information related to people, places, events, things, or any combination thereof;
   b. TRIPS topical software constructed to correlate one or more topic-related inputs from said TRIPS user and to integrate said topical information based on said one or more topic-related inputs into one or more topical subsystem outputs; and
   c. means to output to said TRIPS user said one or more topical subsystem outputs.

75. The TRIPS as claimed in claim 74 wherein said temporal subsystem includes:
   a. temporal information containing representational gauges of time;
   b. an updatable temporal database including time-related information associated with said topical information;
   c. TRIPS temporal software constructed to correlate one or more time-based TRIPS user inputs with said one or more inputs related to said travel, travel planning, activities associated with travel, or any combination thereof; and
   d. means to output to said TRIPS user one or more temporal subsystem outputs related to said one or more time-based TRIPS user inputs and said one or more inputs related to said travel, travel planning, activities associated with travel, or any combination thereof.

76. The TRIPS as claimed in claim 75 further comprising means for linking said temporal database to one or more remote topic-information providers.

77. The TRIPS as claimed in claim 76 wherein said temporal database includes multimedia information related to said travel, travel planning, activities associated with travel, or any combination thereof.

78. The TRIPS as claimed in claim 75 wherein said transactional subsystem includes a modifiable database of cost information associated with said travel, travel planning, activities associated with travel, or any combination thereof, and a comparator for relational evaluation of the cost associated with alternative travel arrangements, travel activities, or any combination thereof.

79. The TRIPS as claimed in claim 78 with said transactional subsystem further comprising an accounting subsystem constructed to identify said TRIPS user by an access code, and to regulate and account for usage of output from said controller to said TRIPS user.

80. A travel reservation information and planning system (TRIPS) designed to enable an individual or a group to customize travel plans, to select activities to be conducted, and to self-process arrangements associated with such plans and activities, the TRIPS system comprising:
   a. computer means including display means capable of displaying geographical, textual, and multimedia presentations;
   b. a TRIPS database comprising geographical, textual, or multimedia information, wherein said information is accessible by said computer means;
   c. means for a user to transmit to said computer means data directed to travel plans or activities desired to be carried out;
   d. means for said computer means to receive from one or more suppliers of travel capabilities or one or more goods or services providers information associated with said travel or said activities;
   e. linking means for coupling said data from said user with said information from said one or more providers; and
   f. an output from said computer means to said user, wherein said output is capable of being provided in any of a plurality of formats including tickets, coupons, summary sheets, electronic displays, pictorial displays, and audio outputs, and wherein information provided by said output includes singly or in combination geographic information, topical information, transactional information, or temporal information associated with said data entered into said computer means by said user.

* * * * *